(12) United States Patent
Mazzotti et al.

(10) Patent No.: US 10,895,528 B2
(45) Date of Patent: Jan. 19, 2021

(54) METHOD FOR MEASURING THE CONCENTRATION OF TRACE GASES BY SCAR SPECTROSCOPY

(71) Applicant: CONSIGLIO NAZIONALE DELLE RICERCHE—CNR, Rome (IT)

(72) Inventors: Davide Mazzotti, San Casciano in Val di Pesa (IT); Pablo Cancio Pastor, Florence (IT); Iacopo Galli, Vaiano (IT); Paolo De Natale, Prato (IT); Giovanni Giusfredi, Campi Bisenzio (IT)

(73) Assignee: CONSIGLIO NAZIONALE DELLE RICERCHE—CNR, Rome (IT)

( * ) Notice: Subject to any disclaimer, the term of this patent is extended or adjusted under 35 U.S.C. 154(b) by 423 days.

(21) Appl. No.: 15/765,029

(22) PCT Filed: Sep. 30, 2016

(86) PCT No.: PCT/EP2016/073513
§ 371 (c)(1),
(2) Date: Mar. 30, 2018

(87) PCT Pub. No.: WO2017/055606
PCT Pub. Date: Apr. 6, 2017

(65) Prior Publication Data
US 2018/0275049 A1      Sep. 27, 2018

Related U.S. Application Data

(60) Provisional application No. 62/235,093, filed on Sep. 30, 2015.

(51) Int. Cl.
*G01N 21/3504*        (2014.01)
*G01J 3/42*        (2006.01)
*G01N 21/39*        (2006.01)

(52) U.S. Cl.
CPC ............ *G01N 21/3504* (2013.01); *G01J 3/42* (2013.01); *G01N 2021/391* (2013.01); *G01N 2201/06113* (2013.01); *G01N 2201/129* (2013.01)

(58) Field of Classification Search
CPC ..... G01N 21/3504; G01N 2201/06113; G01N 2201/129; G01N 2021/391; G01J 3/42
USPC ........................................................ 702/24
See application file for complete search history.

(56) References Cited

U.S. PATENT DOCUMENTS

2017/0336320 A1\* 11/2017 Yalin .................. G01N 21/3504

FOREIGN PATENT DOCUMENTS

| WO | WO 2014/102572 | \* | 7/2014 | ................ G01J 3/02 |
| WO | 2014/170828 A1 | | 10/2014 | |

OTHER PUBLICATIONS

Munzke, Gaseous Oxygen Detection Using Hollow-Core Giber-Based Linear Cavity Ring-down Spectroscopy (Year: 2015).\*

(Continued)

*Primary Examiner* — Michael P Nghiem
*Assistant Examiner* — Dacthang P Ngo
(74) *Attorney, Agent, or Firm* — Volpe Koenig

(57) ABSTRACT

The present invention is relative to a method of ring-down spectroscopy in saturated-absorption condition, for measuring a first concentration of a gas through a measurement of the spectrum of a molecular transition of said gas.

30 Claims, 23 Drawing Sheets

(56) References Cited

OTHER PUBLICATIONS

Cancio, P et al. "Saturated-Absorption Cavity Ring-Down (SCAR) for High-Sensitivity and High-Resolution Molecular Spectroscopy in the Mid IR" (2014) Springer Series in Optical Sciences 179: 143-162.
Galli, I. et al. "Ultra-stable, widely tunable and absolutely linked mid-IR coherent source" (2009) Optical Society of America 17 (12): 9582-9587.
Galli. I et al. "Ti:sapphire laser intracavity difference-frequency generation of 30mW cw radiation around 4:5µm" Optics Letters (2010) 35 (21): 3616-3618.
Galli. I et al. "Molecular Gas Sensing Below Parts Per Trillion: Radiocarbon-Dioxide Optical Detection" Physical Review Letters (2011) 107 (27): 270802-1-270802-4.
Giusfredi, G. et al. "Theory of saturated-absorption cavity ring-down: radiocarbon dioxide detection, a case study" (2015) Journal of Optical Society of America B 32 (10): 2223-2237.
Giusfredi, G. et al. "Saturated-Absorption Cavity Ring-Down Spectroscopy" (2010) Physical Review Letters 104 (11): 110801-1-110801-4.
Jongma, R. et al. "Trace gas detection with cavity ring down spectroscopy" (1995) Rev. Sci. Instrum., 66 (4): 2821-2828.
Boris Perevalov. Le spectre d'absorption du dioxyde de carbone dans le proche infrarouge (1.4-1.7 m) : Cavity Ring Down Spectroscopy, modélisation globale et bases de données. Atomic Physics [physics.atom-ph]. Université Joseph-Fourier—Grenoble I, 2009. English.

\* cited by examiner

METHOD FOR MEASURING THE CONCENTRATION OF TRACE GASES BY SCAR SPECTROSCOPY

CROSS REFERENCE TO RELATED APPLICATIONS AND INCORPORATION BY REFERENCE

This application is a 35 U.S.C. § 371 national stage application of PCT/EP2016/073513, which was filed Sep. 30, 2016 and claimed the benefit of U.S. Provisional Appln. No. 62/235,093, which was filed Sep. 30, 2015, both of which are incorporated herein by reference as if fully set forth.

TECHNICAL FIELD

The present invention relates to a method to analyse saturated-absorption cavity ring-down (which hereafter will be referred to as SCAR for brevity) signals, detected with a SCAR spectroscopy apparatus, for measuring with high accuracy the concentration of trace gases, in particular for trace gases present in part per trillion ($10^{-12}$ or ppt). Radiocarbon detection at concentration levels much lower than those present as natural abundance is an example of the applicability of this method.

TECHNOLOGICAL BACKGROUND

The so-called method of $^{14}C$ (carbon-14 or radiocarbon), is a radiometric dating method based on the measurement of relative abundances of carbon isotopes. The method of $^{14}C$ allows dating organic materials (bone, wood, textile fibers, seeds, wood, coals . . . ), thus containing carbon atoms.

Carbon is a chemical element essential to life and present in all organic substances. It is present on earth in three isotopes: two stable ones ($^{12}C$ and $^{13}C$) and a radioactive one ($^{14}C$). The latter turns by beta decay into nitrogen ($^{14}N$), with an average half-life of 5730 years, thus this isotope would disappear in the long run, if not continually reinstated. The production of new $^{14}C$ regularly occurs in nature in the high layers of the troposphere and in the stratosphere, by the capture of thermal neutrons, secondary components of cosmic rays, by the nitrogen atoms present in the atmosphere. The dynamic balance between production and radioactive decay then keeps the concentration of $^{14}C$ in the atmosphere constant, where it is mainly bound to oxygen in the form of carbon dioxide.

All living organisms that are part of the carbon cycle are continuously exchanging carbon with the atmosphere through breathing (animals) or photosynthesis (plants) processes or they assimilate it by feeding on other living beings or organic substances. Consequently, until a body is alive, the isotopic ratio of $^{14}C$ and that of the other two carbon isotopes remains constant and equal to what is found in the atmosphere. In particular, the current natural isotopic ratio (abundance) in the atmosphere is:

$$r_0 = \frac{^{14}C}{C} \approx 1.2 \times 10^{-12}.$$

After death, these processes end and the organism does not exchange carbon with the outside anymore. Then, as a result of decay, the isotopic ratio decreases on a regular basis according to the formula:

$$r = r_0 e^{-\Delta t/\tau},$$

where $\Delta t$ is the time elapsed from the death of the organism and $\tau$ is the average lifespan of $^{14}C$.

By measuring the amount of $^{14}C$ present in organic remains, the age thereof is obtained by applying the following formula:

$$\Delta t = -\tau \ln(c/c_0).$$

The measurement of $^{14}C$ is possible, given the low concentrations present, with the method of mass spectrometry (AMS, Accelerator Mass Spectrometry): using a mass spectrometer, the concentration of $^{14}C$ present in the sample is measured. This method is able to obtain reliable measurements for concentrations in the order of $$\frac{^{14}C}{C} \approx 10^{-15}.$$

However, the costs related to AMS equipment are relevant, in the order of millions of euros, and the overall dimensions of the same equipment is substantial, with high operating voltages. What above stated as an example stands for Carbon as well as any other substance which is present in traces and need to be measured.

Additionally, the detection of trace gases is generally very relevant in various technology fields. Apart from dating, the measurement of the amount of radiocarbon is important in biomedicine or in environmental and earth science.

A class of techniques for measuring the concentration of a gas is spectroscopy. Spectroscopy is a scientific technique that analyzes the spectrum of electromagnetic radiation emitted/absorbed by a source split in its wavelengths and hence it analyzes the properties of atoms or molecules that are the source/sink of such radiation. In these spectra, the lines of absorption or emission can be studied.

The origin of a given spectral line can be an electronic, vibrational or rotational transition of the molecule of interest. For example, in the infrared, the main origins of a spectral line are not transitions between energy levels of electrons, generally dominating in the visible spectrum, but transitions between molecular vibrational energy levels.

The conventional cavity ring-down (CRD) spectroscopic technique was devised over 25 years ago, using pulsed laser first and then continuous emission laser. The advantages of CRD are mainly two, as detailed below: the signal is immune to amplitude fluctuations of the radiation source used; the linear absorption coefficient is measured directly and then, knowing the total pressure of the gas and the line-strength of the spectroscopic transition, the concentration of the molecular species to be measured.

Typical CRD spectroscopy includes an apparatus comprising a laser that is used to send a highly coherent radiation beam to a high-finesse cavity consisting for example of two highly reflective mirrors (for example with a reflectivity R>99.9%). When the radiation emitted by the laser at frequency ν is in resonance with a cavity mode, the radiation intensity increases in the cavity due to constructive interference phenomena. The laser is then quickly switched off, or moved away from the resonance cavity, in order to measure the exponentially decreasing intensity of light that escapes from the cavity. During this decay, the light is reflected thousands of times by the mirrors, following a round trip, yielding an effective path a few kilometers long.

If a gas or a mixture of gases that absorb light is placed inside the cavity, the intensity of photons trapped decreases by a fixed percentage along each path inside the cavity due to the absorption from the medium in the cavity and due to reflectivity losses. The light intensity inside the cavity is then given by an exponential function of time:

$$I(t)=I_0 \exp(-t/\tau).$$

CRD spectroscopy measures how long light employs for its intensity to decay to 1/e of its initial intensity value, and this value of ring-down time $\tau$ is used to calculate the concentration of the absorbing substance in the gas inside the cavity.

The operating principle is thus based on the extent of a decay rate rather than an absolute absorbance. The decay constant $\tau$ is called "ring-down time" and is dependent on loss mechanisms inside the cavity. For an empty two-mirror cavity, i.e. without an absorbing medium inside, the decay constant $\tau_0$ is dependent on mirror losses (transmission, absorption and scattering) and various optical phenomena such as diffraction:

$$\gamma_c = \frac{1}{\tau_o} = \frac{c}{l}(1 - R + X) \quad \text{(Eq. 1)}$$

Where $\gamma_c$ is the decay rate without absorbing gas, in $ms^{-1}$, c the speed of light in vacuum in cm/ms, l is the length of the cavity in cm, R the reflectivity of the cavity mirrors, and X takes into account various other optical losses different from gas absorption. The equation uses the $\ln(1+y) \approx y$ approximation for y close to zero, which is the case in the working conditions of the CRD.

A gas inside the cavity absorbs energy by increasing the losses according to the Beer-Lambert law and then the intensity of the light decays more quickly, after the laser has been switched off. Therefore, assuming that the gas fills the entire cavity, the decay time becomes:

$$\gamma(v - v_o) = \frac{1}{\tau} = \frac{c}{l}[(1 - R + X) + \alpha_g(v - v_o)l] = \gamma_c + \gamma_g(v - v_o), \quad \text{(Eq. 2)}$$

where $\tau$ is the cavity ring-down time due to all intracavity losses, in ms, $\gamma(v-v_o)$ is the decay rate with absorbing gas in the cavity, in $ms^{-1}$, $\gamma_g(v-v_o)$ is the absorbent gas contribution to the total cavity decay rate in $ms^{-1}$, $$\alpha_g(v - v_o) = \frac{1}{c}\gamma_g(v - v_o)$$

is the absorption coefficient of the transitions of the tested specific gas; $v_0$ is the resonance frequency of the absorbent molecular transition, in Hz; $v$ is the absorbed light frequency in Hz. This is called a linear regime as $\alpha$ is considered independent of the intensity of the radiation. $\gamma_c$ is considered independent on $v$ for frequencies close to the resonance frequency $v_0$.

In other words, the cavity ring-down event occurs by abruptly stopping the radiation from the laser that impinges on the cavity and is characterized by a power transmitted which decays according to the exponential function $\exp(-\gamma t)$, where $\gamma = 1/\tau$ and t is the time measured from the moment of interruption of the incident wave.

If the cavity has an internal linearly absorbing medium, the constant $\gamma$ is simply the sum of two terms: $\gamma_c = 1/\tau_0$ representing the empty cavity contribution and $\gamma_g = 1/\tau - 1/\tau_0$ which represents that from the medium absorption. Therefore, with two separate measurements, one with empty cavity and one with absorbing medium, the value of $\gamma_g$ can be ideally determined.

Recently, a new technique was presented related to laser spectroscopy, called "saturated-absorption cavity ring-down spectroscopy" (hereinafter briefly SCAR), described in "Saturated-absorption cavity ring-down spectroscopy" written by G. Giusfredi et al., Phys. Rev. Lett. 104, 110801 (2010), which has proven that high sensitivity can be achieved. This technique is called below ring-down spectroscopy under saturation of absorption. This means that the intensity of radiation in the cavity that is set is much greater than the saturation intensity of the molecular transition to detect.

SCAR spectroscopy uses a non-linear effect bringing the absorbing medium to saturation, i.e. the intensity of the laser beam is such as to lead the molecular transition of the gas of interest—resonant with the laser—to saturation. In other words, the wavelength of the electromagnetic radiation emitted by the laser is adjusted so that it is in resonance with the transition of interest and the intensity of the radiation itself is increased or adjusted so that this transition is brought to a saturation condition. From the studies reported by the Applicants, they have figured out how to take advantage of the fact that a cavity containing a gas in high saturation conditions behaves almost as an empty cavity in relation to radiation, i.e. when the laser is switched off, the emission of photons follows a curve similar to that of the empty cavity at least for a first time interval. This scheme is called "effective empty cavity scheme". Therefore, in an experiment where saturation is reached inside the cavity using a beam having a sufficient intensity and then turning off the same, measuring the radiation emitted with a photodetector, a curve is obtained that for a first part follows the decay pattern in an empty cavity. After a certain period of time, however, the behavior of the radiation emitted is no longer that of an empty cavity, since many photons have already left the cavity that contains a gas that is no longer under saturation conditions, thus for a second time interval the decay curve is the curve that one would get if the cavity was filled by a non-saturated gas, i.e., one gets back to the linear absorption regime. Thus, by measuring the ring-down radiation transmitted by the cavity, the two decays $\gamma_c$ and $\gamma_g$ are measured independently, using both the saturation condition and the linear condition from the same decay event. In other words, the value of $\gamma_g$ is encoded in the "deformation" of the exponential decay.

Since in principle all information about the gas absorption to be obtained is contained in the "non-linearities" of the decay event (very small in the case of trace gas sensing at the ppt level or less), the SCAR spectroscopy minimizes the following errors that are introduced in the detected decay signals and cause not to be in an ideal condition, ultimately preventing two measurements as in conventional CRD spectroscopy:

the non-monochrome condition of the wave emitted by the laser which is incident onto the cavity;
the imperfect immediacy of the interruption of the wave to be "turned off" to measure the ring-down time;
the fluctuations of the resonant frequency of the cavity;
the imperfect matching of the spatial mode of the incident wave emitted by the laser to the cavity mode, which can also vary overtime;
the reflectivity inhomogeneity of the mirrors forming the cavity, which combines with the alignment fluctuations of the incident wave;

the dependence of $\gamma_c$ on frequency, when going from "full cavity" to "empty cavity" different longitudinal resonant modes of the cavity are used, one coincident with a region of absorption of the medium (i.e. the gas introduced into the cavity the concentration of which is to be measured) and one in a region of transparency;

the fluctuation of this dependency over time; and

The non-linearities of the detector and detection electronics in a dynamic range of several decades of the detected decay.

In order to give a quantitative idea of the resolution obtainable through the SCAR technique, let us consider the special case of radiocarbon dioxide detection in natural abundance. In optimum conditions of temperature and pressure, the deformation from a pure exponential produced by radiocarbon along decay signals is of the order of 1 μV out of 3 V. This set very stringent limits on the residual non-linearity which can be born.

The measurement is possible thanks to the noise present in the signal to be captured, which, in good approximation, has zero, or at least constant, average. By averaging many events (each decay signal stored in memory is the average of 1280 events), it is possible to increase the resolution of digitization by approximately 35 times.

SUMMARY OF THE INVENTION

The invention relates to a method for the measurement of the concentration of a gas on the basis of the SCAR method outlined above, i.e. by measuring the temporal evolution of the ring-down in a condition of saturation of the transition of interest.

As indicated above, the SCAR spectroscopy methodology is based on a fit of a curve of the ring-down signal detected in conditions of resonance between the electromagnetic radiation emitted by the laser and the cavity and between the electromagnetic radiation emitted by the laser and the gas transition that has distortions with respect to a perfectly decreasing exponential, exponential which represents the decay curve in linear absorption condition. Just because a saturation condition is used, all the measurement is based on non-linear absorption of trace gas located within a high-finesse cavity containing the gas itself. The exponential curve is thus distorted. The extent and shape of the distortion contains information on the absorption that the gas would have in linear condition and thus on its concentration.

However, retrieving the linear absorption coefficient of the sample gas from the non-exponential behavior of the SCAR experimental decay curves is a challenging task.

The goal of the present invention is therefore to obtain from the SCAR data samples an accurate measurement of the gas concentration. This method includes a step to obtain a fit of the experimental data and from the fit parameters to obtain the desired concentration. Applicants have understood that in order to obtain an accurate estimate of the gas concentration from the experimental data obtained via a SCAR method, a physical understanding of the phenomena is needed to obtain meaningful parameters from the fit performed.

The Applicants have developed two different embodiments of the method of the invention to obtain accurate concentration determinations using the data obtained during a SCAR decay, or multiple SCAR decays. The first embodiment may give less accurate results, having under some conditions a slightly higher error in the final concentration determination, but can be performed "on-line", that is, while the SCAR measurements are performed. One advantage of this embodiment is that the method of the invention can be performed during the measurements to determine whether there are evident errors in the procedure and whether a stop and a correction are needed. This embodiment can be performed on-line because it gives the result of the SCAR measurement one by one, that is, it fits each decay curve as soon as it is recorded for a given frequency. This method, of course, can be performed also off-line, saving all the measurements data for the different frequencies and evaluating the concentration of the gas using the method of the invention afterwards according to this embodiment. In case of relative values, that is when a ratio between a sample of gas having known concentration and a sample of gas having unknown concentration is desired, the two embodiments of the method of the invention are substantially equivalent in accuracy. The second method is implemented using a plurality of SCAR data relative to a number N of scar decays at different frequencies. Therefore, it cannot provide real time values, because as an input it needs all the data relative to all decays at different frequencies from which the concentration is to be determined. However, this second method has the highest accuracy, in particular it generally obtains the best value of the spectral area.

The apparatus used in any of the two main embodiments of the method of the invention to obtain SCAR decay data to be fitted includes a laser source emitting coherent electromagnetic radiation at a fixed wavelength/frequency. The laser source emits radiation with an intensity such as to work under conditions of saturation, as described below. The laser preferably emits infrared radiation. The infrared represents the optimal spectral range, since it has the most intense absorption bands of gaseous molecular species to be detected. Preferably, the laser emits radiation at a single wavelength, and it is a tunable laser (that can be tuned), i.e. whose wavelength/frequency is selectable within a certain range. This selection occurs in a known manner by means of modification of the wavelength which are known in the field. As is known, no laser is perfectly monochromatic, the laser of the invention is preferably a laser with a very narrow line-width, for example a CW laser wherein the line-width is less than the width of a cavity resonance mode.

In addition, the apparatus includes a resonant cavity with high finesse, e.g. comprising two reflecting mirrors arranged in such a way as to form a closed optical path for the electromagnetic radiation emitted by the laser source. Preferably, the round-trip length is finely adjustable (within a range of a few microns with sub-nm resolution) so as to put the cavity in resonance with the laser radiation, so as to couple the electromagnetic radiation to the cavity. The movement of the mirrors occurs through appropriate moving means known in the field. Preferably, the reflectivity of the mirrors of the cavity must be greater than 99.9%.

The resonant cavity is intended to contain the gas whose concentration is to be detected.

The arrangement of the laser source and of the cavity can be adjusted in such a way that the single wavelength radiation emitted by the source is coupled to the cavity, so that it is trapped therein, forming a resonant radiation.

If the laser is not monochrome, it is necessary that only one wavelength is substantially coupled to the cavity.

The type of laser source used in the present invention is for example described in the article written by Galli et al., Opt. Lett. 35, 3616 (2010). Other types of laser sources can be used, the intensity of the radiation emitted must however be such that the intensity of radiation I inside the cavity is much greater than the saturation intensity $I_S$ of the molecular transition to be detected, i.e. $I \gg I_S$. Preferably, the saturation parameter, i.e. the ratio between the intensity of the radiation within the cavity and the saturation intensity of the molecular transition to be detected, or $I/I_S$, must be >10.

The radiation/cavity combination enables an increase in the intensity of the radiation inside the cavity due to the resonance phenomenon. For a linear cavity, being $\lambda$ the wavelength of the radiation coming from the laser and D the distance between the two mirrors, the cavity must satisfy the equation $$D = \frac{m\lambda}{2}$$

with m integer.

The gas whose concentration is to be measured is located inside the cavity. Therefore, the cavity preferably includes an inlet and an outlet for the gas contained in dedicated containers. The cavity also includes, preferably, means for the thermal adjustment of the cavity itself so as to adjust the gas temperature, and pressure gauges to adjust the gas pressure inside the cavity.

The measurements are carried out by bringing the cavity in resonance with the electromagnetic radiation emitted by the laser, injecting it with the laser radiation to beyond a predetermined filling level. This coupling between the radiation and the cavity may be initially performed by the movement of one or more mirrors so as to vary the total length of the cavity and reach a cavity-laser resonance condition.

Preferably, as mentioned above, the laser emits radiation at different frequencies (or wavelengths) and radiation at various frequencies is introduced into the cavity, by scanning a certain range of frequencies. Such a scan is carried out across a molecular transition frequency of the gas to be studied and whose traces are to be detected, in order to measure the spectral area of the molecular transition, which is proportional to the gas concentration. Typically, the scan should be approximately from −5 to +5 HWHM Lorentzian widths or from −3 to +3 HWHM Gaussian widths, the largest of the two. For detection of radiocarbon is also preferable to extend the range beyond the interfering resonance of $N_2O$, then preferably the scanning should extend at least from −250 MHz to +400 MHz around the target radiocarbon resonance P(20).

Furthermore, the apparatus comprises a detector, in particular a photo detector, suited to detect the radiation leaking out of the cavity.

The electrical signal from the photodetector is sent to a processor. The processor processes such an input signal by a fit of the signal with a function that takes into account the effects of saturation, to calculate the spectral area of the linear absorption coefficient and thus the gas concentration present within the resonant cavity.

The detection is performed as follows: after the radiation has been introduced inside the cavity and a saturation condition has been obtained (i.e. in which the intensity of the radiation is much greater than the saturation intensity of the molecular transition of interest), the coupling between the cavity and the radiation emitted by the laser source is interrupted by any means known in the art and the decay of the radiation within the cavity itself is measured. For example, the coupling between the cavity and the laser source can be interrupted by switching off the laser source and/or by rapidly changing the emission frequency.

In order to take a ring-down measurement, the laser and the cavity are brought into a resonance condition, i.e. a condition in which the wavelength of the laser is a multiple of the optical path in the cavity. Therefore, all the measurements described below, are carried out in a condition where there is an initial resonance between the electromagnetic radiation emitted by the laser and the cavity. This resonance, hereinafter briefly called cavity-laser resonance, is "switched off" to perform the actual ring-down measurement.

Furthermore, to perform a measurement of the gas concentration, a further resonance condition is imposed, which is the resonance condition between the electromagnetic radiation emitted by the laser and the molecular transition of interest. This additional resonance will be briefly called laser-gas resonance hereinafter. The measurements are made around the laser-gas resonance, i.e. the frequency of the electromagnetic radiation emitted by the laser is "in a neighborhood" of the frequency of the transition of interest. Thus a range around the frequency of the molecular transition of interest $v_0$ is determined, that is a $v_{min} \leq v_0 \leq v_{max}$ range is selected and, starting preferably from one end of the range, the frequency of the laser is varied at pre-determined step $\Delta v$. For each frequency inside the selected range, a SCAR measurement is performed, that is, the cavity is brought to a resonance condition to this specific laser frequency selected, the intensity of the radiation inside the cavity is brought into saturation condition, the laser is switched off, and the decay of the intensity of the radiation is recorded.

Preferably, the operation above is repeated for all the frequencies in the selected range at each step $\Delta v$. The data so obtained are then fitted according to the first or the second embodiment of the invention.

The molecular concentration $N_g$, in $cm^{-3}$, of the target gas to be measured and positioned inside the cavity is directly related with the integrated area of the absorbance profile of the target absorption by:

$$N_g = \frac{1}{cL_s(T)} \int \alpha_g(v - v_0) dv \qquad \text{(Eq. 3)}$$

with:
- $L_s(T)$ is the line-strength of the absorbent molecular transition at temperature T, in cm/molecule
- c is the vacuum velocity of light, in cm/s
- $v_0$ is the resonance frequency of the absorbent molecular transition, in Hz
- v is the absorbed light frequency, in Hz
- $\alpha_g(v-v_0)$ is the absorption coefficient, in $cm^{-1}$ The absorption coefficient $\alpha_g(v-v_0)$ is determined in SCAR spectroscopy by measuring the contribution to the cavity ring-down decay rate due to the absorption of the gas, $\gamma_g(v)$ as described in Eq. (2). Therefore, in order to determine the gas concentration, it is sufficient to calculate the cavity ring-down decay rate due to the absorption of the gas for a plurality of spectral frequencies around the resonant one, i.e. by measuring the spectral profile around the frequency of the target line.

Some results obtained with SCAR spectroscopy is reported in: G. Giusfredi, S. Bartalini, S. Borri, P. Cancio, I. Galli, D. Mazzotti and P. De Natale, "Saturated-absorption cavity ring-down spectroscopy", Phys. Rev. Lett. 104, 110801 (2010) and in P. Cancio, I. Galli, S. Bartalini, G. Giusfredi, D. Mazzotti, and P. De Natale, "Saturated-Absorption Cavity Ring-Down (SCAR) for High-Sensitivity and High-Resolution Molecular Spectroscopy in the Mid IR", in Cavity-Enhanced Spectroscopy and Sensing-Springer Series in Optical Sciences Volume 179, 2014, pp 143162, where however the method of the invention has not been disclosed.

In the following, the spectral line shape of emission of the transition examined in the target gas is considered. Three main factors generally defines an absorption line: central position of the line (e.g., the central frequency $\nu_0$), the strength of the line, and shape factor (or line profile, g). Each line has a finite width (referred to as natural broadening of a spectral line). Several processes may result in an additional broadening of a spectral line of the molecules: such as collisions between molecules (referred to as the pressure broadening); due to the differences in the molecule thermal velocities (referred to as the Doppler broadening); and the combination of the above processes.

The experimental conditions, always with $I \gg I_s$, can be of two different types. They will be called in the following "homogenous condition" and "inhomogeneous condition". In the inhomogeneous case, the line shape is dominated by a thermal Gaussian distribution and therefore the Lorentzian width due to collision and natural broadening is small, in other words when $w_G \gg w_L$, where $w_L$ is the HWHM Lorentzian width and $w_G$ is the HWHM Gaussian width. In a homogeneous case, the thermal Gaussian distribution dominates. Further, there is a third "intermediate" condition in which the two processes are both relevant.

The area normalized profile of the spectral line is called in the following:

$$g(\nu-\nu_o, w_R) \qquad (\text{Eq. 4})$$

with
$\nu_0$ defined as above
$w_R$ is the half-width-half-maximum of the profile, in Hz This can be written, in the three different experimental conditions above identified:

a) Inhomogeneous broadening (IB)>>homogeneous broadening (HB) (i.e. $w_G \gg w_L$)
Gaussian profile of Gaussian width $w_G$ (HWHM):

$$g(\nu-\nu_o, w_R) = G(\nu-\nu_o, w_G) = \frac{\sqrt{\ln 2}}{\sqrt{\pi}\, w_G} \exp\left[-\ln(2)\left(\frac{\nu-\nu_o}{w_G}\right)^2\right]$$

b) IB<<HB (i.e. $w_G \ll w_L$)
Lorentzian profile of Lorentzian width $w_L$ (HWHM):

$$g(\nu-\nu_o, w_R) = L(\nu-\nu_o, w_L) = \frac{1}{\pi w_L}\frac{1}{1+\left(\frac{\nu-\nu_o}{w_L}\right)^2}$$

c) IB≈HB (i.e. $w_G \approx w_L$) (condition for maximum absorption, normally)
Voigt profile of Voigt width $w_R$ (HWHM), $w_R=\{w_L, w_G\}$:
$\bar{g}(\nu-\nu_o, w_R) = V(\nu-\nu_o, w_G)$ $$g(\nu-\nu_o, w_R) = V(\nu-\nu_o, w_R) = \frac{\sqrt{\ln 2}}{w_G w_L \sqrt{\pi^3}}\int_{-\infty}^{\infty}\frac{\exp[-\ln(2)(\nu'/w_G)^2]}{1+[(\nu-\nu')/w_L]^2}d\nu'$$

The peak normalized line profile is defined as:

$$\bar{g}(\nu-\nu_o, w_R) = \frac{1}{g_o} g(\nu-\nu_o, w_R) \qquad (\text{Eq. 5})$$

with
$\nu_0$, $w_R$ and $g(\nu-\nu_o, w_R)$, defined as above
$g_o = g(0, w_R)$ is the peak normalization factor of the profile, in Hz$^{-1}$.
a) IB>>HB (i.e. $w_G \gg w_L$), $g_o = G_o$, $$\bar{G}(\nu-\nu_o, w_G) = \frac{1}{G_o} G(\nu-\nu_o, w_G)$$

is the peak normalized Gaussian profile.
b) IB<<HB (i.e. $w_G \ll w_L$), $g_o = L_o$, $$\bar{L}(\nu-\nu_o, w_L) = \frac{1}{L_o} L(\nu-\nu_o, w_L)$$

is the peak normalized Lorentzian profile.
c) IB≈HB (i.e. $w_G \approx w_L$), $g_o = V_o$, $$\bar{V}(\nu-\nu_o, w_R) = \frac{1}{V_o} V(\nu-\nu_o, w_R)$$

is the peak normalized Voigt profile.

In order to satisfy the condition that the intensity of radiation emitted by the laser and then present in the cavity should be much higher that the saturation condition, the saturation condition may be calculated, if desired. The saturation intensity is given by, in Wm$^{-2}$:
a) Homogeneous case (i.e. $w_G \ll w_L$):

$$I_s = \frac{c\varepsilon_o \hbar^2 \gamma_{//}}{2\mu_{ba}^2}\frac{\gamma_{//}}{g_o}\frac{2\gamma_R + \gamma_{//}}{\gamma_R + \gamma_{//}} \qquad (\text{Eq. 6})$$

with:
$\varepsilon_o$ is the vacuum electric permittivity, in C$^2$m$^{-1}$J$^{-1}$
$\hbar$ is the Plank constant/($2\pi$), in Js
c is the vacuum velocity of light, in m/s
$g_o$ defined as above ($g_o = L_o$, when the lineshape is essentially Lorentzian)
$\mu_{ba}$ is the electrical dipole of the absorbent transition, in Cm
$\gamma_R$ is the relaxation rate due to collision that redistribute the population between the different rotational sublevels inside the same upper and lower vibrational states, in s$^{-1}$
$\gamma_{//}$ is the population decay rate from the upper to the lower state, in s$^{-1}$
In the case of $\gamma_{//} \ll \gamma_R$ and for upper rotational quantum number J' equal to J or J−1, with J rotational number off the lower level (as trace gas detection of $^{14}CO_2$ by using the (00$^0$1-00$^0$0) P(20) transition)

$$I_s \cong \frac{c\varepsilon_o \hbar^2}{\mu_{ba}^2}\frac{\gamma_{//}}{g_o} = \frac{c\hbar k_o^3}{\pi A_{ba}}\frac{\gamma_{//}}{g_o} \qquad (\text{Eq. 7})$$

with:
  $\varepsilon_o$, $\hbar$, c, $\mu_{ba}$, $g_o$, $\gamma_{//}$ defined as above
  $k_0$ is the wave vector of the light at $\nu_0$, in $m^{-1}$
  $A_{ba}$ is the Einstein A coefficient of the absorbent transition, in $s^{-1}$ b) Inhomogeneous case (i.e. $w_G \gg w_L$):

$$I_s = \frac{c\varepsilon_o \hbar^2}{2\mu_{ba}^2} \frac{2\gamma_R + \gamma_{//}}{\gamma_R + \gamma_{//}} \gamma_\perp \gamma_{//} \qquad \text{(Eq. 8)}$$

with:
  $\varepsilon_o$, $\hbar$, c, $\mu_{ba}$, $\gamma_R$ and $\gamma_{//}$ defined as above
  In the case of $\gamma_{//} \ll \gamma_R$ and for J' equal to J or J−1

$$I_s \cong \frac{\hbar k_o^3}{\pi A_{ba}} \gamma_R \gamma_{//} \qquad \text{(Eq. 9)}$$

with:
  $\hbar$, c, $k_0$, $A_{ba}$, $\gamma_R$ and $\gamma_{//}$ defined as above.

c) Intermediate case (i.e. $w_G \approx w_L$):
The coefficient $I_s$ is the saturation intensity, given by $$I_s = \frac{c\varepsilon_o \hbar^2}{2\mu_{ba}^2} \frac{\gamma_{//}}{g_o} \frac{2\gamma_R + \gamma_{//}}{\gamma_R + \gamma_{//}} \cong \frac{c\varepsilon_o \hbar^2}{\mu_{ba}^2} \frac{\gamma_{//}}{g_o} \qquad \text{(Eq. 10)}$$

where $\gamma_R$ is the relaxation rate due to collision that redistribute the population between the different rotational sublevels inside the same upper and lower vibrational states, while $\gamma_{//}$ is the population decay rate from the upper to the lower state. The last quasi-equality holds when $\gamma_{//} \ll \gamma_R$.

Next, we have to consider that in a high-finesse cavity the gas interact with a laser beam that in the best condition has a $TEM_{00}$ profile with an intensity given by $$I(\rho,t) = I_0(t) e^{-2(\rho/w)^2} \qquad \text{(Eq. 11)}$$

Where $\rho = \sqrt{x^2+y^2}$ is the radial coordinate and $I_0(t) = I(\rho=0, t)$ is the peak intensity taking as axis z the axis of cavity, while w is the spot size radius of the laser beam, i.e. the radius for which the amplitude of the field is 1/e times that of the axis. Moreover, w is considered to be constant along axis z in the cavity. The power of the beam is $$P(t) = \frac{\pi w^2}{2} I_0(t) \qquad \text{(Eq. 12)}$$

The dependence on time t remembers that in a CRD event the intensity decays as consequence of the interruption of the laser beam that is sent into the cavity.

A saturation power is defined, in watt:

$$P_s = \frac{\pi w^2}{2} I_s \qquad \text{(Eq. 13)}$$

where w is the spot size radius of the laser beam, i.e. the radius for which the amplitude of the field is 1/e times that of the axis, in m as well as a saturation parameter $$Z = \frac{I}{I_s} = \frac{P}{P_s} \qquad \text{(Eq. 14)}$$

where I and P intensity and power of absorbed light, respectively as defined in the above equations (11) and (12).

For developing the following formulas, two approximation may be done, according to the case:
  1) adiabatic approximation: the relaxation rate of the molecular population and coherence $\gamma_{//}$, $\gamma_R$ and $\gamma_\perp$ are greater than the power relaxation rate $\gamma_c$ of the radiation inside de cavity;
  2) local approximation: due to molecular collisions, the diffusion time across the laser beam is slower than the relaxation time of the molecular population in the exited state. In other words, the molecules have a negligible displacement with respect to the beam size during the time interval necessary to approximate their equilibrium condition with the radiation.

For the above adiabatic approximation the dependence on t is negligible in a round trip time of the radiation inside the cavity, therefore such dependence is omitted here.

Eq. (12) of the intracavity power decay in case of non-linear losses can be rewritten as:

$$P(t) = P(0) \exp(-\gamma_c t) f(t) \qquad \text{(Eq. 15)}$$

with:
  P(0) intracavity power at the beginning of the decay event, in W
  $\gamma_c$ defined in eq. (1)
  $f(t)$ with $f(0)=1$ is the non-linear faction which takes into account the non-linear effects as saturation.

According to theory, still in a saturation condition, that is in an intracavity saturated absorption where $P(0) \gg P_S$ defined in Eq. (13) and $I \gg I_s$, the absorption coefficient in $cm^{-1}$ of Eq. (3) and the intracavity power of equation (15) follows the following equations in the three different experimental conditions named above a), b) and c).

a) homogeneous regime ($w_L \gg w_G$)
  In this regime, both adiabatic and local approximation are applied.

$$\alpha_g(\nu - \nu_o, I) = \alpha_o L_o \frac{\bar{L}(\nu - \nu_o, w_R)}{1 + \frac{I}{I_s} \bar{L}(\nu - \nu_o, w_R)} \qquad \text{(Eq. 16)}$$

with:
  $\nu$, $\nu_o$, $w_R$, $g_o$, $\bar{g}(\nu-\nu_o, w_R)$, $\alpha_o$ and $I_s$ defined as above
  I is the instantaneous intracavity intensity, in $W/m^2$ $$\frac{dP}{dt} = -\gamma_c P - \gamma_g(\nu - \nu_o) \frac{\ln\left[1 + \frac{P}{P_s} \bar{g}(\nu - \nu_o, w_R)\right]}{\frac{P}{P_s} \bar{g}(\nu - \nu_o, w_R)} P \qquad \text{(Eq. 17)}$$

with:
  $\gamma_g(\nu - \nu_o) = c\alpha_o g(\nu - \nu_o, w_R)$
  $\nu$, $\nu_o$, $w_R$, $g_o$, $g(\nu-\nu_o, w_R)$, $\bar{g}(\nu-\nu_o, w_R)$, $\gamma_c$ and $P_s$ defined as above
  The resonance profile g both appears in $\gamma_g$ and in the fraction of Eq. (17). This fraction represents the non-linear saturation term and its value tends to 1 as $P/P_s \to 0$. In such case, integration of Eq. (17) produces a truly exponential behavior, as for conventional CRD spectroscopy. On the other hand, this fraction tends to 0 as $P/P_s \to \infty$, which corresponds to the case of strong saturation, when the gas becomes transparent to laser radiation.

In SCAR experiments, the measured decay signal extends over several decades in amplitude, with a S/N ratio mainly limited by the resolution of the A/D converter. Such signal must be fitted by the power decay function resulting from integration of Eq. (17). To this purpose, it is more convenient to factorize intracavity power into the two terms of Eq. (15), obtaining:

$$\frac{df}{dt} = -\gamma_g(v - v_o)\frac{\ln[1 + Z_o \overline{g}(v - v_o, w_R)\exp(-\gamma_c t)f]}{Z_o \overline{g}(v - v_o, w_R)\exp(-\gamma_c t)} \quad \text{(Eq. 18)}$$

with:
$v$, $v_o$, $w_R$, $g_o$, $\overline{g}(v-v_o, w_R)$, $\gamma_c$ and $\gamma_g(v-v_o)$ defined as above $$Z_o = \frac{P(0)}{P_s}$$

is the saturation parameter at the beginning of the decay for the saturation power at the center of the absorbent transition.

The new function $f$ takes into account deviation from a purely exponential decay, at rate $\gamma_c$, of the experimental SCAR signal due to the saturated gas absorption. The much smaller dynamic range of the $f$ function allows to determine the gas absorption decay rate $\gamma_g$ with a lower uncertainty.

b) inhomogeneous regime ($w_G \gg w_L$)

$$\alpha_g(v-v_o, I) = \alpha_o \frac{G(v-v_o, w_G)}{\sqrt{1 + \frac{I}{I_s}}} \quad \text{(Eq. 19)}$$

with:
$v$, $v_o$, $w_G$, $G(v-v_o, w_G)$, $\alpha_o$, $I$ and $I_s$ defined as above Like the homogeneous case, the interaction of the molecules with a TEM$_{00}$ mode of the radiation inside a cavity have to be considered. Therefore also for the following expressions, the validity of the above mentioned adiabatic approximation is assumed. Instead two further cases are considered:
the density of the gas is still large enough to allow the above mentioned local approximation
the gas density is low enough to let the molecules cross the laser beam without any collision.
First case: still diffusive gas (collisions are present during gas-laser interaction, $w_L < w_G$)
The local approximation is still valid.

$$\frac{dP}{dt} = -\gamma_c P - \gamma_g(v-v_o)\frac{2}{\sqrt{1 + \frac{P}{P_s}} + 1}P \quad \text{(Eq. 20)}$$

with:
$P_s$ and $\gamma_c$ defined as above
$\gamma_g(v-v_0) = c\alpha_o G(v-v_o, w_G)$
or in terms of Eq. 15

$$\frac{df}{dt} = -\gamma_g(v-v_o)\frac{2}{\sqrt{1 + Z_o \exp(-\gamma_c t)} + 1}f \quad \text{(Eq. 21)}$$

with:
$Z_o$, $\gamma_c$ and $\gamma_g(v-v_o)$ defined as above
Second case: non-diffusive gas (collisions are not present during gas-laser interaction, $w_L \ll w_G$)
In the second case, when the pressure is very low, so that the molecules pass through the beam without collisions, the local approximation fails. In this case we can roughly approximate the interaction assuming an "average" intensity along the path, say x, of the individual molecules in the term $I/I_s$ at the denominator. The integration of the starting equation for P becomes not analytic, however it is well approximated by $$\frac{dP}{dt} = -\gamma_c P - \gamma_g(v-v_o)\frac{1.4256}{\sqrt{1 + \frac{P}{2P_s}} + 0.4256}P \quad \text{(Eq. 22)}$$

with:
$P_s$, $\gamma_c$ and $\gamma_g(v-v_o)$ defined as above
or in terms of Eq. 15:

$$\frac{df}{dt} = -\gamma_g(v-v_o)\frac{1.4256}{\sqrt{1 + 0.5 Z_o \exp(-\gamma_c t)f} + 0.4256}f \quad \text{(Eq. 23)}$$

with:
$Z_o$, $\gamma_c$ and $\gamma_g(v-v_o)$ defined as above.

For each frequency of the electromagnetic radiation emitted by the laser, a SCAR measurement is made, i.e. the decay signal of the radiation leaking out of the cavity is measured. As a result of each SCAR experiment, for each wavelength, a saturated cavity ring-down signal for each spectral frequency, namely a $S_{exp}(t; \delta v_i)$, is obtained. It is a result of the detection of the cavity-transmitted power due to cavity ring-down decay. The behavior of $S_{exp}(t; \delta v_i)$ is described by the integration of a differential equation which takes into account the spectroscopic dominant processes of the targeted absorption transition depending on the gas temperature and pressure conditions, as detailed below. Imposing a specific behavior to this function which is the fit of the SCAR measurements, allows to obtain a proper determination of the gas concentration.

The behaviour over time t of the SCAR decay function S, known the selected frequency of the laser beam, the resonance frequency, the thermodynamic conditions of pressure and temperature of the target gas, depends on the following parameters:

$S(t)$=function of $t; \gamma_c, \gamma_g, Z_o, \overline{g}, B, A_d = CP(0)$

It may be factorized, for practical reasons in the fit, in U $S(t) = B + CP(0)e^{-\gamma_c t}f(t; \gamma_c, \gamma_g, Z_o, \overline{g})$ (Eq. 24)

with
B is the detection background, in U
C is the detection conversion factor U/W P(0), $\gamma_c$, $\gamma_g$ and $\bar{g}$ defined as above $$Z_o = \frac{CP(0)}{CP_s}$$

is the saturation parameter at the begin of the decay event and at the frequency of the absorbent transition, in U In the following, we denote as laser frequency detuning with respect to the frequency of the absorbent transition, in Hz, as $$\delta v_i = (v_i - v_o) \quad \text{(Eq. 25)}$$

The experimental situation is a SCAR experiment in a gas mixture that can have l=0 . . . n absorptions in the spectral range measured, that is inside the cavity there is not only the target gas the concentration of which is to be measured, but also other gases with their transition lines, which are in this case a "noise" which distorts the decay function to be measured. This is the more general case, typically found in the trace gas detection experiments, where the sample gas is a mixture of gases that can absorb resonant light inside of cavity. The l=0 . . . n absorption transitions in the detected spectral range $\{\delta v_{min} \ldots \delta v_{max}\}$ are considered, with:

l=0 is the transition corresponding to the target gas, with the corresponding $N_l$ density to be determined;

l=1 . . . n are the transitions of other gases, which interfere with the target one, possibly introducing an error in the measured absorption area.

For each laser detuning, that is for each frequency $v_i$ selected by the laser in a neighbourhood of the resonance frequency of interest $v_0$ where $\delta v_i = v_i - v_0$ the SCAR decay can be fitted by the following curve, which is a generalization of the equation (24):

$$S(t;p(\delta v_i)) = B(\delta v_i) + A_d(\delta v_i)e^{-\gamma_c(\delta v_i)t}f(t;\gamma_c(\delta v_i), A_d(\delta v_i), \gamma_g(\delta v_i), p_l(v_i)) \quad \text{(Eq. 26)}$$

with:

$p(\delta v_i)$ is the set of parameters that define the SCAR decay behavior:

$$p(\delta v_i) = \{B(\delta v_i), A_d(\delta v_i), \gamma_c(\delta v_i), \gamma_g(\delta v_i), p_l(v_i))\}, l=0 \ldots n \quad \text{(Eq. 27)}$$

$B(\delta v_i)$ is the detection background, in U $A_d(\delta v_i)$ is the amplitude of the decay signal at the begin of the decay event, in U $\gamma_c(\delta v_i)$ and $\gamma_g(\delta v_i)$ defined as above $p_l(v_i)$ are n-set of parameters that defines each absorbent transition $$p_l(v_i) = \{(Z_{1U})_l \bar{g}_l(v_i - v_l, w_{Rl})\}, l=0 \ldots n \quad \text{(Eq. 28)}$$

And the following factorization for $Z_o$ has been used:

$$Z_o = \frac{CP(0)}{CP_s} = A_d Z_{1U} \quad \text{(Eq. 29)}$$

C is the detection conversion factor U/W $A_d = CP(0)$ is the amplitude of the decay signal at the begin of the decay event, in U $$Z_{1U} = \frac{1}{CP_s}$$

is the saturation parameter for an amplitude $A_d = 1$ U, in U $f$ the non-linear function that follow one of the rate equations and depending of the gas conditions is described by:

homogeneous regime ($w_L \geq w_G$)

$$\frac{df}{dt} = -\gamma_g(\delta v_i) \sum_{l=0}^{n} \frac{\ln[1 + A_d(\delta v_i)(Z_{1U})_l \bar{g}_l(v_i - v_l, w_{Rl})e^{-\gamma_c(\delta v_i)t}f]}{A_d(\delta v_i)(Z_{1U})_l \bar{g}_l(v_i - v_l, w_{Rl})} \quad \text{(Eq. 30)}$$

which is a generalization of Eq. 18 for l=0 . . . n transitions with $(Z_o)_l = A_d(Z_{1U})_l \bar{g}_l$ inhomogeneous regime still diffusive gas ($w_L < w_G$)

$$\frac{df}{dt} = -\gamma_g(\delta v_i) \sum_{l=0}^{n} \frac{2}{\sqrt{1 + A_d(\delta v_i)(Z_{1U})_l e^{-\gamma_c(\delta v_i)t}f} + 1} f \quad \text{(Eq. 31)}$$

which is a generalization of Eq. 21 for l=0 . . . n transitions with $(Z_o)_l = A_d(Z_{1U})_l$ non-diffusive gas ($w_L \ll w_G$)

$$\frac{df}{dt} = -\gamma_g(\delta v_i) \sum_{l=0}^{n} \frac{1.4256}{\sqrt{1 + 0.5 A_d(\delta v_i)(Z_{1U})_l e^{-\gamma_c(\delta v_i)t}f} + 0.4256} f \quad \text{(Eq. 32)}$$

which is a generalization of Eq. 23 for l=0 . . . n transitions with $(Z_o)_l = A_d(Z_{1U})_l$ In the case of only the target transition is detected, Eqs. 30-32 are applied for l=0.

The above equation is in "U" unit, that is 1 U=1 physical unit, either volt or microampere, depending on the kind of front-end electronics used for the detection.

Now for the finding the function S, that is, for the finding of the values of the parameters on which the function S depends, in order to find the correct S based on the experimental data, the method of the invention is used.

The fitting procedure uses a routine that includes Eq. (26) and any of equations Eq. (30-32), depending on the physical situation, thus reproducing the decay signals to be compared with the experimental ones. This routine is called by a fitting program to estimate the values of the parameters: B, $A_d$, $\gamma_c$, $\gamma_g$, $Z_{1U}$ and $\bar{g}$.

In both cases $\gamma_g$ contains implicitly the dependence on the line-shape g, however there is an important difference in the expression of $f$. In the homogeneous case the initial saturation parameter $Z_o = A_d Z_{1U} \bar{g}$ depends on the line-shape, while in the inhomogeneous case, with $Z_o = A_d Z_{1U}$, it does not.

Therefore, in the inhomogeneous case, the experimental line profile $\gamma_g$ can be obtained by fitting the each decay signal S(t) independently at a number of different laser frequencies.

Instead, unfortunately, for the homogeneous case, the line profile parameters are difficult to fit or even to impose as fixed values in the procedure. Indeed, interferences from other molecular resonances, as well as residual instrumental non-linearity, strongly affect the determination of the line profile, when the absorption is very weak, as in the case of trace gas detection. As a consequence, artifacts in the fitted line shape are observed, and further approximations must be done.

In the following, the method of the invention can be applied to any of the physical conditions, that is, both in the homogeneous and in the inhomogeneous case, however it is particularly advantageous in homogeneous case, which in particular is useful for radiocarbon dioxide detection, and their effects on concentrations retrieval.

According to a first aspect, the invention relates to a method of ring-down spectroscopy in saturated-absorption condition, for measuring a first concentration of a gas through a measurement of the spectrum of a molecular transition of said gas, the method comprising the steps of:

inserting said gas whose first concentration is to be measured in a resonant cavity comprising two or more reflecting mirrors arranged so as to form a closed optical path for an electromagnetic radiation emitted by a laser source;

tuning the frequency of said electromagnetic radiation emitted by said laser source so as to fix it to a value $v_i$ within a range of frequencies $[v_{min}, v_{max}]$ including the resonance frequency of said molecular transition $v_0$;

fixing the intensity of said electromagnetic radiation in the cavity at a value much greater than the saturation intensity $I_s$ of the molecular transition to be detected;

irradiating said gas by means of said electromagnetic radiation beam emitted by said laser source having said fixed frequency $v_i$ and intensity in said resonant cavity;

coupling said electromagnetic radiation to said cavity so as to obtain a laser-cavity resonance condition;

changing the frequency of the electromagnetic radiation emitted by the laser so as to switch off the laser-cavity resonance;

detecting an electromagnetic radiation beam in output from said cavity after the laser-cavity resonance has been switched off;

recording a plurality of data representative of said output which has the form of a decay signal;

considering a fitting curve $S(t, \delta v_i)$ for the recorded decay which depends on the following parameters:

$B(\delta v_i)$ is the detection background, with $(\delta v_i = v_i - v_0)$ $A_d(\delta v_i)$ is the amplitude of the decay signal at the beginning of the decay event, $\gamma_c(\delta v_i)$ is the cavity decay rate due to non-resonant and non-saturable losses (empty cavity decay rate);

$\gamma_g(\delta v_i)$ is contribution of the targeted molecular transition to the decay signal;

$\bar{g}$ is the peak normalized line profile $\bar{g}(v-v_o, w_R)$ centered at the molecular resonance frequency $v_0$ and $w_R$ is the HWHM width of the resonance, and $w_R = w_L$ for a Lorentzian shape, $w_R = w_G$ for a Gaussian shape, $w_R = \{w_L, w_G\}$ for a Voigt shape;

$$Z_o = \frac{CP(0)}{CP_s} = A_d Z_{1U}$$

is the saturation parameter at the beginning of the decay event and at the frequency of the targeted molecular transition $v_0$, P(0) is the intracavity power at the beginning of the decay signal; and $$P_s = \frac{\pi w^2}{2} I_s$$

is the saturation power, where w is the spot size radius of the laser beam, i.e. the radius for which the amplitude of the field is 1/e times that of the axis and $I_s$ the saturation intensity;

replacing $Z_{1U}\bar{g}(v-v_0, w_R)$ in the function $S(t, \delta v_i)$ with a constant value $Z_{1Ueff}$=constant of a predetermined value;

fitting said recorded data with a function $S^{repl}(t, \delta v_i)$ in which $Z_{1Ueff}$=constant replaces $Z_{1U}\bar{g}(v-v_o, w_R)$ in the fitting function $S(t, \delta v_i)$.

According to this first aspect, the SCAR measurement is performed first of all selecting a laser frequency in a neighborhood of the transition frequency, that is of the absorption frequency of the target gas of interest. The absorption frequency is called as above $v_0$ and the selected frequency $v_i$. The difference $v_i - v_0$ is called $\delta v_i$ and it is called a "detuning" from resonance, meaning that for this selected frequency there is not a perfect laser-gas resonant condition. It is to be understood that a selected frequency of the laser radiation can almost precisely coincide with the resonant frequency, that is, it is also encompassed the case $v_i = v_0$.

Typically, the scan is preferably approximately from −5 to +5 HWHM Lorentzian widths or from −3 to +3 HWHM Gaussian widths, the largest of the two. For detection of radiocarbon is also preferable to extend the range beyond the interfering resonance of $N_2O$, then preferably the scanning should extend at least from −250 MHz to +400 MHz around the target radiocarbon resonance P(20).

The target gas inside the cavity, which is brought to a cavity-laser resonance condition, is in a saturation condition, that is, the intensity of the radiation inside the cavity is such that $I \gg I_S$. The value of $I_s$ to be considered depending on the experimental conditions of the gas, that is, it is calculated according to one of equations (6) or (8). Pressure and temperature in the cavity are thus known parameters.

In order to measure the SCAR decay, that is, the "cavity ring down decay in saturated condition", the laser-cavity resonance is switched off, for example switching off the laser or changing the frequency of the emitted radiation. Once switched off the laser-cavity resonance, the radiation exiting the cavity, which represents a decay, is detected and corresponding data are collected.

Indeed, as above shown describing the apparatus of the invention, from the experimental point of view, SCAR does not differ from other conventional CRD experiments. Laser light is coupled to a high-finesse Fabry-Perot cavity up to a threshold level, and then it is quickly switched off a cavity resonance. Transmitted ring-down light signal $S_{exp}(t, v)$ is detected and the decay rate is measured. If a molecule inside of the cavity absorbs coupled light, the loss rate due to such absorption is measured as an increase of the empty cavity loss rate. What is different in SCAR is that saturation effects of the molecular absorption induce a deviation of the ring-down signal from the perfectly exponential behavior, as expected for linear intracavity losses. Indeed, when the ring-down signal that contains saturated molecular absorption is fitted to an exponential function, the residuals differ strongly from a flat behavior. Instead, a fit to a decay function which takes into account non-linear absorption effects, gives a flat residual plot, hence explaining the physical effect of the saturated molecular transition.

Thus for each selected frequency of the laser in a neighborhood of the resonance frequency of the transition of interest in the target gas, a plurality of data is obtained. Preferably the laser emits in an infrared range.

The detected signal can be expressed in some physical unity "U", such that i.e. 1U=1 volt or 1U=1 microampere. In the following 1U has the meaning of 1 physical unity. Therefore the signal is given by:

For each frequency of the electromagnetic radiation emitted by the laser, a SCAR measurement is made, i.e. the decay signal of the radiation leaking out of the cavity is measured. As a result of each SCAR experiment, a saturated cavity ring-down signal for each spectral frequency, namely a $S_{exp}$, is obtained. It is a result of the detection of the cavity-transmitted power due to cavity ring-down decay. The behavior of $S_{exp}$ is described by the integration of a differential equation which takes into account the spectroscopic dominant processes of the targeted absorption transition depending on the gas temperature and pressure conditions, as detailed below. Imposing a specific behavior to this function which is the fit of the SCAR measurements, allows to obtain a proper determination of the gas concentration.

Each detected SCAR decay data $S_{exp}(t; \delta v_i)$ at each $\delta v_i$ detuning is to be fitted with a function $S(t; p(\delta v_i))$ which is in a preferred embodiment parameterized as (see again equation (26)):

$$S(t;p(\delta v_i))=B(\delta v_i)+A_d(\delta v_i)e^{-\gamma_c(\delta v_i)t}f(t;\gamma_c(\delta v_i),A_d(\delta v_i),\gamma_g(\delta v_i),Z_{1Ueff})$$

Which in principle depends on the following parameters $p(\delta v_i)$, which is set of parameters that define the SCAR decay behavior:

$$p(\delta v_i)=\{B(\delta v_i),A_d(\delta v_i),\gamma_c(\delta v_i),\gamma_g(\delta v_i),Z_{1Ueff}\}$$

$f$ is the non-linear function that follows one of the equations (30-32) depending of the target gas experimental conditions (and imputed in the equation).

The fact that the behaviour of the function is the one of equation (26) is determined by the physics of the processes involved. The behavior of the $f$ function is to be determined by using the physics theory that takes into account the saturated absorption phenomena inside the cavity. Within this theory, the interaction between laser light and molecules for the targeted absorption transition must be analyzed in the frame of the total pressure and temperature conditions of the gas inside the cavity and of the laser power and spatial profile.

Therefore, in order to obtain the concentration of the gas of interest, the SCAR decay data are to be fitted by the function which has the form of equation (26) and at the same time satisfy any of the differential equations of Eq. (30)-(32). That is to say that the following considerations regarding the method of the invention are independent on the specific differential equation that the function $f$ has to satisfy. The differential equation to be satisfied depends on the specific physic phenomenon taking place during the experiment which depends on the experimental conditions.

However, Applicants have realized that performing a fit of eq. (26) to obtain a function S, an extremely complex numerical calculation is necessary. Substantially, the presence of so many parameters which are frequency-dependent does not allow a convergence towards a reasonable result. Therefore, Applicants have developed a method that allows real-time determination of $\gamma_g$ for each spectral frequency.

This method tries to fix the problem of the proper frequency dependence of the saturation parameter, which can be strongly correlated with $\gamma_g$ parameter. As a consequence, strong distortion of the wings of the spectral profile can be observed, and hence a wrong determination of the integrated absorption area. To solve this problem, the method of the invention defines a frequency independent saturation parameter, the effective saturation parameter $Z_{1Ueff}$ that takes the place of the product $Z_{1U}\bar{g}(v-v_o,w_R)$. This $Z_{1Ueff}$ is to be determined in each experimental spectral situation, and it is a fixed parameter in the fitting routine for all spectral frequencies.

In other words, $\bar{g}(v_i-v_o,w_R)$ is not any more a parameter of the fitting routine (more precisely, the line center and linewidth that characterizes this function are fixed).

Applicants have found that with this approximation, that is, keeping the value of the $\bar{g}(v_i-v_o,w_R)$ constant to a given value initialized before the fitting routine, the fit generally converges. Although an approximation is made, the results on the concentration of gas, also at very low concentration is rather accurate, with a much higher accuracy than in standard ring-down spectroscopy.

Preferably, at the end of the fitting routine, the following parameters are obtained:

$B(\delta v_i)$ is the detection background, with $(\delta v_i = v_i - v_0)$, $A_d(\delta v_i)$ is the amplitude of the decay signal at the beginning of the decay event, $\gamma_c(\delta v_i)$ is the cavity decay rate due to non-resonant and non-saturable losses (empty-cavity decay rate), $\gamma_g(\delta v_i)$ is the contribution of the targeted molecular transition to the decay signal.

In the fitting routine, all the other parameters on which the decay signal depends are of course free and from the fitting their value is determined. An important parameter is the last one which is connected to the gas concentration, as shown in equation (1).

Preferably, the method of the invention includes the step of parametrizing said $S_{rep}(t, v_i)$ as:

$$S(t;p(\delta v_i))=B(\delta v_i)+A_d(\delta v_i)e^{-\gamma_c(\delta v_i)t}f(t;\gamma_c(\delta v_i),A_d(\delta v_i),\gamma_g(\delta v_i),Z_{1Ueff})$$

where $p(\delta v_i)$ is the set of parameters free during the fit $$p(\delta v_i)=\{B(\delta v_i),A_d(\delta v_i),\gamma_c(\delta v_i),\gamma_g(\delta v_i)\}$$

$B(\delta v_i)$ is the detection background, $\gamma_g(\delta v_i)$ is the contribution of the targeted molecular transition to the decay signal, $A_d(\delta v_i)$ is the amplitude of the decay signal, $\gamma_c(\delta v_i)$ is the cavity decay rate due to non-resonant and non-saturable losses, while the following are determined before the fitting:

$Z_{1Ueff}$ is the effective saturation parameter, fixed during the fit and equal to a constant;

$f$ the non-linear function that follows one of the below rate equations depending of the gas conditions:

homogeneous regime ($w_L \geq w_G$)

$$\frac{df}{dt} = -\gamma_g(\delta v_i)\frac{\ln[1+A_d(\delta v_i)Z_{1Ueff}e^{-\gamma_c(\delta v_i)t}f]}{A_d(\delta v_i)Z_{1Ueff}}$$

inhomogeneous regime
still diffusive gas ($w_L < w_G$)

$$\frac{df}{dt} = -\gamma_g(\delta v_i)\frac{2}{\sqrt{1+A_d(\delta v_i)Z_{1Ueff}e^{-\gamma_c(\delta v_i)t}f}+1}f$$

non-diffusive gas ($w_L \ll w_G$)

$$\frac{df}{dt} = -\gamma_g(\delta v_i)\frac{1.4256}{\sqrt{1+0.5A_d(\delta v_i)Z_{1Ueff}e^{-\gamma_c(\delta v_i)t}f}+0.4256}f$$

The parametrization of the fitting curve S has been chosen by the Applicants due to the physical constraints that determine the shape of the decay signal, and thus which should also determine the shape of the fitting curve, in this case the behavior of the $f$ function ($f$ function which is chosen among the three above listed depending on the experimental conditions). Selecting such a parametrization allows an easier convergence during the fitting procedure. The $f$ functions of Eqs. (30)-(32) have been rewritten in function of the fixed parameter $Z_{1Ueff}$.

In FIG. 1, the flowchart of this fitting procedure is shown. This method tries to fix the problem of the proper frequency dependence of the saturation parameter ($Z_{1U}$), which can be strongly correlated with $\gamma_g$ parameter. As a consequence, strong distortion of the wings of the spectral profile can be observed, and hence a wrong determination of the integrated absorption area. To solve this problem, ESPS defines a frequency independent saturation parameter, the effective saturation parameter $Z_{1Ueff}$, equal for all l transitions, which must be determined in each experimental gas conditions following the calibration routine described below (sec. 2.1), and it is a fixed parameter in the fitting routine for all laser detunings.

Preferably, the peak normalized line profile $\bar{g}(v-v_o, w_R)$ centered at the molecular resonance frequency $v_0$ has either a Lorentzian shape, a Gaussian shape, or a Voigt shape depending on the experimental conditions.

The line profile function shapes include Lorentzian, Gaussian and Voigt functions, whose parameters are the line position, maximum height and half-width. Actual line shapes are mainly determined by Doppler, collision and proximity broadening. For each system the half-width of the shape function varies with temperature and pressure (or concentration).

The peak normalized line profile is therefore either a Lorentzian, Gaussian or Voigt function depending on the experimental conditions as better clarified below. However, for the present invention, the line profile can be any line profile, because the teaching of the Invention can be applied to any of those. In order to minimize correlation effects, this parameter is fixed in the fitting routines (more correctly, the spectral parameters of line center and linewidth that characterized the profile are fixed). The initialization value for this parameter could be determined by considering the broadening mechanisms on the targeted transition. Alternatively, an experimental determination is performed.

Preferably, said fitting is a least squares fitting. More preferably, said least square fitting uses the Levenberg-Marquardt (L-M) algorithm.

This method considers the set of parameters $p^{fr}(\delta v_i)$ to be fitted (i.e. free in the least square fitting method, such as in the L-M algorithm) and $Z_{1Ueff}$ fixed during fit, i.e.

$$p(\delta v_i) = \{p^{fr}(\delta v_i), Z_{1Ueff}\} = \{B^{fr}(\delta v_i), A_d^{fr}(\delta v_i), \gamma_c^{fr}(\delta v_i), \gamma_g^{fr}(\delta v_i), Z_{1Ueff}\} \quad \text{(Eq. 33)}$$

This are the parameters on which the SCAR decay signals depend, with the exception of $Z_{1Ueff}$ which has been set equal to a known constant n.

The L-M algorithm performs this fit by minimizing $\chi^2(p(\delta v_i))$ in the t variable in the space of the free parameters $p^{fr}(\delta v_i)$ (see FIGS. 2 and 3):

$$\chi^2(p(\delta v_i)) = \sum_{t_k=0}^{t_{max}} \frac{(S_{exp}(t_k; \delta v_i) - S(t_k; p(\delta v_i)))^2}{\sigma_{exp}^2(t_k; \delta v_i)} \quad \text{(Eq. 34)}$$

where $\sigma_{exp}(t; \delta v_i)$ is the uncertainty of the detected decay $S_{exp}(t; \delta v_i)$.

One of the possible routines is the following (see FIG. 3):
1) Consider the detected SCAR curve $\{S_{exp}(t; \delta v_i), \sigma_{exp}(t; \delta v_i)\}_j$ for a sample that contains the target gas at the thermodynamic conditions (Pressure, Temperature)
2) Initialization procedure:
   Set the initial free parameters to:

$$p_j^{ini}(\delta v_i) = \{B^{ini}(\delta v_i), A_d^{ini}(\delta v_i), \gamma_c^{ini}(\delta v_i), \gamma_g^{ini}(\delta v_i)\}_j^{ini}$$

Set the $Z_{1Ueff}$ parameter to a pre-defined calibrated value, and keep it fixed during all fit procedure.
   Other initializations: L-M limit convergence values, $\lambda_{max}, \delta \chi_{max}^2, \chi_{min}^2$ and maximum number of interactions $N_{itr}$
3) Minimization loop on $p_j^{fr}(\delta v_i)$
   Try as initial guess of the free parameters $p_j^{try}(\delta v_i) = p_j^{ini}(\delta v_i)$ and uses the L-M routine to obtain a fitted set of parameters $p_j^{fit}(\delta v_i)$.

We follow the procedure depicted in the flowchart of FIGS. 2 and 3.
   a) $p(\delta v_i) = \{p_j^{try}(\delta v_i), Z_{1Ueff}\}$. Calculate the $\chi^2(p(\delta v_i))$ (Eq. 34), gradient $\beta(p(\delta v_i))$ and the curvature matrix, $|\alpha|(p(\delta v_i))$. Here, the temporal interval of the decay under analysis, $[0, t_{max}]$ is divided in $t_k$ points at intervals of $\Delta t$. For each $t_k$, the routine calculates:
       The numerical integration of the differential equation for $f(t_k; p(\delta v_i))$ (Eqs. 30-32 depending of the case applies). We use a fourth-order Runge-Kutta (RK4) routine for such numerical integration but other integration routines can be used.
       The expected $S(t_k; p(\delta v_i))$ values by using the Eq. (26).
       By considering $S_{exp}(t_k; \delta v_i)$ and $\sigma_{exp}(t_k; \delta v_i)$ as input values, the summations of the $\chi^2(p(\delta v_i))$, $\beta(p(\delta v_i))$ and $|\alpha|(p(\delta v_i))$ are updated.
       The above three steps are repeated until $t_k = t_{max}$.
   b) Solve the linear Eqs. of the L-M algorithm for the present problem, and calculate $\delta p(\delta v_i)$ and $\chi^2(p(\delta v_i) + \delta p(\delta v_i))$
   c) Follow the L-M convergence criteria on $\lambda$ and/or $\chi^2$ as described in the L-M method. If not converging come back to step a) with an update value of $\lambda$ and/or $p_j^{try}(\delta v_i) = p(\delta v_i) + \delta p(\delta v_i)$.
   d) At convergence, a fitted set of parameters equal to the last guess is determined $$p_j^{fit}(\delta v_i) = p_j^{try}(\delta v_i)$$

4) As a result, the absorption decay rate parameters is determined: $|\gamma_g(\delta v_i)|_{j=1}^{d*m}$ with uncertainties $$|\sigma_{\gamma_g}(\delta v_i)|_{j=1}^{d*m}$$

Preferably, the method of the invention includes:
4) As a result, the absorption decay rate parameters is determined: $|\gamma_g(\delta v_i)|_{j=1}^{d*m}$ with uncertainties $$|\sigma_{\gamma_g}(\delta v_i)|_{j=1}^{d*m}$$

Preferably, the method of the invention includes:
Changing the frequency of the electromagnetic radiation emitted by the laser to a frequency $v_{i+d}$ where $v_{i+d}$ belongs to $[v_{min}, v_{max}]$ and repeating the steps of
   fixing the intensity of said electromagnetic radiation in the cavity at a value much greater than the saturation intensity $I_s$ of the molecular transition to be detected;
   irradiating said gas by means of said electromagnetic radiation beam emitted by said laser source having said fixed frequency $v_{i+d}$ and intensity in said resonant cavity;

coupling said electromagnetic radiation to said cavity so as to obtain a laser-cavity resonance condition;

changing the frequency of the electromagnetic radiation emitted by the laser so as to switch off the laser-cavity resonance;

detecting an electromagnetic radiation beam in output from said cavity after the laser-cavity resonance has been switched off;

recording a plurality of data representative of said output which has the form of a decay signal;

fitting said recorded data with a function $S^{repl}(t, \delta v_{i+d})$ in which $Z_{1Ueff}$=constant replaces $Z_{1U}\bar{g}(v-v_o,w_R)$ in the fitting function $S(t, \delta v_{i+d})$.

More preferably, the method includes repeating the above steps, for a frequency $v_{i+2d}=v_{i+d}$ of the electromagnetic radiation emitted by the laser, as long as the frequency of the electromagnetic radiation is included in $[v_{min}, v_{max}]$.

The frequency of the laser electromagnetic radiation is thus tuned so that different frequencies $v_j$ can be selected, all in a neighbourhood of the resonant frequency. In this way a plurality of SCAR decay signals, one for each frequency, are obtained. Each of these curve is fitted according to the method above described, always keeping the same value of $Z_{1Ueff}$. Therefore, using the method of the invention, a plurality of values of $$|\sigma_{\gamma_g}(\delta v_i)|_{j=1}^m$$

Can be obtained, for example m values for m different frequencies. In case for a given frequency more than a SCAR decay signal is collected, in order to improve the accuracy, the following steps are preferably repeated, with reference to the above description:

5) Repeat steps 1) to 3) up to j=1 . . . d*m, i.e. the total number of detected SCAR decays for the i=1 . . . m step detunings in the $\delta v_{min} \leq \delta v_i \leq \delta v_{max}$ spectral range, repeated by d times. This is made simultaneously to the SCAR decays acquisitions.

6) As a result an array of fitted absorption decay rate parameters is determined: $|\gamma_g(\delta v_i)|_{j=1}^{d*m}$ with uncertainties $|\sigma_{\gamma_g}(\delta v_i)|_{j=1}^{d*m}$ Advantageously, the method includes:

obtaining for each of a plurality of m frequencies $v_j$ with $\delta v_j$ from a $\delta v_{min}$ to a $\delta v_{max}$ a value of $\gamma_g(\delta v_j)$, and fitting said m values of $\gamma_g(\delta v_j)$ so as to obtain a value of the first concentration of the target gas.

As clear from equation (3), the concentration is substantially the integrated absorption area under the $\gamma_g(\delta v_j)$ profile.

More preferably said fitting of the m values of $\gamma_g(\delta v_j)$ includes:

Selecting as a free parameters in the fitting a parameter which takes into account the presence of other molecular absorptions l=1 . . . n in addition to the target molecular resonance l=0.

More preferably said fitting of the m values of $\gamma_g(\delta v_j)$ includes:

Selecting as a free parameters in the fitting a parameter which takes into account the presence of a polynomial background around the resonance frequency of the target transition $v_0$.

Preferably, further consideration has to be performed before making the fitting of the m values of $\gamma_g(\delta v_j)$. In the fitting of the SCAR decay signal with the S curve, the approximation of $Z_{1Ueff}$=const, has been made. This approximation however leads to a line profile modification, which will be dealt later.

Further approximations are as follows. First of all, around the molecular transition of interest, called here l=0, at the given frequency $v_0$, there are other transitions l=1 . . . n of other gasses which are in the same cavity together with the target gas.

A SCAR apparatus is intended as an instrument designed and built to measure concentrations of a specific gas, g contained in a mixture of gases, g+og in conditions of total pressure PT and temperature T, and that interacts with saturating absorbing light, characterized by a power $P_0$ at the beginning of each SCAR decay event. The calibration procedures will be valid for concentration measurements of the targeted gas, one side, to parameterize accurately such absorption in terms of the spectral parameters, (i.e absorption intensity, resonance frequency and linewidth of targeted transition), and on the saturation parameters used to detect the SCAR spectrum. All of them, except absorption intensity which depends of the gas concentration, remains invariant if the thermodynamic conditions of the gas mixture and interacting light intensity do not change. Hence, they can be calibrated for such SCAR apparatus. On the other side, it means to remove, accurately, the contribution to the total integrated absorption area due to the absorptions of other lines of other molecules present into the mixture of the target gas and the other gasses, and resonant in the frequency interval of the detected SCAR spectrum. Hence, even for such transitions, spectral and saturation parameters can be calibrated and remain invariant for such SCAR apparatus.

Further, there is another contribution which is preferably to be taken into account, which is the background contribution around the resonance frequency.

The contribution of these other factors can be written as:

For each laser detuning:

$$S(t;p(\delta v_i))=B(\delta v_i)+A_d(\delta v_i)e^{-\gamma_c(\delta v_i)t}f(t;\gamma_c(\delta v_i),A_d(\delta v_i),\gamma_g(\delta v_i),p_l(v_i))) \quad \text{(Eq. 35)}$$

with:

$p(\delta v_i)$ is the set of parameters that define the SCAR decay behavior:

$$p(\delta v_i)=\{B(\delta v_i),A_d(\delta v_i),\gamma_c(\delta v_i),\gamma_g(\delta v_i),p_l(v_i)\},l=0 \ldots n \quad \text{(Eq. 36)}$$

$B(\delta v_i)$ is the detection background, in U $A_d(\delta v_i)$ is the amplitude of the decay signal at the begin of the decay event, in U $\gamma_c(\delta v_i)$ and $\gamma_g(\delta v_i)$ defined as above $p_l(v_i)$ are n set of parameters that defines each absorbent transition $$p_l(v_i)=\{(Z_{1U})_l\bar{g}_l(v_i-v_l,w_{Rl})\},l=0 \ldots n \quad \text{(Eq. 37)}$$

$f$ the non-linear function that follow one of the rate equations and depending of the gas conditions is described by:

homogeneous regime ($w_L \geq w_G$)

$$\frac{df}{dt} = -\gamma_g(\delta v_i)\sum_{l=0}^{n}\frac{\ln[1+A_d(\delta v_i)(Z_{1U})_l\bar{g}_l(v_i-v_l,w_{Rl})e^{-\gamma_c(\delta v_i)t}f]}{A_d(\delta v_i)(Z_{1U})_l\bar{g}_l(v_i-v_l,w_{Rl})} \quad \text{(Eq. 38)}$$

which is a generalization of Eq. 23 for l=0 . . . n transitions with $(Z_0)_l=A_d(Z_{1U})_l\bar{g}_l$.

inhomogeneous regime still diffusive gas ($w_L < w_G$)

$$\frac{df}{dt} = -\gamma_g(\delta v_i) \sum_{l=0}^{n} \frac{2}{\sqrt{1 + A_d(\delta v_i)(Z_{1U})_l e^{-\gamma_c(\delta v_i)t} f} + 1} f \quad \text{(Eq. 39)}$$

which is a generalization of Eq. 25 for l=0 ... n transitions with $(Z_0)_l = A_d(Z_{1U})_l$
non-diffusive gas ($w_L \ll w_G$)

$$\frac{df}{dt} = -\gamma_g(\delta v_i) \sum_{l=0}^{n} \frac{1.4256}{\sqrt{1 + 0.5 A_d(\delta v_i)(Z_{1U})_l e^{-\gamma_c(\delta v_i)t} f} + 0.4256} f \quad \text{(Eq. 40)}$$

which is a generalization of Eq. 30-32 for l=0 ... n transitions with $(Z_0)_l = A_d(Z_{1U})_l$ In the case of only the target transition is detected, Eqs. 38-40 are applied for l=0.

The target gas concentration is, deriving from eq. (3):

$$N_{g,l=0} = \frac{1}{c^2 L_S(T)} \int \gamma_{g,l=0}(v - v_0) dv = \quad \text{(Eq. 41)}$$
$$\frac{1}{c^2 L_S(T)} \gamma_{g,l=0}(0) \int g_{S0}(v - v_0, w_{RS0}) dv$$

with:
$L_s(T)$ is the line-strength of the target molecular transition at temperature T, in cm/molecule
c is the vacuum velocity of light, in cm/s
$\gamma_{g,l=0}$ is the contribution to the cavity decay rate due to the target molecular transition $$\gamma_{g,l=0}(v - v_0) = \gamma_{g,l=0}(0) g_{S0}(v - v_0, w_{RS,l=0}) \quad \text{(Eq. 42)}$$

with
$\gamma_{g,l=0}(0)$ is the contribution to the cavity decay rate due to the target molecular transition at the resonance frequency $v_0$, in $s^{-1}$
$g_{S0}(v-v_0, w_{RS0})$ is the area normalized absorption profile in saturation conditions, in Hz $$g_{S0}(v-v_0, w_{RS0}) = g_{S0}(0) \bar{g}_{S0}(v-v_0, w_{RS0}) \quad \text{(Eq. 43)}$$

with
$g_{S0}(0)$ is the area normalization factor, in Hz
$\bar{g}_{S0}(v-v_0, w_{RS0})$ is the peak normalized absorption profile in saturation conditions, with $w_{RS0}$ saturation-modified linewidth.

The function $\bar{g}_{S0}(v-v_0, w_{RS0})$ differs from the peak normalized absorption profile in linear absorption conditions, $\bar{g}_0(v-v_0, w_{R0})$ by a factor R, due to the fact that the approximation $$\bar{g}_{S0}(v-v_0, w_{RS0}) = R \bar{g}_0(v-v_0, w_{R0}) \quad \text{(Eq. 44)}$$

This R factor takes into account the line profile modifications due to $Z_{1Ueff}$ approximation at the basis of this method.

Hence, from Eq. 41, the concentration of the target gas, $N_{g,l=0}$ is:

$$N_{g,l=0} = \frac{\gamma_{g,l=0}(0) g_{S0}(0)}{c^2 L_S(T)} R \quad \text{(Eq. 45)}$$

The $\gamma_0(0) g_{S0}(0)$ contribution in this equation is measured by fitting the set of final fitted parameters $$|\gamma_g(\delta v_i)|_{\delta v_{min}}^{\delta v_{max}}$$

(i.e. the total absorption spectrum in the explored spectral range) to a function which takes into account the expected absorption profile:

$$\gamma(v; p_\alpha) = \Sigma_{l=0}^{n} \gamma_l(0) g_{Sl}(0) \bar{g}_{Sl}(v - v_l, w_{RSl}) + \Sigma_{j=0}^{p} B_j (v - v_0)^j \quad \text{(Eq. 46)}$$

with
$p_\alpha$ is the array of parameters that defines the expected absorption profile including possible background $$p_\alpha = \{p_g, p_{bk}\} \quad \text{(Eq. 47)}$$

with
$p_g$ is the array of parameters that defines the expected absorption profile due to the l=0 ... n saturated absorptions
$p_{bk}$ is the array of parameters that defines the possible absorption background These are thus the parameters that are preferably considered in the fitting procedure for talking into account the other saturated absorptions and the background.

More in detail, preferably:

$$p_g = (\gamma_l(0), g_{Sl}(0), v_l, w_{RSl})_{l=0}^{n} \quad \text{(Eq. 48)}$$

with
$\gamma_l(0)$ are the contributions to the cavity decay rate due to absorptions from the l=0 ... n molecular transitions at each resonance frequency $v_l$, in $s^{-1}$
$g_{Sl}(0)$ are the area normalization factors of the l=0 ... n molecular transitions, in Hz
$v_l$ are the resonance frequencies of the l=0 ... n molecular transitions, in Hz
$w_{RSl}$ are the saturation-modified linewidths of the l=0 ... n molecular transitions, in Hz $$p_g = \{B_j\}_{j=0}^{p}$$

with
$B_j$ are the j=0 ... p background coefficients of a polynomial background around the resonance frequency of the target transition $v_0$.

Again, the fit of $\gamma(v; p_\alpha)$ to $$|\gamma_g(\delta v_i)|_{\delta v_{min}}^{\delta v_{max}}$$

uses the L-M method. At this respect for the $p_\alpha$ set of parameters only some of them are free to be fitted and the other are fixed to a value determined with the calibration procedure described below:

$$p_\alpha = \{p_\alpha^{fr}, p_\alpha^{fx}\} \quad \text{(Eq. 49)}$$

with
$p_\alpha^{fr} = [\{\gamma_l(0), g_{Sl}(0)\}_{l=0}^{n}, \{B_j\}_{j=0}^{p}]$ is the array of free parameters
$p_\alpha^{fx} = \{v_l, w_{RSl}\}_{l=0}^{n}$ is the array of fixed parameters that are known are calibrated, for example following the procedures described below.

Preferably, said fitting of the m values of $\gamma_g(\delta v_j)$ is a is a least squares fitting. More preferably, said least square fitting uses the Levenberg-Marquardt (L-M) algorithm.

The recipe is preferably:
1) Initialization procedure:
   Set the initial free parameters to:

$$p_\alpha^{ini} = [\{\gamma_l(0), g_{Sl}(0)\}_{l=0}^{n}, \{B_j\}_{j=0}^{p}]^{ini} \quad \text{(Eq. 50)}$$

Set the $p_\alpha^{fx}$ parameters to the calibrated values following one of the calibration recipes (see below), and keep them fixed during all fit procedure.

Other initializations: L-M limit convergence values, $\lambda_{max}, \delta\chi_{max}^2, \chi_{min}^2$ and maximum number of interactions $N_{itr}$ 2) Minimization loop on $p_\alpha^{fr}$
   a) $p_\alpha^{try} = p_\alpha^{ini}$
   b) $p = \{p_\alpha^{try}, p_\alpha^{fx}\}$. Calculate the $\chi^2(p)$:

$$\chi^2(p) = \sum_{v_i=v_{min}}^{v_{max}} \frac{[\gamma_g(v_i - v_0) - \gamma(v_i; p)]}{\sigma_{\gamma_g}^2(v_i - v_0)} \quad \text{(Eq. 51)}$$

and gradient $\beta(p)$ and the curvature matrix, $|\alpha|(p)$.

c) Solve the linear Eqs. of the L-M algorithm for the present problem, and calculate $\delta p$ and $\chi^2(p+\delta p)$
   d) Follow the L-M convergence criteria on $\lambda$ and/or $\chi^2$ as described in the L-M method. If not converging, come back to step a) with an update value of $\lambda$ and/or $p_\alpha^{try} = p_\alpha^{try} + \delta p$
   e) At convergence, a fitted set of parameters equal to the last guess is determined $$p_\alpha^{fit} = [\{\gamma_l(0), g_{Sl}(0)\}_{l=0}^n, \{B_j\}_{j=0}^P]^{fit} = p_\alpha^{try} \quad \text{(Eq. 52)}$$

3) Calculation of the target gas concentration:

$$N_0 = \frac{\gamma_0^{fit}(0) g_{S0}^{fit}(0)}{c^2 L_S(T)}$$

more preferably corrected as detailed below.

As explained above, the introduction of a $Z_{1Ueff}$ in the method allows deviations of the linear-absorption spectral profiles $\bar{g}_{Sl}(v - v_l, w_{RSl})$ with respect to the expected ones $\bar{g}_l(v - v_l, w_{Rl})$ taking into account the thermodynamic conditions of the gas mixture. The purpose of this calibration routines is determine the values of the parameters $v_l, w_{RSl}$ of the $\bar{g}_{Sl}(v - v_l, w_{RSl})$ profile for the l detected transitions (strictly speaking $\bar{g}_{Sl}$ and $\bar{g}_l$ has the same functional behavior (we mean both are Voigt or Gaussians or Lorentzians, depending of the physical situation) but the linewidth is different, $w_{RSl}$ for $\bar{g}_{Sl}$ and $w_{Rl}$ for $\bar{g}_l$). The routine is slightly different for the target transition (l=0) and for the others (l=1 . . . n).

In this way for the array of equation (49)

$$p_\alpha^{fx} = \{v_l, w_{RSl}\}_{l=0}^n$$

all parameters are known.

The calibration routine is depicted in FIGS. 5A and 5B.

For the target transition (l=0)

This routine uses a gas sample mixture enriched of the target gas, that is, with a second concentration of the target gas much higher than the first concentration. The strategy is to calculate the absorption spectrum $|\gamma_g^{\uparrow S/N}(\delta v_i)|_{j=1}^{d*m}$ of this enriched sample in the $\delta v_{min} \leq \delta v_i \leq \delta v_{max}$ spectral range, and fit it to the expected absorption behavior $\gamma(v; p_\alpha)$ (Eq. 46), but now $v_0, w_{RS0}$ are free parameters. From eq. (49) $p_\alpha = \{p_\alpha^{fr}, p_\alpha^{fx}\}$ with
$p_\alpha^{fr} = [\gamma_0^{\uparrow S/N}(0), g_{S0}^{\uparrow S/N}(0), \{\gamma_l(0), g_{Sl}(0)\}_{l=1}^n, v_0, w_{RS0}, \{B_j\}_{j=0}^P]$ is the array of free parameters
$p_\alpha^{fx} = \{v_0, w_{RS0}\}_{i=1}^n$ is the array of fixed parameters that must be known or must be calibrated following the procedures described below.

The recipe is the following:
1) Calculate the spectrum $\{\gamma_g^{\uparrow S/N}(\delta v_i), \sigma_{\gamma_g}^{\uparrow S/N}(\delta v_i)\}_{j=1}^{d*m}$ by fitting the detected SCAR decay signals of the enriched sample: $\{S_{exp}^{\uparrow S/N}(t; \delta v_i), \sigma_{exp}^{\uparrow S/N}(t; \delta v_i)\}$ to a $S(t; p(\delta v_i))$ following the method above described.
2) Initialization procedure:
   Set the initial free parameters to:

$$p_\alpha^{ini} = [\gamma_0^{\uparrow S/N}(0), g_{S0}^{\uparrow S/N}(0), \{\gamma_l(0), g_{Sl}(0)\}_{l=1}^n, v_0, w_{RS0}, \{B_j\}_{j=0}^P]^{ini} \quad \text{(Eq. 53)}$$

Set the $p_\alpha^{fx}$ parameters to the calibrated values following one of the calibration recipes (see below), and keep them fixed during all fit procedure.
   Other initializations: L-M limit convergence values, $\lambda_{max}, \delta\chi_{max}^2, \chi_{min}^2$ and maximum number of interactions $N_{itr}$ 3) Minimization loop on pr
   a) $p_\alpha^{try} = p_\alpha^{ini}$
   b) $p = \{p_\alpha^{try}, p_\alpha^{fx}\}$. Calculate the $\chi^2(p)$ (Eq. 21) and gradient $\beta(p)$ and the curvature matrix, $|\alpha|(p)$ for this problem.
   c) Solve the linear Eqs. of the L-M algorithm for the present problem, and calculate $\delta p$ and $\chi^2(p+\delta p)$
   d) Follow the L-M convergence criteria on $\lambda$ and/or $\chi^2$ as described in the L-M algorithm. If not converging, come back to step a) with an update value of $\lambda$ and/or $p_\alpha^{try} = p_\alpha^{try} + \delta p$
   e) At convergence, a fitted set of parameters equal to the last guess is determined $$p_\alpha^{fit}[\gamma_0^{\uparrow S/N}(0), g_{S0}^{\uparrow S/N}(0), \{\gamma_l(0), g_{Sl}(0)\}_{l=0}^n, v_0, w_{RS0}, \{B_j\}_{j=0}^P]^{fit} = p_\alpha^{try} \quad \text{(Eq. 54)}$$

4) $v_0 = v_0^{fit}$ and $w_{RS0} = w_{RS0}^{fit}$ are the calibrated values to be used in the method of the fitting of decay signal at very low concentrations.

For the interference transitions (l=1 . . . n)

Differently from the others, this routine uses a gas sample mixture totally depleted of the target gas at the same P and T conditions. In this situation there is no absorption from the target gas for this experiment. The strategy is to calculate the absorption spectrum $|\gamma_g^{\downarrow S/N}(\delta v_i)|_{j=1}^{d*m}$ of this totally depleted sample in the $\delta v_{min} \leq \delta v_i \leq \delta v_{max}$ spectral range, and fit it to the expected absorption behavior $\gamma(v; p_\alpha)$ (Eq. 46), but now with all free parameters and without the parameters of the target transition (those with l=0)

$$p_\alpha = p_\alpha^{fr} = [\{\gamma_l(0), g_{Sl}(0), v_l, w_{RSl}\}_{l=1}^n, \{B_j\}_{j=0}^P] \quad \text{(Eq. 55)}$$

The recipe is the following:
1) Calculate the spectrum $\{\gamma_g^{\downarrow S/N}(\delta v_i), \sigma_{\gamma_g}^{\downarrow S/N}(\delta v_i)\}_{j=1}^{d*m}$ by fitting the detected SCAR decay signals of the totally depleted sample: $\{S_{exp}^{\downarrow S/N}(t; \delta v_i), \sigma_{exp}^{\downarrow S/N}(t; \delta v_i)\}$ to a $S(t; p(\delta v_i))$ following the method described for low concentrations.
2) Initialization procedure:
   Set the initial free parameters to:

$$p_\alpha^{ini} = [\{\gamma_l(0), g_{Sl}(0), v_l, w_{RSl}\}_{l=0}^n, \{B_j\}_{j=0}^P]^{ini} \quad \text{(Eq. 56)}$$

Other initializations: L-M limit convergence values, $\lambda_{max}, \delta\chi_{max}^2, \chi_{min}^2$ and maximum number of interactions $N_{itr}$ 3) Minimization loop on $p_\alpha^{fr}$
   a) $p_\alpha^{try} = p_\alpha^{ini}$
   b) $p = p_\alpha^{try}$. Calculate the $\chi^2(p)$ (Eq. 51) and gradient $\beta(p)$ and the curvature matrix, $|\alpha|(p)$ for this problem.
   c) Solve the linear Eqs. of the L-M algorithm for the present problem, and calculate $\delta p$ and $\chi^2(p+\delta p)$ d) Follow the L-M convergence criteria on $\lambda$ and/or $\chi^2$ as described in the L-M method. If not converging, come back to step a) with an update value of $\lambda$ and/or $p_\alpha^{try} = p_\alpha^{try} + \delta p$ e) At convergence, a fitted set of parameters equal to the last guess is determined $$p_\alpha^{fit} = [\{\gamma_l(0), g_{Sl}(0), v_l, w_{RSl}\}_{l=1}^n, \{B_j\}_{j=0}^p]^{fit} = p_\alpha^{try} \quad \text{(Eq. 57)}$$

4) $v_l = v_l^{fit}$ and $w_{RSl} = w_{RSl}^{fit}$ ($l=1 \ldots n$) are the calibrated values to be used in the ESPS method.

Advantageously, a result of said fitting is multiplied by a correcting factor R in order to obtain then concentration of the target gas, said correcting factor taking into account the line profile modifications due to the $Z_{1Ueff}$=constant approximation.

The equation above is preferably corrected in the following way:

$$N_0 = \frac{\gamma_0^{fit}(0) g_{S0}^{fit}(0)}{c^2 L_S(T)} R \quad \text{(Eq. 58)}$$

with R to be determined with the calibration procedures described below.

Advantageously, the method includes the steps of:
Selecting the value of $Z_{1Ueff}$=constant to be introduced in the fitting by means of the following step:
  inserting said gas at a second concentration, wherein said second concentration is at least 10 times said first concentration in the resonant cavity;
  tuning the frequency of said electromagnetic radiation emitted by said laser source so as to fix it to a value $v_i$ within a range of frequencies [$v_{min}$, $v_{max}$] including said molecular transition $v_0$;
  fixing the intensity of said electromagnetic radiation in the cavity at a value much greater than the saturation intensity $I_s$ of the molecular transition to be detected;
  irradiating said gas by means of said electromagnetic radiation beam emitted by said laser source having said fixed frequency $v_i$ and intensity in said resonant cavity;
  coupling said electromagnetic radiation to said cavity so as to obtain a laser-cavity resonance condition;
  changing the frequency of the electromagnetic radiation emitted by the laser so as to switch off the laser-cavity resonance;
  detecting an electromagnetic radiation beam in output from said cavity after the laser-cavity resonance has been switched off;
  recording a plurality of data representative of said output which has the form of a decay signal;
  fitting the data of the recorded decay with a curve $S_{exp}(t, \delta v_i)$ which depends on the following parameters:
    $B^{high\ conc}(\delta v_i)$ is the detection background, with ($\delta v_i = v_i - v_0$)
    $A_d^{high\ conc}(\delta v_i)$ is the amplitude of the decay signal at the beginning of the decay event, g
    $\gamma_c^{high\ conc}(\delta v_i)$ is the cavity decay rate due to non-resonant and non-saturable losses (empty cavity decay rate);
    $\gamma_g^{high\ conc}(\delta v_i)$ is contribution of the targeted molecular transition to the decay signal;
    $Z_{1Ueff}^{high\ conc} = Z_{1U}\bar{g}(\delta v_i, w_R)$, where $\bar{g}$ is the peak normalized line profile $\bar{g}(v-v_0, w_R)$ centered at the molecular resonance frequency $v_0$ and $w_R$ is the HWHM width of the resonance, and $w_R = w_L$ for a Lorentzian shape, $w_R = w_G$ for a Gaussian shape, $w_R = \{w_L, w_G\}$ for a Voigt shape;

$$Z_o = \frac{CP(0)}{CP_s} = A_d Z_{1U}$$

is the saturation parameter at the beginning of the decay event and at the frequency of the targeted molecular transition $v_0$, P(0) is the intracavity power at the beginning of the decay signal; and $$P_s = \frac{\pi w^2}{2} I_s$$

is the saturation power, where w is the spot size radius of the laser beam, i.e. the radius for which the amplitude of the field is 1/e times that of the axis and $I_s$ the saturation intensity;

Selecting as $Z_{1Ueff}^{high\ conc} = Z_{1Ueff}$=value obtained from the above fitting.

The invention in its first aspect is based on the approximation that $Z_{1U}\bar{g}(\delta v_i, w_R)$ is a constant. The value to be put in the fitting procedure (and which is kept fixed for the whole procedure) is determined in a calibration routine. In the calibration routine, a SCAR measurement is performed, however an enriched gas is used. In other words, the same target gas at the same resonant frequency is investigated, however the concentration of the gas is much more than the concentration of the gas at which the standard gas measurements are performed. This second concentration of calibration is at least 10 times said first concentration.

The experimental decay curves used in most parts of this calibration routine are recorded with a sample gas mixture enriched with the target gas. This enrichment must be enough to measure a spectrum $\gamma(\delta v)$ with high Signal to Noise ratio for the target transition, even with a CRD experiment in linear-absorption conditions ($Z_0 \ll 1$). The thermodynamic conditions (Pressure, Temperature) of this enriched sample mixture are the same of the sample mixture used in the trace gas detection, that is, the same conditions in which the further measurement using the fitting of the invention is to be performed at very low concentrations.

This routine, depicted in FIG. 4, uses the data of a SCAR experiment performed in the enriched gas sample mixture to determine a value of $Z_{1Ueff}$. The strategy is to detect the SCAR decay signals of this enriched sample: $\{S_{exp}^{\uparrow S/N}(t; \delta v_i), \sigma_{exp}^{\uparrow S/N}(t; \delta v_i)\}$ to be fitted with $S(t; p(\delta v_i))$ following the method described according to the first aspect, but with the main difference that in this calibration routine directed to obtain a value of $Z_{1Ueff}$, all parameters of $p(\delta v_i)$ in the fitting of the so obtained decay signal, including $Z_{1Ueff}$, are free.

$$p^{fr}(\delta v_i) = \{B^{fr}(\delta v_i), A_d^{fr}(\delta v_i), \gamma_c^{fr}(\delta v_i), \gamma_g^{fr}(\delta v_i), Z_{1Ueff}^{fr}\} \quad \text{(Eq. 59)}$$

Preferably, a similar routine as in the standard SCAR signal is used.

The procedure is the following:
1) Consider the detected SCAR curve $\{S_{exp}^{\uparrow S/N}(t; \delta v_i), \sigma_{exp}^{\uparrow S/N}(t; \delta v_i)\}_j$
2) Initialization procedure:
   Set the initial free parameters to:

$$p_j^{ini}(\delta v_i) = \{B^{ini}(\delta v_i), A_d^{ini}(\delta v_i), \gamma_c^{ini}(\delta v_i), \gamma_g^{ini}(\delta v_i), Z_{1Ueff}^{ini}\}_j \quad \text{(Eq. 60)}$$

Other initializations: L-M limit convergence values, $\lambda_{max}, \delta\chi_{max}^2, \chi_{min}^2$ and maximum number of interactions $N_{itr}$.

3) Minimization loop on $p_j^{fr}(\delta v_i)$

Try as initial guess of the free parameters $p_j^{try}(\delta v_i) = p_j^{ini}(\delta v_i)$ and uses the L-M routine to obtain a fitted set of parameters $p_j^{fit}(\delta v_i)$.

a) $p(\delta v_i) = p_j^{try}(\delta v_i)$. Calculate the $\chi^2(p(\delta v_i))$ (Eq. 7), gradient $\beta(p(\delta v_i))$ and the curvature matrix, $|\alpha|(p(\delta v_i))$ as described in item 3.a) in sec. 1A).

b) Solve the linear Eqs. of the L-M algorithm for the present problem, and calculate $\delta p(\delta v_i)$ and $\chi^2(p(\delta v_i) + \delta p(\delta v_i))$ c) Follow the L-M convergence criteria on $\lambda$ and/or $\chi^2$ as described in the L-M method. If not converging, come back to step a) with an update value of $\lambda$ and/or $p_j^{try}(\delta v_i) = p(\delta v_i) + \delta p(\delta v_i)$ d) At convergence, a fitted set of parameters equal to the last guess is determined $$p_j^{fit}(\delta v_i) = p_j^{try}(\delta v_i) \qquad \text{(Eq. 61)}$$

4) Repeat steps 1 to 3 up to j=1 ... d*m, i.e. the total number of detected SCAR decays for the i=1 ... m step detunings $\delta v_i$ repeated by d times.

5) For the set of final fitted parameters $|p_j^{fit}(\delta v_i)|_{j=1}^{d*m}$, calculate $|\chi^2(p_j^{try}(\delta v_i))|_{j=1}^{d*m}$ and the sum of these $\chi^2(p_j^{fit}(\delta v_i))$ $$S(\chi^2) = \sum_{j=1}^{d*m} \chi^2(p_j^{fit}(\delta v_i)) \qquad \text{(Eq. 62)}$$

and

If this calculation is performed by the first time (i.e. first convergence iteration), make $S_{old}(\chi^2) = S(\chi^2)$ and come back to step 1 with an updated value $Z_{1Ueff}^{ini} = Z_{1Ueff}^{fit} \pm \delta Z_{1Ueff}$ In successive iterations, it searches for a minimum of $S(\chi^2)$ in absolute and relative terms ($\delta S(\chi^2) = S(\chi^2) - S_{old}(\chi^2) < \delta S_{lim}$), i.e.:

If $S_{old}(\chi^2) < S(\chi^2)$ and/or $\delta S(\chi^2) > \delta S_{lim}$, make $S_{old}(\chi^2) = S(\chi^2)$ and come back to step 1 with an updated value $Z_{1Ueff} = Z_{1Ueff} \pm \delta Z_{1Ueff}$ If $S_{old}(\chi^2) \geq S(\chi^2)$ and $\delta S(\chi^2) \leq \delta S_{lim}$, the procedure converges and the calibrated value of the effective saturation parameter to be used in the first aspect of the method of the invention is: $Z_{1Ueff} = Z_{1Ueff}^{fit}$ Preferably, the value R is calculated performing a first and a second measurement of a concentration of the same target gas at the same temperature and pressure, the first measurement in saturation absorption and at a second concentration, wherein said second concentration is at least 10 times said first concentration, and said second measurement in linear absorption at said second concentration.

The modification of the absorption spectral profiles for the method according to the first aspect as explained above allows a wrong determination of the area under the target transition by a factor R, which is preferably calibrated. The strategy is to compare this area for a spectrum of the gas sample mixture enriched by the target gas in conditions of saturated-absorption $|\gamma_g^{\uparrow S/N}(\delta v_i)|_{j=1}^{d*m}$ and in conditions of linear-absorption $|\gamma_{li}^{\uparrow S/N}(\delta v_i)|_{j=1}^{d*m}$. The condition of linear absorption are that the intensity of the radiation inside the cavity is much lower than the saturation intensity, that is $I<<_s$. These spectra are recorded by performing SCAR and CRD experiments (as mentioned, SCAR measurements are substantially CRD measurements in saturation conditions) in the same enriched gas sample, but at different laser intensities, by using the same apparatus, to obtain the SCAR decay curves $\{\gamma_g^{\uparrow S/N}(\delta v_i), \sigma_{\gamma_g}^{\uparrow S/N}(\delta v_i)\}_{j=1}^{d*m}$ when $I >> I_S$ and CRD decay curves $\{\gamma_{li}^{\uparrow S/N}(\delta v_i), \sigma_{\gamma_{li}}^{\uparrow S/N}(\delta v_i)\}_{j=1}^{d*m}$, when $I << I_s$, respectively.

The recipe is the following:

1) Calculate the $\gamma_0^{\uparrow S/N}(0), g_{S0}^{\uparrow S/N}(0)$ parameters for a spectrum $\{\gamma_g^{\uparrow S/N}(\delta v_i), \sigma_{\gamma_g}^{\uparrow S/N}(\delta v_i)\}_{j=1}^{d*m}$ following the procedure described above to calculate the saturation-modified absorption profile of the target transition (l=0). This procedure uses the SCAR decay signals of the enriched sample: $\{S_{exp}^{\uparrow S/N}(t; \delta v_i), \sigma_{exp}^{\uparrow S/N}(t; \delta v_i)\}$, detected with the SCAR apparatus in conditions of saturated absorption $Z_0 >> 1$.

2) Calculate the spectrum $\{\gamma_{li}^{\uparrow S/N}(\delta v_i), \sigma_{\gamma_{li}}^{\uparrow S/N}(\delta v_i)\}_{j=1}^{d*m}$ for the CRD detected with the SCAR apparatus in conditions of linear-absorption $Z_0 << 1$ for the enriched sample mixture.

a. Consider the detected CRD curve $\{C_{exp}^{\uparrow S/N}(t; \delta v_i), \sigma_{exp}^{\uparrow S/N}(t; \delta v_i)\}_j$ to be fitted to a function $C(t; p(\delta v_i))$ which is parameterized as:

$$C(t;p(\delta v_i)) = B(\delta v_i) + A_d(\delta v_i) e^{-(\gamma_c + \gamma_{li})(\delta v_i) t} \qquad \text{(Eq. 63)}$$

with:

$p(\delta v_i)$ is the set of parameters that define the CRD decay behavior:

$$p(\delta v_i) = \{B(\delta v_i), A_d(\delta v_i), (\gamma_c + \gamma_{li})(\delta v_i)\} \qquad \text{(Eq. 64)}$$

by using the L-M algorithm with all parameters free to be fitted $p^{fr}(\delta v_i) = p(\delta v_i)$ b. Initialization procedure:

Set the initial free parameters to:

$$p_j^{ini}((\delta v_i) = \{B(\delta v_i), A_d(\delta v_i), (\gamma_c + \gamma_{li})(\delta v_i)\}_j^{ini} \qquad \text{(Eq. 65)}$$

Other initializations: L-M limit convergence values, $\lambda_{max}, \delta\chi_{max}^2, \chi_{min}^2$ and maximum number of interactions $N_{itr}$.

c. Minimization loop on $p_j^{fr}(\delta v_i)$

Try as initial guess of the free parameters $p_j^{try}(\delta v_i) = p_j^{ini}(\delta v_i)$ and uses the L-M routine to obtain a fitted set of parameters $p_j^{fit}(\delta v_i)$.

c.1 $p(\delta v_i) = p_j^{try}(\delta v_i)$. Calculate the $\chi^2(p(\delta v_i))$ $$\chi^2(p(\delta v_i)) = \sum_{t_k=0}^{t_{max}} \frac{(C_{exp}(t_k; \delta v_i) - C(t_k; p(\delta v_i)))^2}{\sigma_{exp}^2(t_k; \delta v_i)} \qquad \text{(Eq. 66)}$$

gradient $\beta(p(\delta v_i))$ and the curvature matrix, $|\alpha|(p(\delta v_i))$ for this problem.

c.2 Solve the linear Eqs. of the L-M algorithm for the present problem, and calculate $\delta p(\delta v_i)$ and $\chi^2(p(\delta v_i) + \delta p(\delta v_i))$ c.3 Follow the L-M convergence criteria on $\lambda$ and/or $\chi^2$ as described in the L-M method. If not converging, come back to step a) with an update value of 2 and/or $p_j^{try}(\delta v_i) = p(\delta v_i) + \delta p(\delta v_i)$.

c.4 At convergence, a fitted set of parameters equal to the last guess is determined $$p_j^{fit}(\delta v_i) = p_j^{try}(\delta v_i) \qquad \text{(Eq. 67)}$$

d. Repeat steps 2) to 4) up to j=1 ... d*m, i.e. the total number of detected CRD decays for the i=1 ... m step detunings in the $\delta v_{min} \leq \delta v_i \leq \delta v_{max}$ spectral range, repeated by d times. This is made simultaneously to the CRD decays acquisitions.

e. As a result an array of fitted cavity decay rate parameters is determined: $|(\gamma_c+\gamma_{li})(\delta v_i)|_{j=1}^{d*m}$ with uncertainties $|\sigma_{\gamma_{li}}(\delta v_i)|_{j=1}^{d*m}$ 3) Calculate the $(\gamma_{li})_0^{\uparrow S/N}(0), g_0^{\uparrow S/N}(0)$ parameters by fitting this CRD spectrum $|(\gamma_c+\gamma_{li})((\delta v_i), \sigma_{\gamma_{li}}(\delta v_i)|_{j=1}^{d*m}$ to the expected linear-absorption $$\gamma(v; p_{li}) = \gamma_c + (\gamma_{li})_0^{\uparrow S/N}(0) g_0^{\uparrow S/N}(0)$$
$$g_0(v-v_0, w_{R0}) + \Sigma_{l=1}^{n}(\gamma_{li})_l(0) g_l(0)$$
$$g_l(v-v_l, w_{Rl}) + \Sigma_{j=1}^{p} B_j (v-v_0)^j \quad \text{(Eq. 68)}$$

with $p_{li}$ is the array of parameters that defines the expected absorption profile including possible background $$p_{li} = [\gamma_c, (\gamma_{li})_0^{\uparrow S/N}(0), g_0^{\uparrow S/N}(0), v_0, w_{R0}, \{(\gamma_{li})_l, g_l(0), v_l, w_{Rl}\}_{l=1}^{n}, \{B_j\}_{j=1}^{p}] \quad \text{(Eq. 69)}$$

with $\gamma_c$ is the cavity decay rate due to losses different of linear-absorption by the gas mixture, in $s^{-1}$ $(\gamma_{li})_0^{\uparrow S/N}$ is the contribution to the cavity decay rate due to absorption of the target transition at resonance frequency $v_0$, in $s^{-1}$ $g_0^{\uparrow S/N}(0)$ is the area normalization factor of the absorption of the target transition, in Hz $(\gamma_{li})(0)$ are the contributions to the cavity decay rate due to absorptions of the $l=1 \ldots n$ interfering transitions at each resonance frequency $v_l$, in $s^{-1}$ $g_l(0)$ are the area normalization factors of the $l=1 \ldots n$ interfering transitions, in Hz $v_l$ are the resonance frequencies of the $l=0 \ldots n$ transitions, in Hz $w_{Rl}$ are the linear-absorption linewidths of the $l=0 \ldots n$ molecular transitions, in Hz $B_j$ are the $j=1 \ldots p$ background coefficients of a polynomial background around the resonance frequency of the target transition $v_0$ Again, this fit uses the L-M method. At this respect for the $p_{li}$ set of parameters only some of them are free to be fitted and the other are fixed to a value:

$$p_{li} = [p_{li}^{fr}, p_{li}^{fx}] \quad \text{(Eq. 70)}$$

with $p_{li}^{fr} = [\gamma_c, (\gamma_{li})_0^{\uparrow S/N}(0), g_0^{\uparrow S/N}(0), v_0, w_{R0}, \{(\gamma_{li})_l, g_l(0)\}_{l=1}^{n}, \{B_j\}_{j=1}^{p}]$ is the array of free parameters $p_{li}^{fx} = [\{v_l, w_{Rsl}\}_{l=1}^{n}]$ is the array of fixed parameters The recipe is:

a. Initialization procedure:
Set the initial free parameters to:

$$p_{li}^{ini} = [\gamma_c(\gamma_{li})_0^{\uparrow S/N}(0), g_0^{\uparrow S/N}(0), v_0, w_{R0}, \{(\gamma_{li})_l, g_l(0)\}_{l=1}^{n}, \{B_j\}_{j=1}^{p}]^{ini} \quad \text{(Eq. 71)}$$

Set the pix parameters to the values calculated from known data reported by molecular databases Other initializations: L-M limit convergence values, $\lambda_{max}, \delta\chi_{max}^2, \chi_{min}^2$ and maximum number of interactions $N_{itr}$ b. Minimization loop on $p_\alpha^{fr}$
b.1. $p_{li}^{try} = p_{li}^{ini}$
b.2. $p = \{p_{li}^{try}, p_{li}^{fx}\}$. Calculate the $\chi^2(p)$ $$\chi^2(p) = \sum_{v_i=v_{min}}^{v_{max}} \frac{[(\gamma_c + \gamma_{li})(v_i - v_0) - \gamma(v_i; p)]}{\sigma_{\gamma_{li}}^2 (v_i - v_0)} \quad \text{(Eq. 72)}$$

and gradient $\beta(p)$ and the curvature matrix, $|\alpha|(p)$ for this problem.

b.3. Solve the linear Eqs. of the L-M algorithm for the present problem, and calculate $\delta p$ and $\chi^2(p+\delta p)$ b.4. Follow the L-M convergence criteria on $\lambda$ and/or $\chi^2$ as described in the L-M method. If not converging, come back to step a) with an update value of $\lambda$ and/or $p_\alpha^{try} = p_\alpha^{try} + \delta p$ b.5. At convergence, a fitted set of parameters equal to the last guess is determined $$p_{li}^{fit} = [\gamma_c, (\gamma_{li})_0^{\uparrow S/N}(0), g_0^{\uparrow S/N}(0), v_0, w_{R0}, \{(\gamma_{li})_l, g_l(0)\}_{l=1}^{n}, \{B_j\}_{j=1}^{p}]^{fit} = p_\alpha^{try} \quad \text{(Eq. 73)}$$

4) Calculate the R-factor to be used in the calculation of concentrations by using $$N_0 = \frac{\gamma_0^{fit}(0) g_{S0}^{fit}(0)}{c^2 L_S(T)} R:$$

$$R = \frac{\gamma_0^{\uparrow S/N}(0) g_{S0}^{\uparrow S/N}(0)}{(\gamma_{li})_0^{\uparrow S/N}(0) g_0^{\uparrow S/N}(0)} \quad \text{(Eq. 74)}$$

with $\gamma_0^{\uparrow S/N}(0), g_{S0}^{\uparrow S/N}(0)$ from $p_\alpha^{fit}$ (i.e. Eq. 54)
$(\gamma_{li})_0^{\uparrow S/N}(0), g_0^{\uparrow S/N}(0)$ from $p_{li}^{fit}$ (i.e. Eq. 72)

According to a second aspect, the invention relates to a method of ring-down spectroscopy in saturated-absorption condition, for measuring a first concentration of a target gas through a measurement of the spectrum of a molecular transition of said target gas, the target gas being in a mixture together with other gasses the method comprising the steps of:

Repeating for a number m of fixed frequencies vi spaced each other by a of a frequency step in a range of frequencies including the frequency of the molecular transition of the target gas, the gases in the mixture having $l=0, \ldots, n$ absorptions in the measured spectral range, where $l=0$ is the target absorption, the following steps:

Repeating d times at the same frequency the following steps:

inserting said gas whose first concentration is to be measured in a resonant cavity comprising two or more reflecting mirrors arranged so as to form a closed optical path for an electromagnetic radiation emitted by a laser source;

tuning the frequency of said electromagnetic radiation emitted by said laser source so as to fix it to a value $v_i$ within a range of frequencies $[v_{min}, v_{max}]$ including said molecular transition $v_0$;

fixing the intensity of said electromagnetic radiation in the cavity at a value much greater than the saturation intensity $I_s$ of the molecular transition to be detected;

irradiating said gas by means of said electromagnetic radiation beam emitted by said laser source having said fixed frequency $v_i$ and intensity in said resonant cavity;

coupling said electromagnetic radiation to said cavity so as to obtain a laser-cavity resonance condition;

changing the frequency of the electromagnetic radiation emitted by the laser so as to switch off the laser-cavity resonance;

detecting an electromagnetic radiation beam in output from said cavity after the laser-cavity resonance has been switched off;

recording a plurality of data representative of said output, obtaining a decay signal for the fixed frequency;

collecting the d*m SCAR decay signals obtained;

Fitting at the same time the d*m SCAR decay signals with d*m fitting curves, considering a fitting curve $S(t; p(v))=[S(t; p(v_i)_j)]_{j=1}^{d*m}$ for the recorded decay signals which depends on the following parameters $p(v)=[p(v_i)_j]_{j=1}^{d*m}$:

$p(v)=[p(v)_j]_{j=1}^{d*m}=[B_j, A_{d_j}, \gamma_{c_j}[\{\gamma_l(\delta v_{il}), Z_{l1U} \bar{g}_l(\delta v_{il}, w_{Rl})\}_{l=0}^n]_{j=1}^{d*m}, i=1 \ldots m$ $[B_j(\delta v_{il})]_{j=1}^{d*m}$ are the detection backgrounds of the j=1 ... d*m recorded SCAR decays; and $\delta v_{il}=v_i-v_l$ is the detuning of the i (=1 ... m) scanned frequency of the laser radiation with respect to the resonance frequency of the l resonant transition, $[A_{d_j}(\delta v_{il})]_{j=1}^{d*m}$ are the amplitudes of the j=1 ... d*m recorded SCAR decays, $[\gamma_c^j(\delta v_{il})]_{j=1}^{d*m}$ are the cavity decay rates of the j=1 ... d*m recorded SCAR decays due to non-resonant and non-saturated gas absorption losses, $[[\gamma_l(\delta v_{il})_j]_{l=0}^n]_{j=1}^{d*m}$ are the arrays of the absorption decay rates of the l=0 ... n saturated transitions at the $\delta v_{il}$ detuning for the j=1 ... d*m recorded SCAR decays, $[[\{Z_{1Ul}\bar{g}_l(v_i-v_l, w_{Rl})\}_j]_{l=0}^n]_{j=1}^{d*m}$ are the arrays of the l=0 ... n saturation parameters of the j=1 ... d*m recorded SCAR decays; $\bar{g}_l(v_i-v_l, w_{Rl})$ is the peak normalized line profile centered at the molecular resonance frequency $v_l$ and $w_{Rl}$ is the HWHM width of the l-resonance;

$$Z_o = \frac{CP(0)}{CP_s} = A_d Z_{1U}$$

is the saturation parameter at the beginning of the decay event and at the frequency of the targeted molecular transition $v_0$, P(0) is the intracavity power at the beginning of the decay signal; and $$P_s = \frac{\pi w^2}{2} I_s$$

is the saturation power, where w is the spot size radius of the laser beam, i.e. the radius for which the amplitude of the field is 1/e times that of the axis and $I_s$ the saturation intensity;

Dividing the above mentioned parameters in a first and a second group;

fitting said recorded data with a function $S(t; p(v))=[S(t; p(v_i)_j)]_{j=1}^{d*m}$ by keeping the first parameter group fixed and equal to a set of pre-determined values and performing a first fitting only considering the second group as free parameters in a first fitting step; and keeping the second parameter group fixed to a value given in the first fitting step and performing a second fitting considering only the second group as free parameters in a second fitting step.

Differently from the first aspect, the second aspect of the invention follows a global approach to determine the absorption area of the target gas from all detected SCAR decays $$\left[\{S_{exp}(t; v_i), \sigma_{exp}(t; v_i)\}_j\right]_{j=1}^{d*m}.$$

It means that these input data must be known a priori, and hence when the complete frequency scan of the experiment is performed. In this sense, the second aspect of the invention gives a concentration measurement of the target gas a posteriori (i.e. not in real time with the data acquisition). On the contrary, it gives under certain circumstances more precise results by taking into account better the spectral behavior, and hence avoiding some correlations.

The acquisition of the various SCAR decay signals takes place as described already with reference to the first aspect of the invention. The details therefore are not herein repeated. Everything regarding the acquisition is substantially the same as before, the only difference is that the acquisition ends when a plurality of SCAR decays for m different frequencies is taken. Preferably for a single frequency more than a single SCAR decay signal is recorded, however this is not necessary in the present invention.

The second aspect of the invention includes a step of fitting, all together, this large number of input data $$\{S_{exp}(t; v), \sigma_{exp}(t; v)\} = \left[\{S_{exp}(t; v_i), \sigma_{exp}(t; v_i)\}_j\right]_{j=1}^{d*m}$$

(i.e. l=1 ... m frequency steps repeated d times) with an equally large number of fit functions $S(t; p(v))=[S(t; p(v_i)_j)]_{j=1}^{d*m}$ with each element $p(v_i)_j$ of the total parameter array p(v) having seven parameters to be fitted in the most simple case, where interference lines are not present in the spectral range $v_1 \leq v_i \leq v_m$. It means that the fit routine should manage, at least, d*m*7 parameters This situation is even worse if interfering absorptions are included, that is further absorption lines with l=1 ... n, as already discussed with reference to the first aspect of the invention, incrementing consequently the number of parameters to be fitted.

To simplify the problem and to better take into account the effect of the line profile $\bar{g}$ in the saturation parameter $Z_0$ and its correlation with $\gamma_g$, the second aspect of the method of the invention considers a set of global parameters $p_{gb}(v)$ equal for all $[S(t; p(v_i)_j)]_{j=1}^{d*m}$ functions and j=1 ... d*m sets of local parameters $[p_{lc_j}]_{j=1}^{d*m}$ to take into account small frequency-dependent variations around a mean value of some global parameters:

$$p(v)=[p_{gb}(v),[p_{lc_j}]_{j=1}^{d*m}] \qquad (Eq.75)$$

The experimental situation is a SCAR experiment, that is, in saturation conditions, in a gas mixture that can have l=0 ... n absorptions in the measured spectral range. l=0 is the resonant transition of the target gas and l=1 ... n are the resonant interfering transitions of other gases present in the sample.

The total decay function S(t; p(v)) is parameterized in the following way:

(Eq. 76)

$$S(t; p(v)) = [S(t; p(v_i)_j)]_{j=1}^{d*m} =$$

-continued
$$\left[B_j + A_{d_j} e^{-\gamma_{c_j} t} f_j\left(t; A_{d_j}, \gamma_{c_j}, \left[\{\gamma_l(\delta v_{il}), Z_{l1U}\bar{g}_l(\delta v_{il}, w_{Rl})\}_j\right]_{l=0}^{n}\right)\right]_{j=1}^{d*m},$$
$$i = 1 \ldots m$$

with $\delta v_{il} = v_i - v_l$ is the detuning of the i (=1 ... n) scanned frequency of the laser radiation with respect to the resonance frequency of the l resonant transition, in Hz p(v) is the set of parameters that define the SCAR decay behavior in the explored spectral range:

$$p(v) = [p(v_i)_j]_{j=1}^{d*m} = [B_j, A_{d_j}, \gamma_{c_j}, [\{\gamma_l(\delta v_{il}), Z_{l1U}\bar{g}_l(\delta v_{il}, w_{Rl})\}_j]_{l=0}^{n}]_{j=1}^{d*m}, i=1\ldots m \quad \text{(Eq.77)}$$

$[B_j]_{j=1}^{d*m}$ are the detection backgrounds of the j=1 ... d*m recorded SCAR decays; in U $[A_{d_j}]_{j=1}^{d*m}$ are the amplitudes of the j=1 ... d*m recorded SCAR decays, in U $[\gamma_{c_j}]_{j=1}^{d*m}$ are the cavity decay rates of the j=1 ... d*m recorded SCAR decays due to non-resonant and non-saturated gas absorption losses, in s$^{-1}$ $[[\gamma_l(\delta v_{il})_j]_{l=0}^{n}]_{j=1}^{d*m}$ are the arrays of the absorption decay rates of the l=0 ... n saturated transitions at the $\delta v_{il}$ detuning for the j=1 ... d*m recorded SCAR decays, in s$^{-1}$ $[[\{Z_{l1U}\bar{g}_l(v_i - v_l, w_{Rl})\}_j]_{l=0}^{n}]_{j=1}^{d*m}$ are the arrays of the l=0 ... n saturation parameters at 1U of the j=1 ... d*m recorded SCAR decays, in U$^{-1}$ $f = [f_j]_{j=1}^{d*m}$ are the non-linear functions that follows one of the below rate equations depending of the gas conditions:

homogeneous regime ($w_L \geq w_G$)

$$\left[\frac{df_j}{dt} = -\sum_{l=0}^{n} \gamma_l(\delta v_{il})_j \frac{\ln\left[1 + A_{d_j}Z_{l1U}\bar{g}_l(\delta v_{il}, w_{Rl})e^{-\gamma_{c_j}t}f_j\right]}{A_{d_j}Z_{l1U}\bar{g}_l(\delta v_{il}, w_{Rl})e^{-\gamma_{c_j}t}}\right]_{j=1}^{d*m} \quad \text{(Eq. 78)}$$

inhomogeneous regime
still diffusive gas ($w_L < w_G$)

$$\left[\frac{df_j}{dt} = -\sum_{l=0}^{n} \gamma_l(\delta v_{il})_j \frac{2}{\sqrt{1 + A_{d_j}Z_{l1U}e^{-\gamma_{c_j}t}f_j} + 1} f_j\right]_{j=1}^{d*m} \quad \text{(Eq. 79)}$$

non-diffusive gas ($w_L \ll w_G$)

$$\left[\frac{df_j}{dt} = -\sum_{l=0}^{n} \gamma_l(\delta v_{il})_j \frac{1.4256}{\sqrt{1 + 0.5 A_{d_j}Z_{l1U}e^{-\gamma_{c_j}t}f_j} + 0.4256} f_j\right]_{j=1}^{d*m} \quad \text{(Eq. 80)}$$

It is to be noted that more than one of those parameters is strongly correlated for all SCAR decay experimental curves. Further other parameters such as $[B_j]_{j=1}^{d*m}$, $[A_{d_j}]_{j=1}^{d*m}$, $[\gamma_{c_j}]_{j=1}^{d*m}$ depends very slight on the frequency $v_i$ and they are quasi-equal for all j curves. Therefore, for the $B_j$, $A_{d_j}$ and $\gamma_{c_j}$ parameters, which have small variations from decay to decay, it can be written $$B_j = \bar{B} + \delta B_j \quad \text{(Eq. 81)}$$

$\bar{B}$ is the mean value of the background of the j=0 ... d*m recorded SCAR decays, in U $\{\delta B_j\}_{j=1}^{d*m}$ are small variations around $\bar{B}$ for each j=0 ... d*m recorded SCAR decay, in U $$A_{d_j} = \bar{A}_d + \delta A_{d_j} \quad \text{(Eq. 82)}$$

$\bar{A}_d$ is the mean value of the amplitude of the j=0 ... d*m recorded SCAR decays, in U $$\{\delta A_{d_j}\}_{j=1}^{d*m}$$

are small variations around $\bar{A}_d$ for each j=0 ... d*m recorded SCAR decay, in U $$\gamma_{c_j} = \bar{\gamma}_c + \delta\gamma_{c_j} \quad \text{(Eq. 83)}$$

$\bar{\gamma}_c$ is the mean value of the cavity decay rate of the j=0 ... d*m recorded SCAR decays due to non-absorbent gas and non-saturated absorption losses, in s$^{-1}$ $$\{\delta\gamma_{c_j}\}_{j=1}^{d*m}$$

are small variations around $\bar{\gamma}_c$ for each j=0 ... d*m recorded SCAR decay, in s$^{-1}$ The parameters are thus divided in a first group of parameters, the first group preferably comprising:

$$[p_{lc_j}]_{j=1}^{d*m} = [\delta B_j, \delta A_{d_j}, \delta\gamma_{c_j}]_{j=1}^{d*m} \quad \text{(Eq. 84)}$$

And the other in a second group. Due to the difference in variation of these parameters, that is, due to the fact that the parameters of the first group have a "local" variation and the parameter of the second group have a "global" variation, it is assumed that the procedure of the invention can be performed in two separate fits.

In the first fit the second group of parameters is kept fixed. Only the local parameters, or first group, are real "free" parameters in the fitting procedure. At the end of the fitting procedure a series of values for the local parameters is obtained, in a much simplified way because not all parameters are considered in a single fitting procedure. Further, using these values, i.e. the values in output of the fitting procedure, in the second fitting step, the global parameters now becomes the real "free parameters" in the second fitting, where the values of the local parameters are kept fixed to the value at the outcome of the first fitting procedure.

Preferably, the method includes the step of calculating the first concentration of the target gas $N_0$ by:

$$N_0 = \frac{\gamma_0^{fit}(0) g_0^{fit}(0)}{c^2 L_S(T)}$$

Where c is the speed of light in vacuum and
$L_s(T)$ is the line-strength of the absorbent molecular transition at the temperature T.

The concentration of the target gas is obtained by eq. (3) and the values obtained from the fitting procedure (a global and a local value—the fitting values are indicated with an apex "fit") without any further correction procedure.

Preferably, the method of the invention includes
Introducing two further parameters to the second group of parameters, said parameters being:
d is the contribution to the cavity decay rate due to residual detection non-linearities, in $s^{-1}$
$Z_d$ is the "equivalent"-saturation parameter at 1U due to residual detection non-linearities, in $U^{-1}$ So that the second group of parameters is equal to:

$$p_{gb}(v)=[\overline{B},\overline{A}_d,\overline{\gamma}_c,Z_d,d,[Z_{1U},\gamma_l(0),g_l(0),\overline{g}_l(\delta v_{il},w_{Rl})]_{l=0}{}^n]$$

Where $\gamma_l(\delta v_{il})_j = \gamma_l(0)g_l(0)\overline{g}_l(\delta v_{il},w_{Rl})$ (Eq. 85)

with
$\{\gamma_l(0)\}_{l=0}{}^n = \{c\alpha_l(0)\}_{l=0}{}^n$ are the absorption decay rates for each transition l=0 . . . n at the resonance frequency $v_i = v_l$, in $s^{-1}$,
$\{g_l(0)\}_{l=0}{}^n$ are the area normalization factors for each transition l=0 . . . n at the resonance frequency $v_i = v_l$,
$\{\overline{g}_l(v_i - v_l, w_{Rl})\}_{l=0}{}^n$ are the peak normalized line profiles for each transition l=0 . . . n, centered at the resonance frequency $v_l$ and linewidth $w_{Rl}$.

d and $Z_d$ are, respectively, the area and saturation parameter of a possible spectral background. For this distortion background, it has been assumed a non-linear dependence equal to that of the saturated-absorption that characterized the gas absorption but with a constant saturation parameter for all probed frequencies. It is assumed that it is a background due to not-cancelled residual-random non-linearities. Adding these parameters in the fit allows to avoid any further correction to the fitting results.

Further, preferably the method includes adding a further additional parameter $[C_j^n]_{l=0}{}^n$, which is the amplitude factors of a function $G_j(v_i; [C_j^n]_{l=0}{}^n)$, proportional to the spectrum profile $[\overline{g}_l(\delta v_{il}, w_{Rl})]_{l=0}{}^n$ $$G_j(v_i;[C_j^n]_{l=0}{}^n) = \Sigma_{l=0}{}^n C_j^n \overline{g}_l(\delta v_{il}, w_{Rl})$$ (Eq.85a)

is used to update the local parameters $$[\delta\gamma_{c_j}]_{j=1}^{d*m}.$$

The $[C_j^n]_{l=0}{}^n$ are amplitude factors to take into account the correlation between $\gamma_c$ and $\gamma_g$ for each spectral frequency $v_j$, both for the targeted absorption and for the l absorptions of other gases, respectively. They have not a physical meaning and they were introduced for improve calculation strategy. By adding this parameter, the cross correlation between $\gamma_c$ and $\gamma_g$, is taken into account in the local fits. Indeed, the global/local approach in the parametrization of the fit function imply that $\gamma_g(v_i)$ behavior is taken into account by the global parameters, whereas $\gamma_c(v_i)$ behavior is taken into account by the local parameters. Because the global parameters are kept fixed during fit of local parameters, and viceversa, this cross correlation is slowly propagated in the proper way in each of the correlated parameters, doing the GLFS routine very slow to converge. The introduction of the auxiliar global parameters allows us to transfer in a proper and quicker fashion this correlation, accelerating the convergence process.

Preferably, the method of the invention preferably includes parametrizing the non-linear function $f$ as:

homogeneous regime ($w_L \geq w_G$)

$$\left[\frac{df_j}{dt} = -\sum_{l=0}^{n} \gamma_l(0)g_l(0)\left[\frac{\ln\left[\frac{1+(\overline{A}_d+\delta A_{d_j})}{Z_{\hat{1}U}\overline{g}_l(\delta v_{il},w_{Rl})e^{-(\gamma_c+\delta\gamma_{c_j})^t}f_j}\right]}{(\overline{A}_d+\delta A_{d_j})Z_{\hat{1}U}e^{-(\gamma_c+\delta\gamma_{c_j})^t}} - d\frac{\ln\left[1+(\overline{A}_d+\delta A_{d_j})Z_d e^{-(\gamma_c+\delta\gamma_{c_j})^t}f_j\right]}{(\overline{A}_d+\delta A_{d_j})Z_d e^{-(\gamma_c+\delta\gamma_{c_j})^t}}\right]\right]_{j=1}^{d*m}$$ (Eq. 86)

and $\overline{g}_l(v_{il}, w_{Rl})$ is a Voigt function
inhomogeneous regime
still diffusive gas ($w_L < w_G$)

$$\left[\frac{df_j}{dt} = \frac{-\sum_{l=0}^{n}\frac{2\gamma_l(0)g_l(0)\overline{g}_l(\delta v_{il},w_{Rl})}{\sqrt{1+(\overline{A}_d+\delta A_{d_j})Z_{\hat{1}U}e^{-(\gamma_c+\delta\gamma_{c_j})^t}f_j+1}} - \frac{2d}{\sqrt{1+(\overline{A}_d+\delta A_{d_j})Z_d e^{-(\gamma_c+\delta\gamma_{c_j})^t}f_j+1}}}{f_j}\right]_{j=1}^{d*m}$$ (Eq. 87)

and $(\delta v_{il}, w_{Rl})$ is a Gaussian function
non-diffusive gas ($w_L \ll w_G$)

$$\left[\frac{df_j}{dt} = \left[-\sum_{l=0}^{n}\frac{1.4256\gamma_l(0)g_l(0)\overline{g}_l(\delta v_{il},w_{Rl})}{\sqrt{1+0.5(\overline{A}_d+\delta A_{d_j})Z_{\hat{1}U}e^{-(\gamma_c+\delta\gamma_{c_j})^t}f_j}+0.4256} - \frac{1.4256d}{\sqrt{1+0.5(\overline{A}_d+\delta A_{d_j})Z_d e^{-(\gamma_c+\delta\gamma_{c_j})^t}f_j}+0.4256}\right]f_j\right]_{j=1}^{d*m}$$ (Eq. 88)

and $\overline{g}_l(\delta v_{il}, w_{Rl})$ is a Gaussian function.

Preferably, said first fitting step is a least squares fitting. More preferably, said least square fitting uses the Levenberg-Marquardt (L-M) algorithm.

The method according to the second aspect of the invention follows a sequential strategy to calculate the final parameter values by fitting alternatively the local parameters while keeping fixed the global ones, and then by fitting the global parameters while keeping fixed the local ones. This sequence is repeated up to final convergence of all procedure as explained below.

Each element $S(t; p(v_i)_j)$ of the total decay function $S(t; p(v))$ is calculated from the following parametrization by using Eqs. 81-85:

$$S(t;p(v))=[\overline{B}+\delta B_j+(\overline{A}_d\pm\delta A_{d_j})e^{-\gamma_c(\delta v_i)_j t}\cdot f_j(t;\overline{A}_d,\overline{\gamma}_c,Z_d,d,\delta A_{d_j},\delta\gamma_{c_j},[C_j^n,Z_{1U},\gamma_l(o),g_1(0),\overline{g}_l(\delta v_{il},w_{Rl})]_{l=0}{}^n)]$$ (Eq. 89)

with the set of parameters $p(v)$ reduced to a set of global parameters, $p_{gb}(v)$ and a set of arrays of local parameters, $[p_{lc}]_{j=1}^{d*m}$ to be determined by fitting the recorded decays:

$p_{gb}(\nu)=[\overline{B},\overline{A}_d,\overline{\gamma}_c,Z_d,d,[C_l^\gamma,Z_{1U},\gamma_l(0),g_l(0),$
$\overline{g}_l(\delta\nu_{il},w_{Rl})]_{l=0}^n]$ (Eq. 90)

$[p_{lc_j}]_{j=1}^{d*m}=[\delta B_j,\delta A_{d_j},\delta\gamma_{c_j}]_{j=1}^{d*m}$ (Eq. 91)

after the $f$ function is evaluated by the numerical integration of the rate equation that applies to the case under analysis (Eqs. 86-88). A fourth-order Runge-Kutta (RK4) routine for such numerical integration has be used, but other integration routines can be used as well.

The first fitting step where a first group of parameters is free and the second group is fixed is depicted in the flowchart diagram of FIGS. 6A and 6B and it is described in the following:

1) Consider all the detected SCAR curves $[\{S_{exp}(t;\nu_i),\sigma_{exp}(t;\nu_i)\}_j]_{j=1}^{d*m}$ in the frequency interval $\nu_1<\nu_i<\nu_m$, for a sample that contains the target gas at the thermodynamic conditions (P, T)

2) Initialization procedure:
   Local parameters initialization $[p_{lc_j}^{ini}]_{j=1}^{d*m}=[\delta B_j^{ini},\delta A_{d_j}^{ini},\delta\gamma_{c_j}^{ini}]_{j=1}^{d*m}=[0,0,0]$ (Eq. 92)

Global parameters initialization: for $p_{gb}(\nu)$ two subset of parameters are considered:
   (a) The subset of free parameters $p_{gb}^{fr}$ $p_{gb}^{fr}=[\overline{B},\overline{A}_d,\overline{\gamma}_c,d,[C_l^\gamma,\gamma_l(0),g_l(0)]_{l=0}^n]=p_{gb}^{ini}$ (Eq. 93)

which is initialized to an initial expected set of values $p_{gb}^{ini}$ (b) The subset of fixed parameters $p_{gb}^{cal}$ $p_{gb}^{cal}(\nu)=[Z_d,[Z_{1U},\overline{g}_l(\delta\nu_{il},w_{Rl})]_{l=0}^n]^{cal}$ (Eq. 94)

which is initialized to the calibrated set of values $p_{gb}^{cal}$ determined following the procedure described below. They remaining unchanged across all fit procedure.

Other initializations: L-M limit convergence values, $\lambda_{max},\delta\chi_{max}^2,\chi_{min}^2$ and maximum number of interactions $N_{itr}$ 3) Minimization loop on local parameters $p_{lc_j}$
   Keeping fixed $p_{gb}^{fr}$ during this step, a L-M minimization loop is allowed on pt, by fitting each experimental SCAR decay, $\{S_{exp}(t;\nu_i),\sigma_{exp}(t;\nu_i)\}_j$ to the expected $S(t; p(\nu_i)_j)$ function, independently of the other detected decays. In this way, the space of free parameters is reduced to 3 for each j fit, easily to manage by L-M algorithms.

a) Keep fixed all global parameters to $p_{gb}^{fx}(\nu)=[p_{gb}^{fr},p_{gb}^{cal}(\nu)]$
   b) Consider a trial set of local parameters $p_{lc_j}^{try}=p_{lc_j}^{ini}$ with $\delta\gamma_{c_j}^{try}$ calculated by $\delta\gamma_{c_j}^{try}=\delta\gamma_{c_j}^{ini}+G_j(\nu_i;[C_l^\gamma]_{l=0}^n)$ (Eq. 95)

with $G_j(\nu_i;[C_l^\gamma]_{l=0}^n)$ given by (Eq. 85a). After the calculation of Eq. 95, the parameters $[C_l^\gamma]_{l=0}^n$ are reset to zero value.
   c) Perform a L-M minimization routine in the set of parameters $p(\nu_i)_j=[p_{gb}^{fx}(\nu_i),p_{lc_j}^{try}]$ for the free local parameters $p_{lc_j}^{try}$, i.e.
      c1) Calculate the element $S(t; p(\nu_i)_j)$, the $\chi^2(p_{lc_j}^{try})$ $\chi^2(p_{lc_j}^{try})=\sum_{t_k=0}^{t_{max}}\frac{(S_{exp}(t_k;\nu_i)-s(t_k;p(\nu_i)_j))^2}{\sigma_{exp}^2(t_k;\nu_i)}$ (Eq. 96)

the gradient $\beta(p_{lc_j}^{try})$, and the curvature matrix, $|\alpha|(p_{lc_j}^{try})$ c2) Solve the linear Eqs. of the L-M algorithm for the present problem, and calculate $\delta p_{lc_j}$,
   $\chi^2(p_{lc_j}^{try}+\delta p_{lc_j})$ and $\delta\chi^2=\chi^2(p_{lc_j}^{try}+\delta p_{lc_j})-\chi^2(p_{lc_j}^{try})$
      If $\delta\chi^2>0$ then $\lambda=k^*\lambda$ and $p_{lc_j}^{try}=p_{lc_j}^{try}$
      If $\delta\chi^2<0$ then $\lambda=\lambda/k$ and $p_{lc_j}^{try}=p_{lc_j}^{try}+\delta p_{lc_j}$
   c3) Follow the L-M convergence criteria on $\lambda$ and/or $\chi^2$ and/or $\delta\chi^2$, i.e.
      If $\lambda<\lambda_{max}$ and $\chi^2>\chi_{min}^2$ and $\delta\chi^2>\delta\chi_{max}^2$, the solution does not converge, and come back to step c1) with an update value of $\lambda$ and/or $p_{lc_j}^{try}=p_{lc_j}^{try}+\delta p_{lc_j}$
      If $\lambda>\lambda_{max}$ and/or $\chi^2<\chi_{min}^2$ and/or $\delta\chi^2>\delta\chi_{max}^2$, the solution converges
   c4) At convergence, a fitted set of local parameters $p_{lc_j}^{fit}$ of the equal to the last guess $p_{lc_j}^{try}$ is determined. $\lambda$ is reset to the initial value.

d) Repeat steps b) to c) up to j=1 ... d*m, i.e. the total number of detected SCAR decays for the i=1 ... m frequency steps in the $\nu_1\leq\nu_i\leq\nu_m$ spectral range, repeated by d times.

Therefore in this first step only the local parameters were allowed to vary, that is the minimization of $\chi^2$ is made only on the local parameters, while the others were kept fixed.

Preferably, said second fitting step is a least squares fitting. More preferably, said least square fitting uses the Levenberg-Marquardt (L-M) algorithm.

This second fitting procedure is depicted in FIGS. 7A and 7B. In this second fit, the local parameters are set to the values found in the first fitting step, while the global parameters are free to vary in the second fitting procedure.

1) Minimization loop on free global parameters $p_{gb}^{fr}$
   a) Calculate the global weighted mean deviations of local parameters $\overline{P}_{lc}=[\overline{\delta B},\overline{\delta A}_d,\overline{\delta\gamma}_c]$ $$\overline{\delta B}=\frac{\sum_{j=1}^{d*m}\sigma^{-2}(\delta B)_j^{fit}\delta B_j^{fit}}{\sum_{j=1}^{d*m}\sigma^{-2}(\delta B)_j^{fit}}$$ (Eq. 97)

$$\overline{\delta A}_d=\frac{\sum_{j=1}^{d*m}\sigma^{-2}(\delta A_d)_j^{fit}\delta A_{d_j}^{fit}}{\sum_{j=1}^{d*m}\sigma^{-2}(\delta A_d)_j^{fit}}$$

$$\overline{\delta\gamma}_c=\frac{\sum_{j=1}^{d*m}\sigma^{-2}(\delta\gamma_c)_j^{fit}\delta\gamma_{c_j}^{fit}}{\sum_{j=1}^{d*m}\sigma^{-2}(\delta\gamma_c)_j^{fit}}$$

with $\sigma(p_{lc}^{fit})=[\sigma(\delta B)_j^{fit},\sigma(\delta A_d)_j^{fit},\sigma(\delta\gamma_c)_j^{fit}]_{j=1}^{d*m}$ the calculated uncertainties of the fitted local parameters as described in step 3) of the first fitting procedure.

b) Update the fitted local parameters by:

$\delta B_j^{fit}=\delta B_j^{fit}-\overline{\delta B}$ $\delta A_{d_j}^{fit}=\delta A_{d_j}^{fit}-\overline{\delta A}_d$ $\delta\gamma_{c_j}^{fit}=\delta\gamma_{c_j}^{fit}-\overline{\delta\gamma}_c$ (Eq. 98)

and keep them fixed during the rest of the step 4)

c) Considers a trial of free global parameters $p_{gb}^{fr}=p_{gb}^{try}=p_{gb}^{ini}$ d) Perform a L-M minimization routine in the set of parameters $$p(v) = \left[ p_{gb}^{try}, p_{gb}^{cal}(v), [p_{lc_j}^{fit}]_{j=1}^{d*m} \right]$$

for the free global parameters $p_{gb}^{try}$, i.e.
d1) Calculate the elements $[\bar{S}(t; p(v_i)_j)]_{j=1}^{d*m}$, the $\chi^2$ ($p_{gb}^{try}$)

$$\chi^2(p_{gb}^{try}) = \sum_{j=1}^{d*m} \sum_{t_k=0}^{i_{max}} \frac{(S_{exp}(t_k; v_i) - S(t_k; p(v_i)_j))^2}{\sigma_{exp}^2(t_k; v_i)} \quad \text{(Eq. 99)}$$

the gradient $\beta(p_{gb}^{try})$, and the curvature matrix, $|\alpha|$ ($p_{gb}^{try}$)
d2) Solve the linear Eqs. of the L-M algorithm for the present problem, and calculate $\delta p_{gb}$, $\chi^2(p_{gb}^{try}+\delta p_{gb})$ and $\delta\chi^2=\chi^2(p_{gb}^{try}+\delta p_{gb})-\chi^2(p_{gb}^{try})$ If $\delta\chi^2>0$ then $\lambda=k*\lambda$ and $p_{gb}^{try}=p_{gb}^{try}$
If $\delta\chi^2<0$ then $\lambda=\lambda/k$ and $p_{gb}^{try}=p_{gb}^{try}+\delta p_{gb}$ d3) Follow the L-M convergence criteria on $\lambda$ and/or $\chi^2$ and/or $\delta\chi^2$, i.e.
If $\lambda<\lambda_{max}$ and $\chi^2>\chi_{min}^2$ and $\delta\chi^2>\delta\chi_{max}^2$, the solution does not converge, and come back to step 3) of this recipe with an updated value of $\lambda$ and/or $p_{gb}^{try}=p_{gb}^{try}+\delta p_{gb}$, and $[p_{lc_j}^{try}=p_{lc_j}^{fit}]_{j=1}^{d*m}$
If $\lambda<\lambda_{max}$ and $\chi^2<\chi_{min}^2$ and/or $\delta\chi^2<\delta\chi_{max}^2$, try a new minimization loop from the step 3) up to 4)d2) with an updated value of $\lambda$ and/or $p_{gb}^{try}=p_{gb}^{try}+\delta p_{gb}$, and $[p_{lc_j}^{try}=p_{lc_j}^{try}]_{j=1}^{d*m}$, to verify if this is the best fit of all set of fitted parameters. After this loop go to step 4)e).

e) If $\chi^2<\chi_{min}^2$ and/or $\delta\chi^2<\delta\chi_{max}^2$ and/or $\lambda>\lambda_{max}$ the final convergence of the fit is reached and a set of the fitted parameters $$\left[ p_{gb}^{fit}, [p_{lc_j}^{fit}]_{j=1}^{d*m} \right]$$

of the equal to the last guess $$\left[ p_{gb}^{try}, [p_{lc_j}^{try}]_{j=1}^{d*m} \right]$$

is determined.
2) Calculate the concentration of the target gas by $$N_0 = \frac{\gamma_0^{fit}(0) g_0^{fit}(0)}{c^2 L_S(T)} \quad \text{(Eq. 100)}$$

Using the results of the first and second fitting step.
Advantageously, the method of the invention includes the step of:
Dividing the second group of parameter in a first sub-group of free parameters and a second sub-group of calibration parameters which are set equal to calibration values which remain constant during the first and second fitting steps.

As shown in the explanation of an embodiment of the first fitting step above, in particular in (Eq. 94), not all parameters denominated "global parameters" (that is, the second group of parameters) are freely varying during the second step of the fitting method. Some of them are equal to a value which is calculated and fixed before the fitting routine.

More preferably, the sub-group of calibration parameters includes:

$p_{gb}^{cal}(v)=[Z_d,[Z_{1U1},\bar{g}_l(\delta v_{il},w_{Rl})]_{l=0}{}^n]^{cal}$ Where $\{_1(v_i-v_l,w_{Rl})\}_{l=0}{}^n$ are the peak normalized line profiles for each transition $l=0 \ldots n$, centered at the resonance frequency $v_l$ and linewidth $w_{Rl}$, and
$Z_d$ is the "equivalent"-saturation parameter at 1U due to residual detection non-linearities, in $U^{-1}$.

Calibration routines of the fixed set of parameters, $p_{gb}^{cal}$ (see Eq. 94), used in the second aspect of the method of the invention for the analysis of the SCAR signals are preferably implemented. This calibration is preferably performed for each SCAR apparatus for the same thermodynamic conditions (Pressure, Temperature) of the sample mixture used in the trace gas detection to which the method according to the second aspect will be applied.

A first calibration routine is relative to the calibration of $[Z_{1U0},\bar{g}_0(\delta v_{i0},w_{R0})]^{cal}$ The first calibration concerns the saturation parameter at 1U, $Z_{1U0}$, and absorption lineshape $\bar{g}_0(\delta v_{i0},w_{R0})$ of the transition of the target gas (l=0) that absorb cavity-resonant light in the recorded spectral range.

The experimental decay curves used in this calibration routine are recorded with a sample gas mixture enriched with the target gas to be calibrated, that is in a condition in which the concentration of the target gas in the cavity is equal to a second concentration much higher than the first concentration. This enrichment must be enough to measure a spectrum $\gamma_0(v)$ with high S/N for the target transition. The thermodynamic conditions (P,T) of these enriched sample mixture are the same of the sample mixture used in the trace gas detection (that is, when the first concentration is calculated). This approach to consider a high S/N spectrum for the target transition allows on one side to determine the calibrated parameters for this transition with high precision and accuracy and on the other side to consider negligible the contribution of the other $k=1, \ldots, n$ transitions and detected residual non-linearities (i.e $d=0$).

The recipe, schematically depicted in FIG. 8, is the following:
1) Consider all the SCAR curves (j=1, ..., d*m) detected in the spectral range $v_1 \leq v_i \leq v_m$ for the enriched sample for the target gas $\{S_{exp}^{\uparrow S/N}(t, v), \sigma_{exp}^{\uparrow S/N}(t; v)\}= [\{S_{exp}^{\uparrow S/N}(t; v_i), \sigma_{exp}^{\uparrow S/N}(t; v_i)\}_j]_{j=1}^{d*m}$
2) Fit this data by using the method of the invention according to the second aspect described in the section above with the set of parameters $p(v)=p^{\uparrow S/N}(v)$:

$p^{\uparrow S/N}(v)=[p_{gb}^{\uparrow S/N}(v),[p_{lc_j}]_{j=1}^{d*m}]$ (Eq.101)

with $p_{gb}^{\uparrow S/N}(v)=[\bar{B},\bar{A}_d,\bar{\gamma}_c,C_0{}^\gamma,Z_{1U0},\gamma_0{}^{\uparrow S/N}(0),g_0{}^{\uparrow S/N}(0),$
$\bar{g}_0(v_{i0},w_{R0})]$ (Eq.102)

$[p_{lc_j}]_{j=1}^{d*m}=[\delta B_j,\delta A_d,\delta \gamma_{c_j}]_{j=1}^{d*m}$ i.e. keeping free all spectral parameters that define the target transition and fixed to zero the spectral parameters of the other lines and $d=0$.

3) At the convergence of the above step, the calibrated values $p_{gb_0}^{cal}=[Z_{1U0},\bar{g}_0(\delta v_{i0},w_{R0})]^{cal}$ equal to the fitted values $[Z_{1U0},\bar{g}_0(\delta v_{i0},w_{R0})]^{fit}$ are determined.

A second calibration routine is relative to $$[Z_d,[Z_{1Ul},\bar{g}_l(\delta v_{il},w_{Rl})]_{l=1}^n]^{cal}$$

In this case the routine concerns the calibration of the saturation parameters and line-shapes of all other absorbing transitions different from the target one (l=1 . . . n), as well as the parameters that define the residual non-linearity, $Z_d$.

Differently from the first calibration routine, this routine uses a gas sample mixture totally depleted of the target gas at the same Pressure and Temperature conditions of those used in the trace gas experiment. In this situation there is no absorption from the target gas for the detected SCAR signals, $$\{S_{exp}^{\downarrow S/N}(t;v),\sigma_{exp}^{\downarrow S/N}(t;v)\}=[\{S_{exp}^{\downarrow S/N}(t;v_i),\sigma_{exp}^{\downarrow S/N}(t;v_i)\}_j]_{j=1}^{d*m},$$

and the parameters related with the target gas (l=0) must be considered negligible.

The recipe, schematically depicted in FIG. 9, is the following:

1) Consider all the SCAR curves (j=1, . . . , d*m) detected in the spectral range $v_1 \leq v_i \leq v_m$ for the totally depleted sample for the target gas, $$\{S_{exp}^{\downarrow S/N}(t;v),\sigma_{exp}^{\downarrow S/N}(t;v)\}=[\{S_{exp}^{\downarrow S/N}(t;v_i),\sigma_{exp}^{\downarrow S/N}(t;v_i)\}_j]_{j=1}^{d*m}$$

2) Fit this data by using the method of the invention according to the second aspect described in the section above with the set of parameters $p(v)=p^{\downarrow S/N}(v)$:

$$p^{\downarrow S/N}(v)=[p_{gb}^{\downarrow S/N}(v),[p_{lcj}]_{j=1}^{d*m}] \quad (Eq.103)$$

with $$p_{gb}^{\downarrow S/N}(v)=[\bar{B},\bar{A}_d,\bar{\gamma}_c,d,Z_c,[C_l^\gamma,Z_{1Ul},\gamma_l^{\downarrow S/N}(0),g_l^{\downarrow S/N}(0),$$
$$\bar{g}_l(\delta v_{il},w_{Rl})]_{l=1}^n] \quad (Eq.104)$$

$$[p_{lcj}]_{j=1}^{d*m}=[\delta B_j,\delta A_{dj},\delta \gamma_{cj}]_{j=1}^{d*m}$$

3) At the convergence of the above step, the calibrated values $[p_{gb_j}^{cal}]_{l=1}^{cal}=[Z_d,[Z_{1Ul},\bar{g}_l((\delta v_{il},w_{Rl})]_{l=1}^n]^{cal}$ equal to the fitted values $[Z_d,[Z_{1Ul},\bar{g}_l(\delta v_{il},w_{Rl})]_{l=1}^n]^{fit}$ are determined.

BRIEF DESCRIPTION OF THE DRAWINGS

The invention will be now described in a non-limiting manner with reference to the appended drawing, in which.

DETAILED DESCRIPTION OF AN EMBODIMENT

Figure 1:
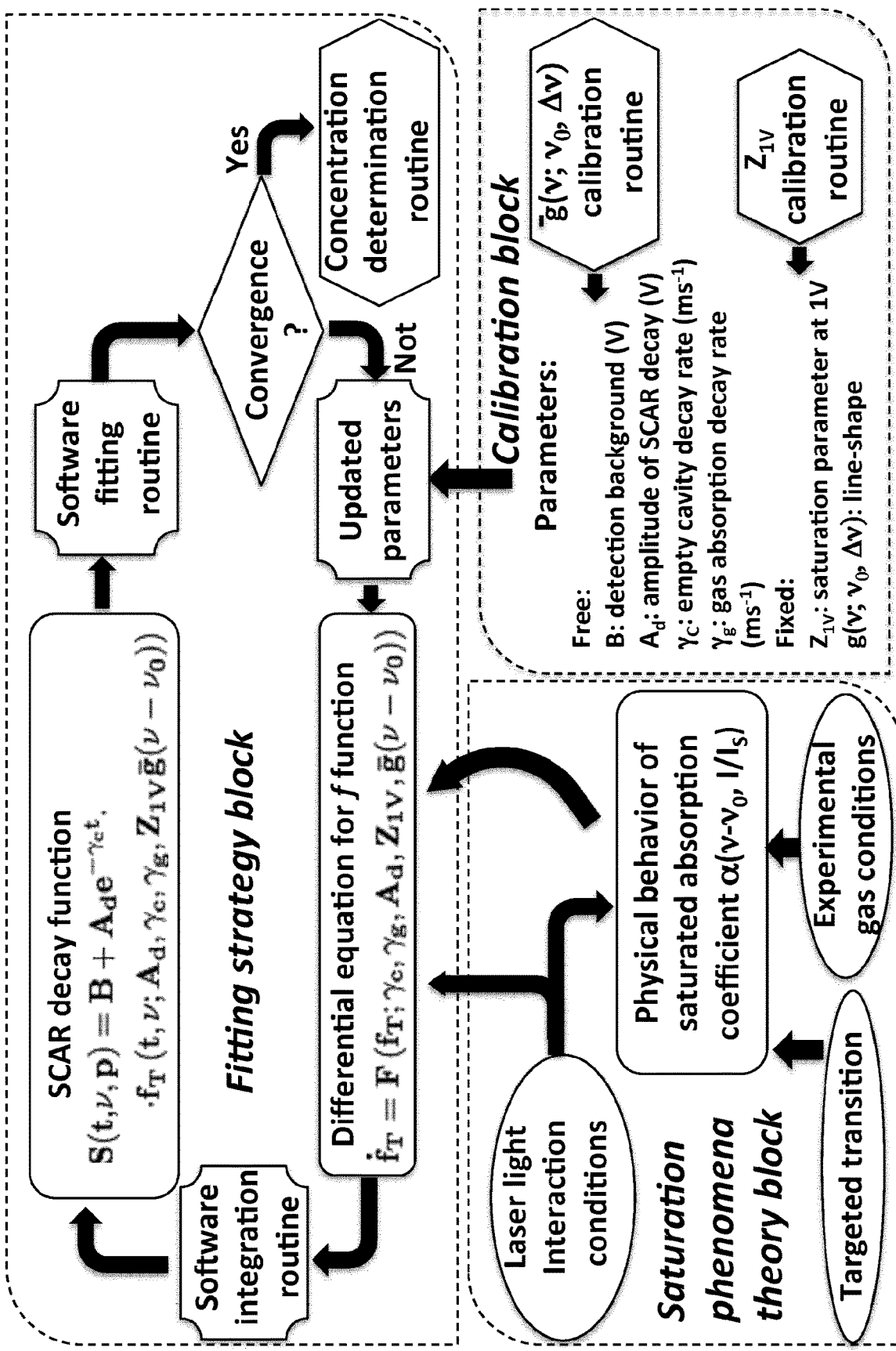
FIGS. 1-4 and 5A-5B are different method steps of the method of the invention according to its first aspect.
Figure 2:
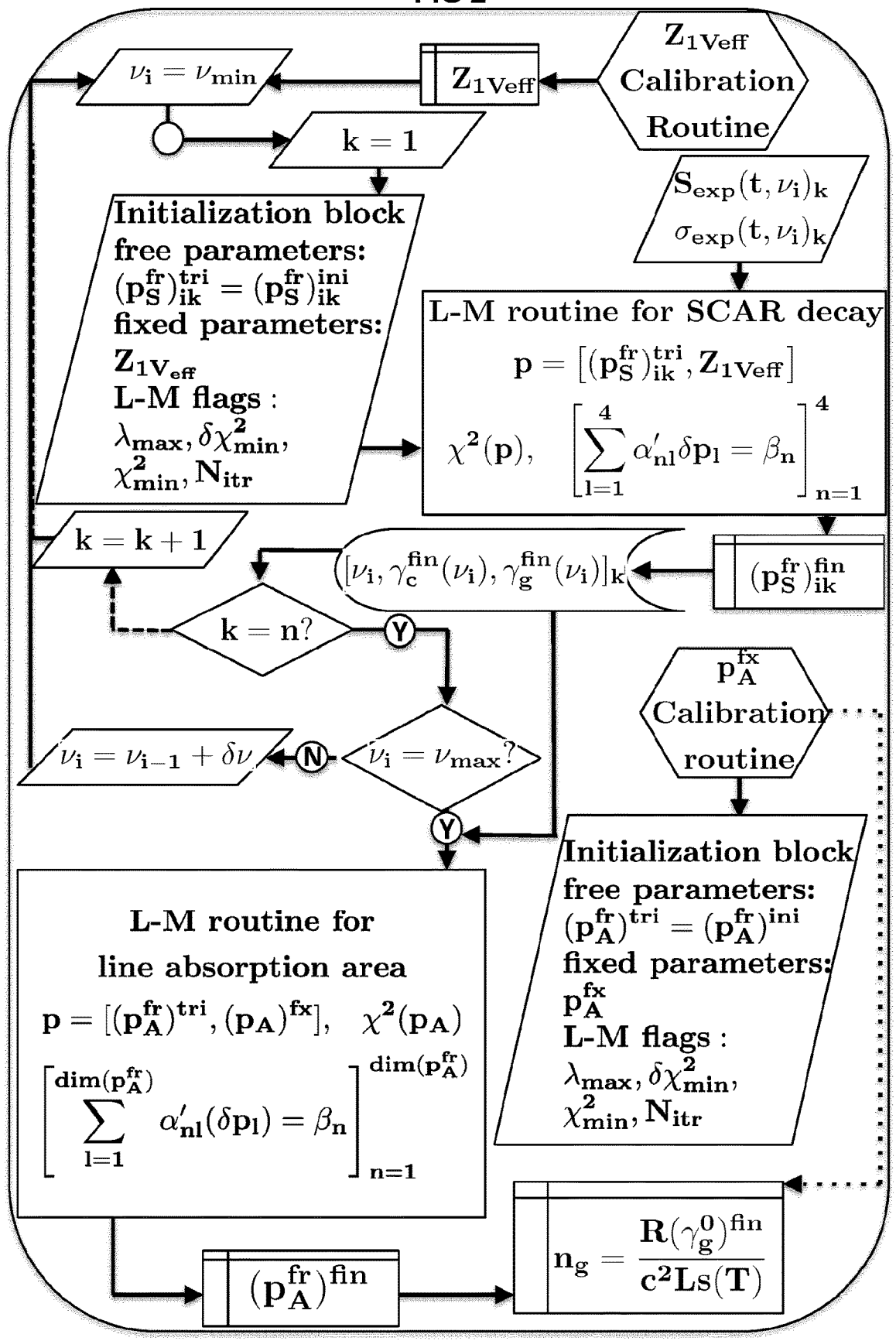
Figure 3:
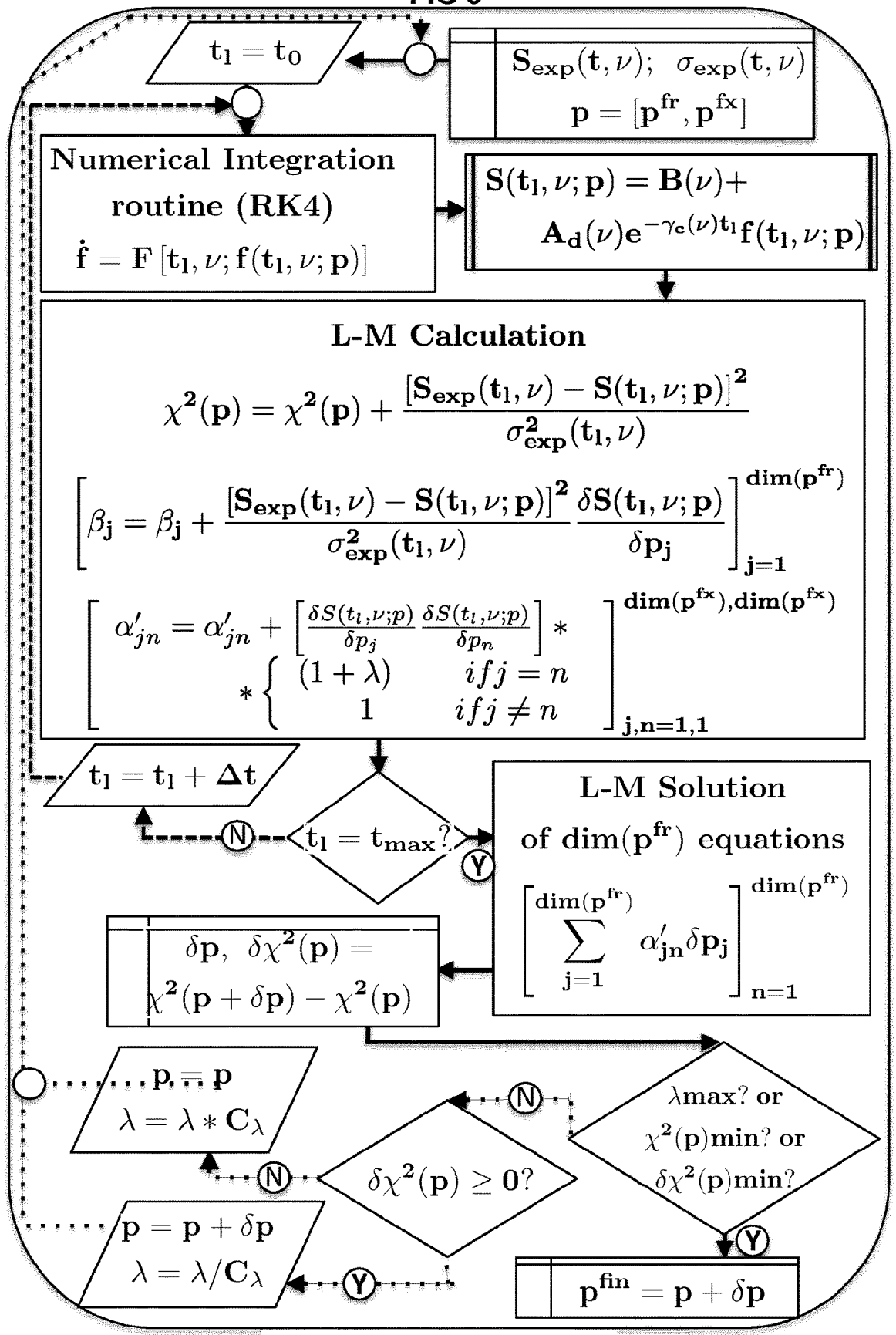
Figure 4:
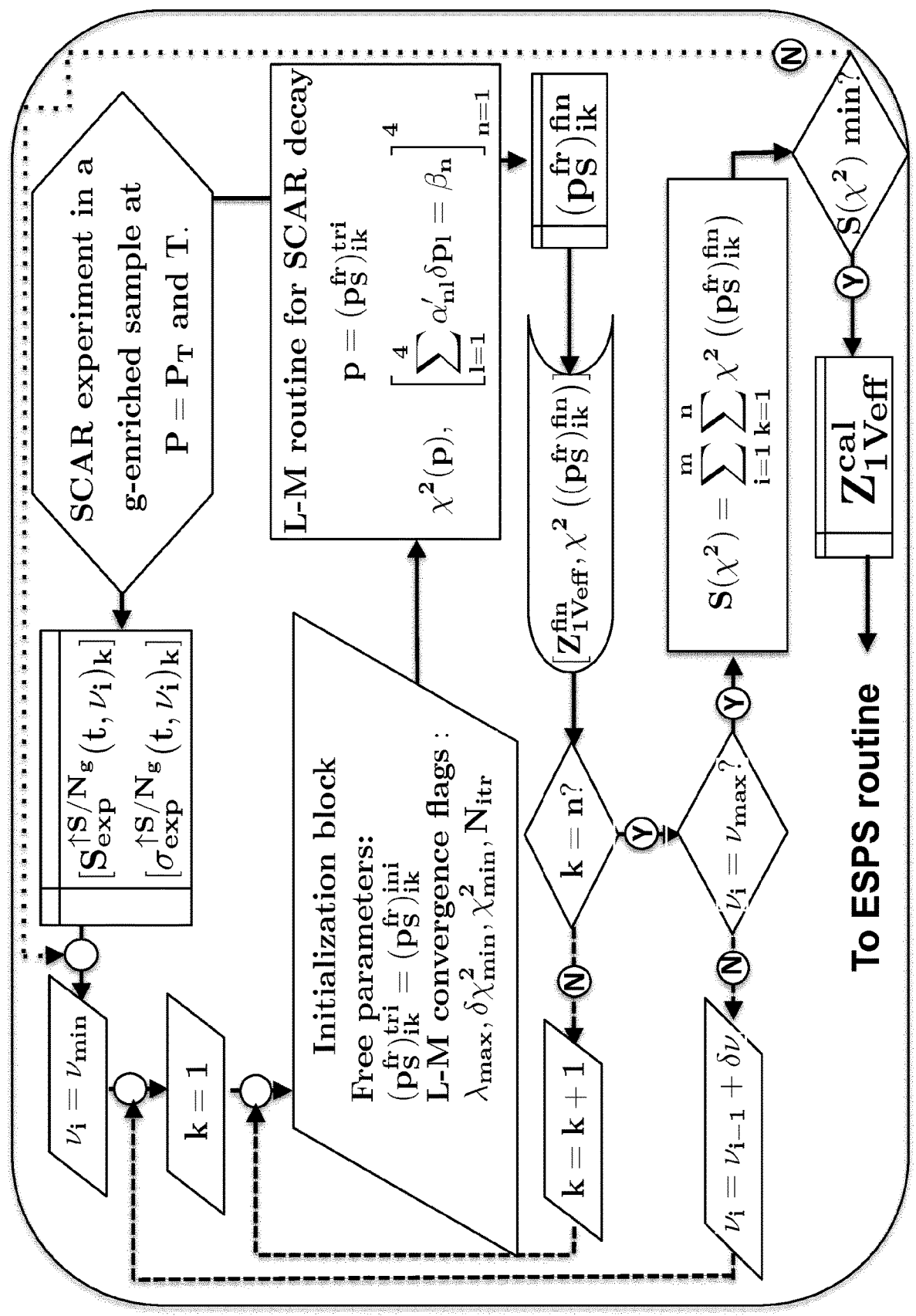
Figure 5A:
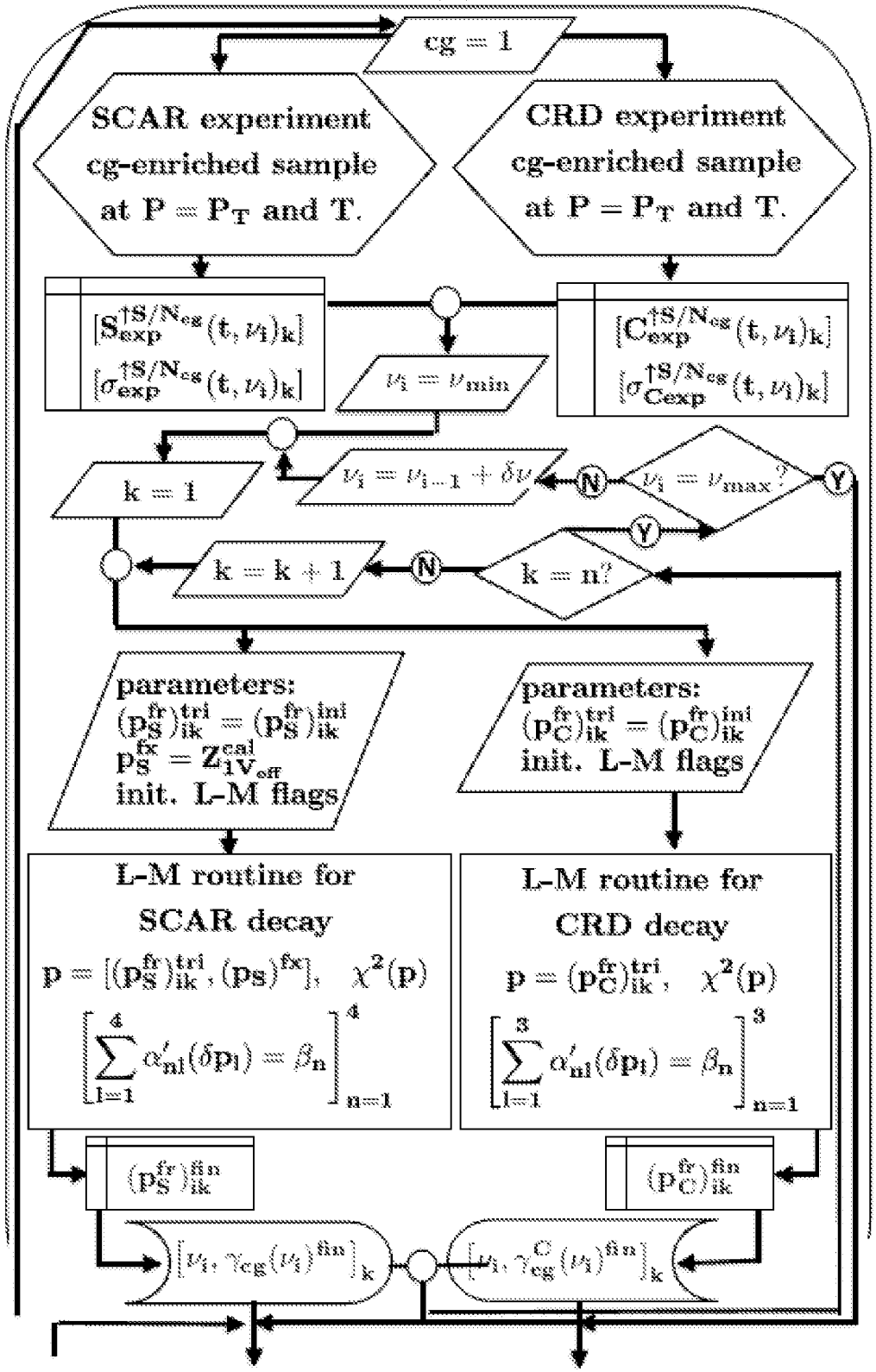
Figure 5B:
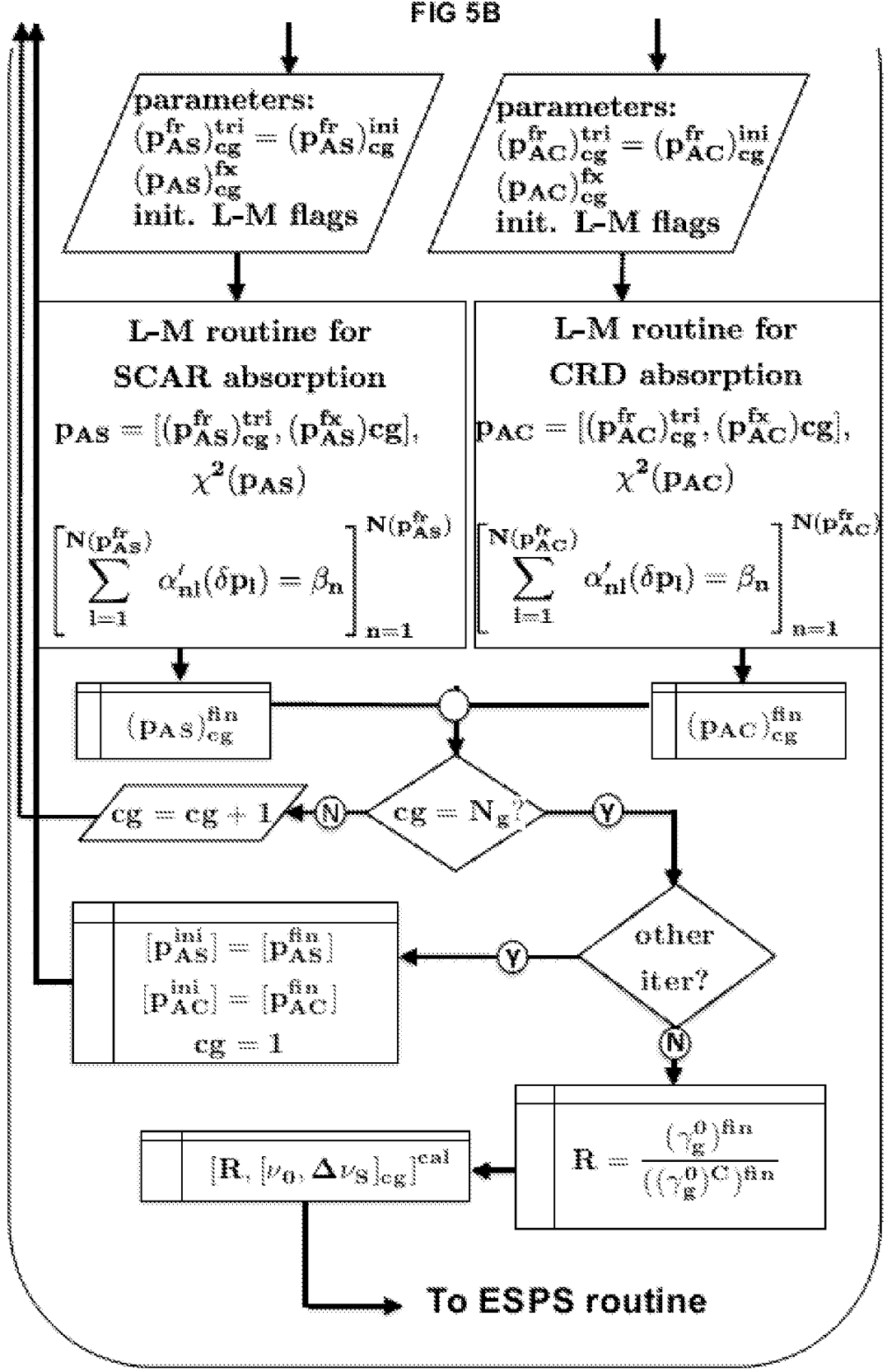
Figure 6A:
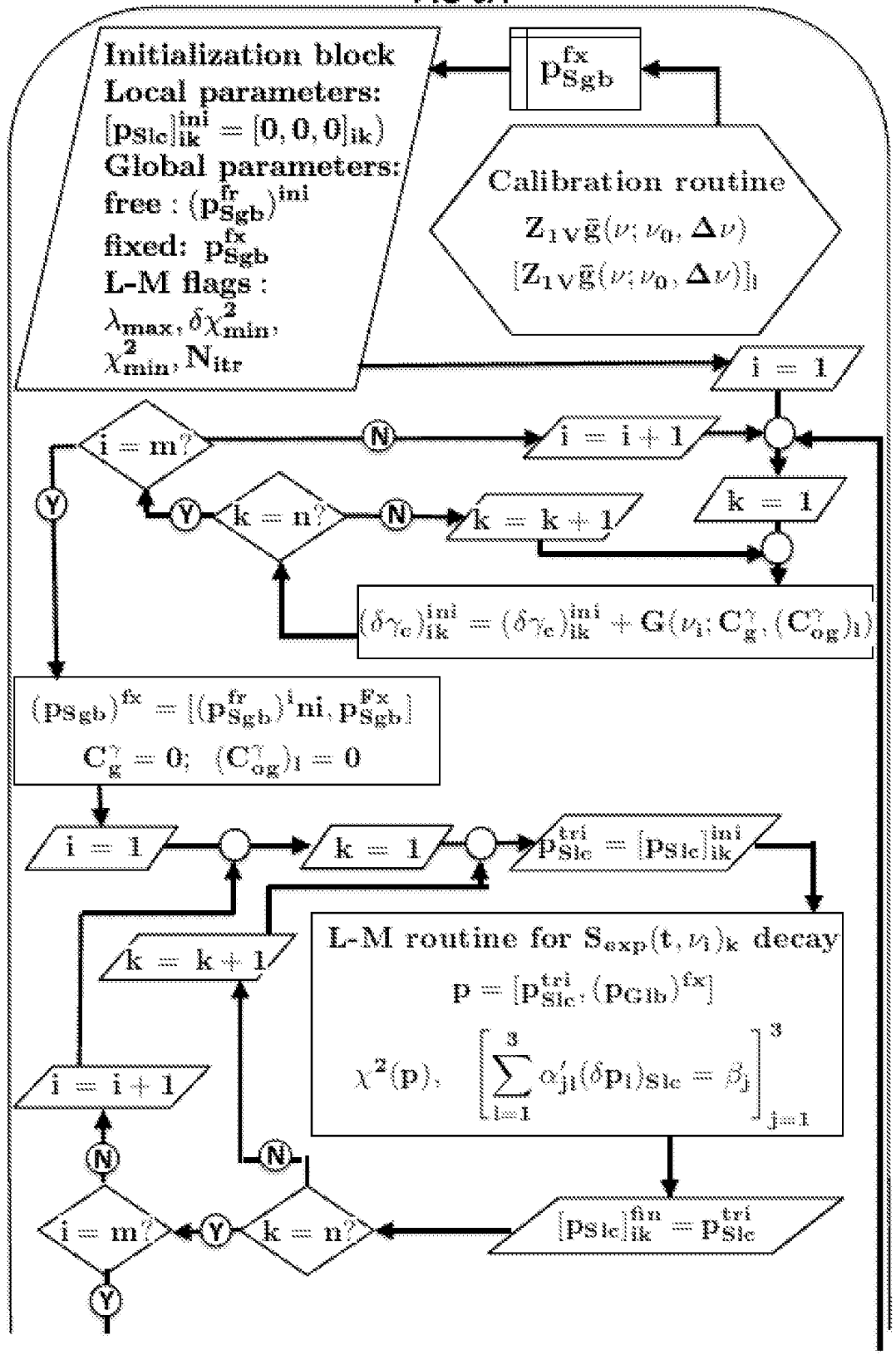
FIGS. 6A-6B, 7A-7B, 8 and 9 are different method steps of the method of the invention according to its second aspect.
Figure 6B:
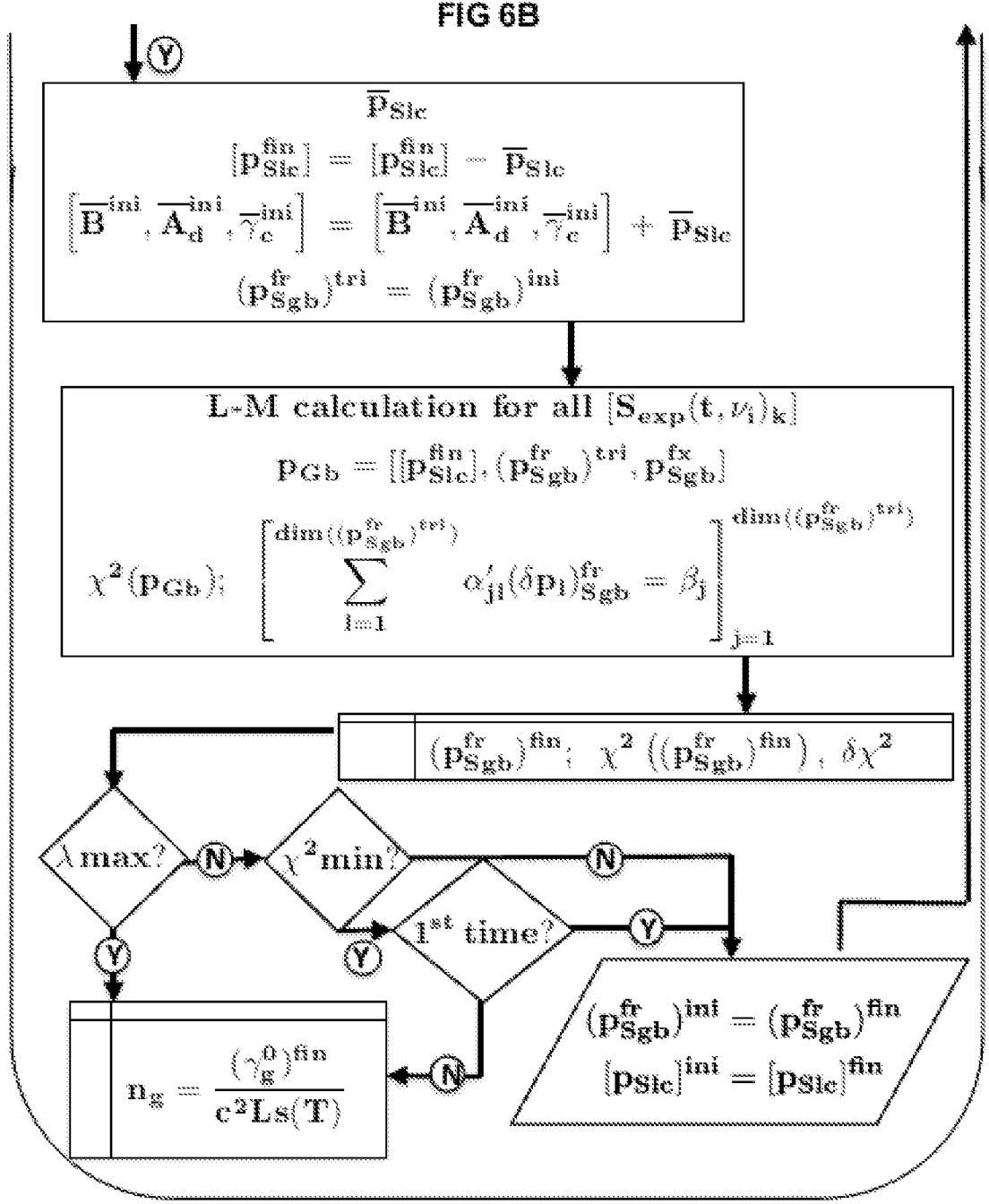
Figure 7A:
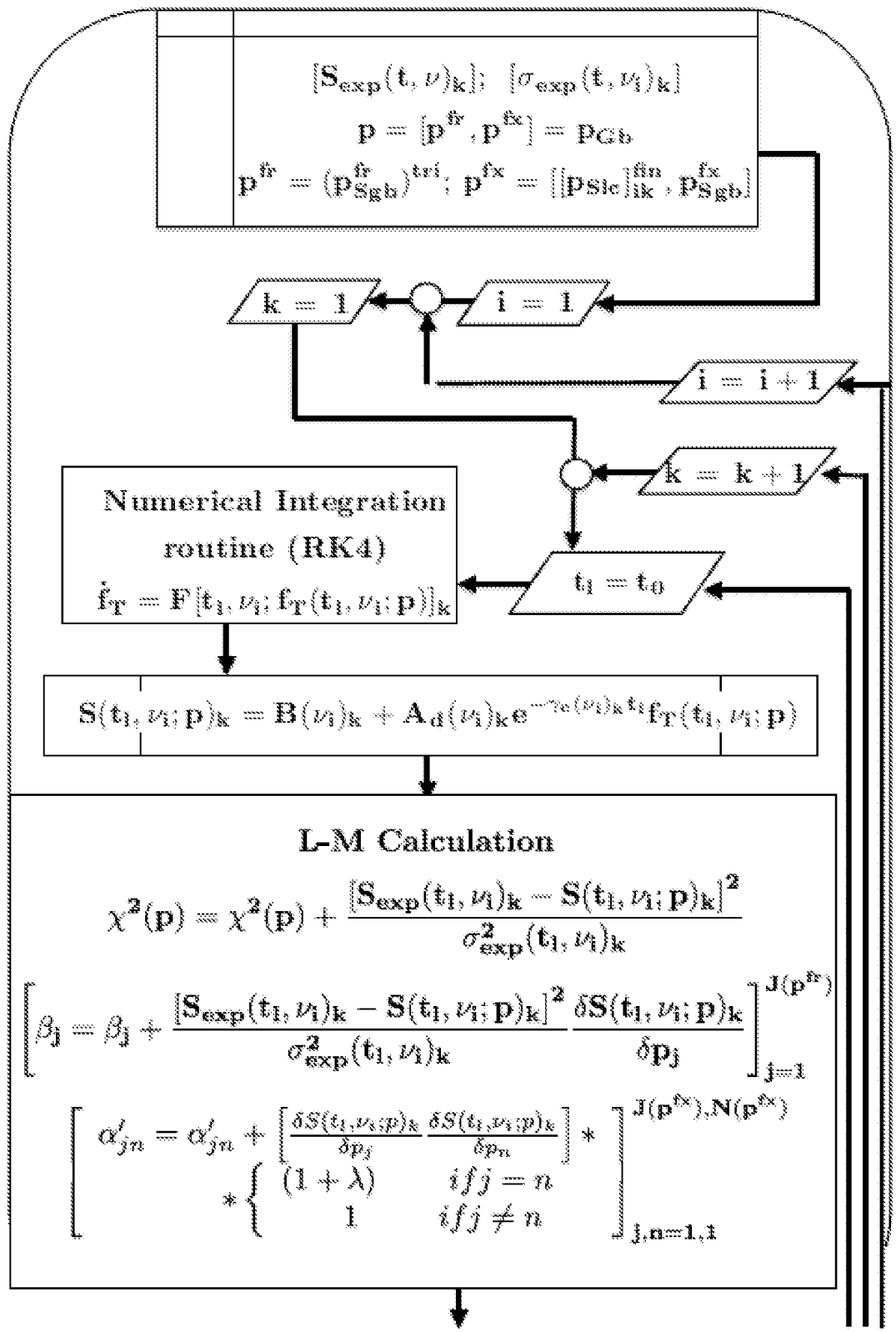
Figure 7B:
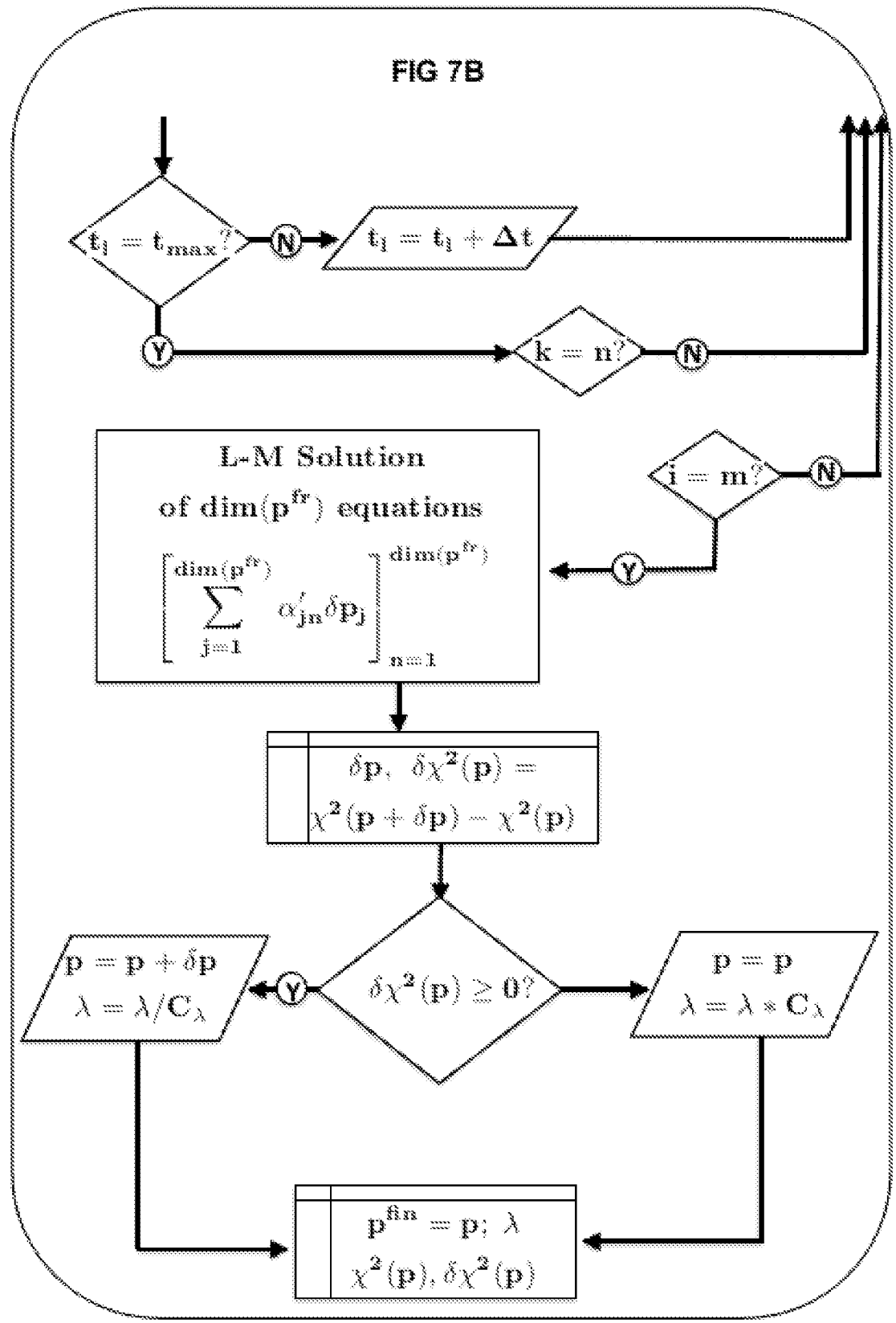
Figure 8:
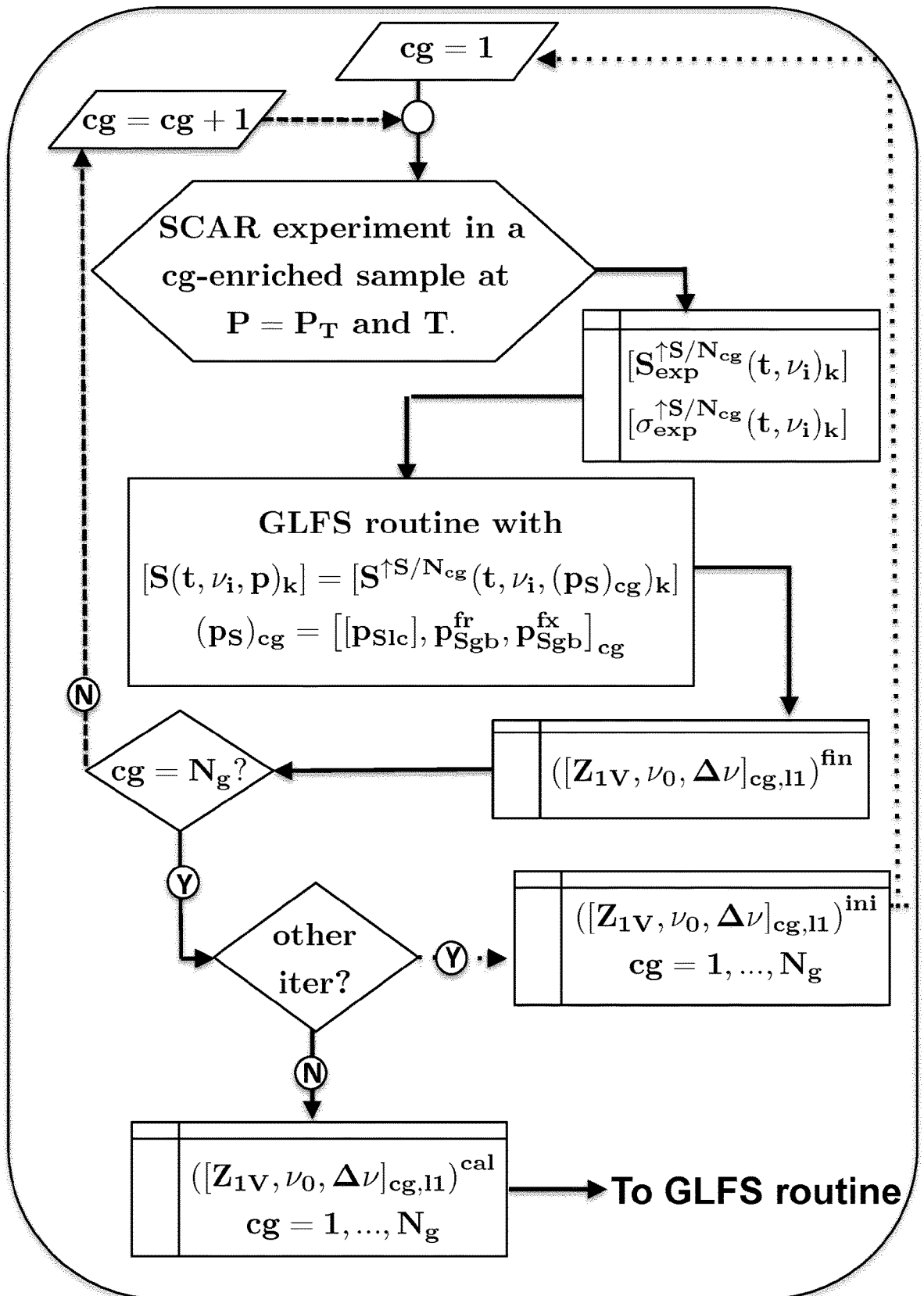
Figure 9:
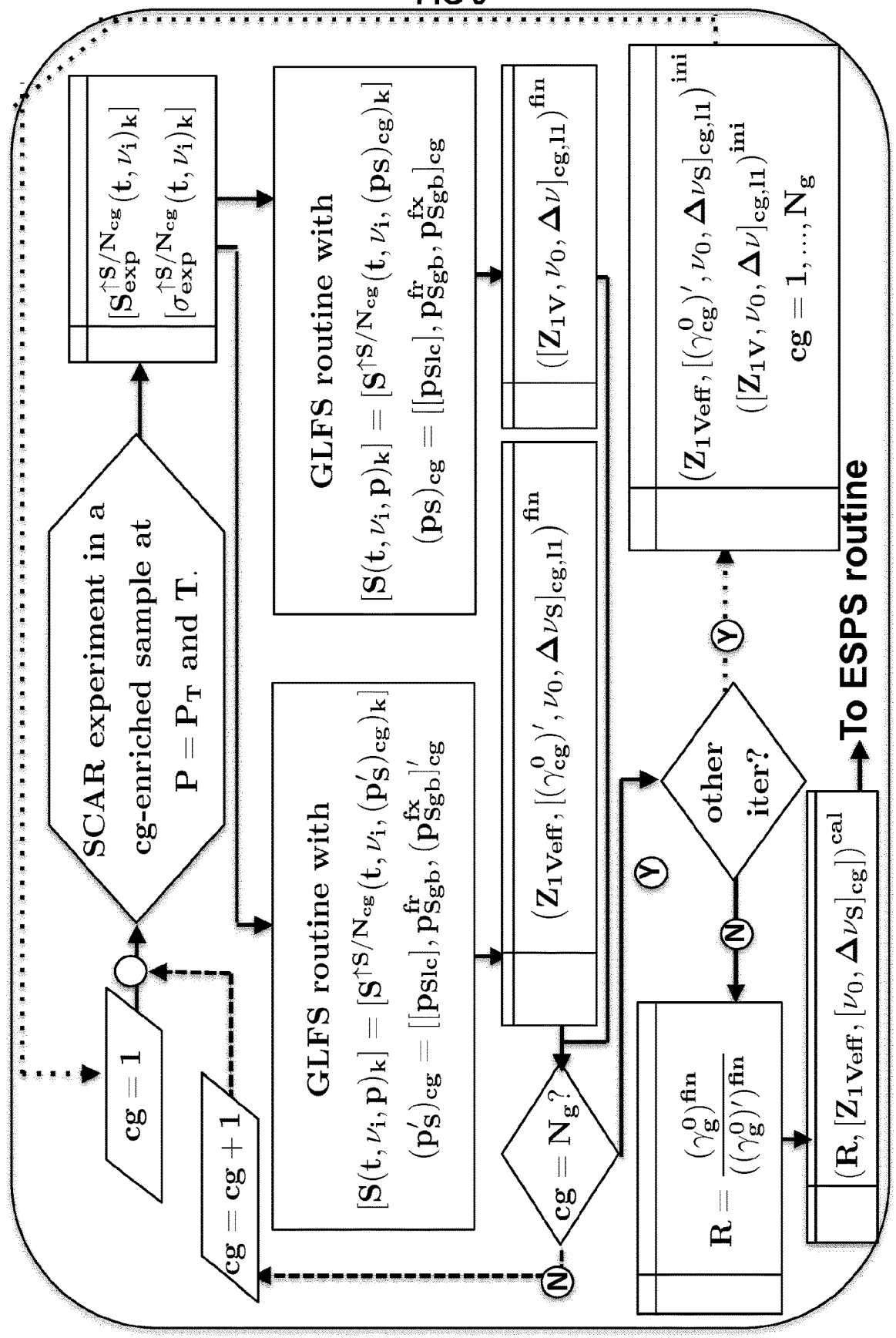
Figure 10:
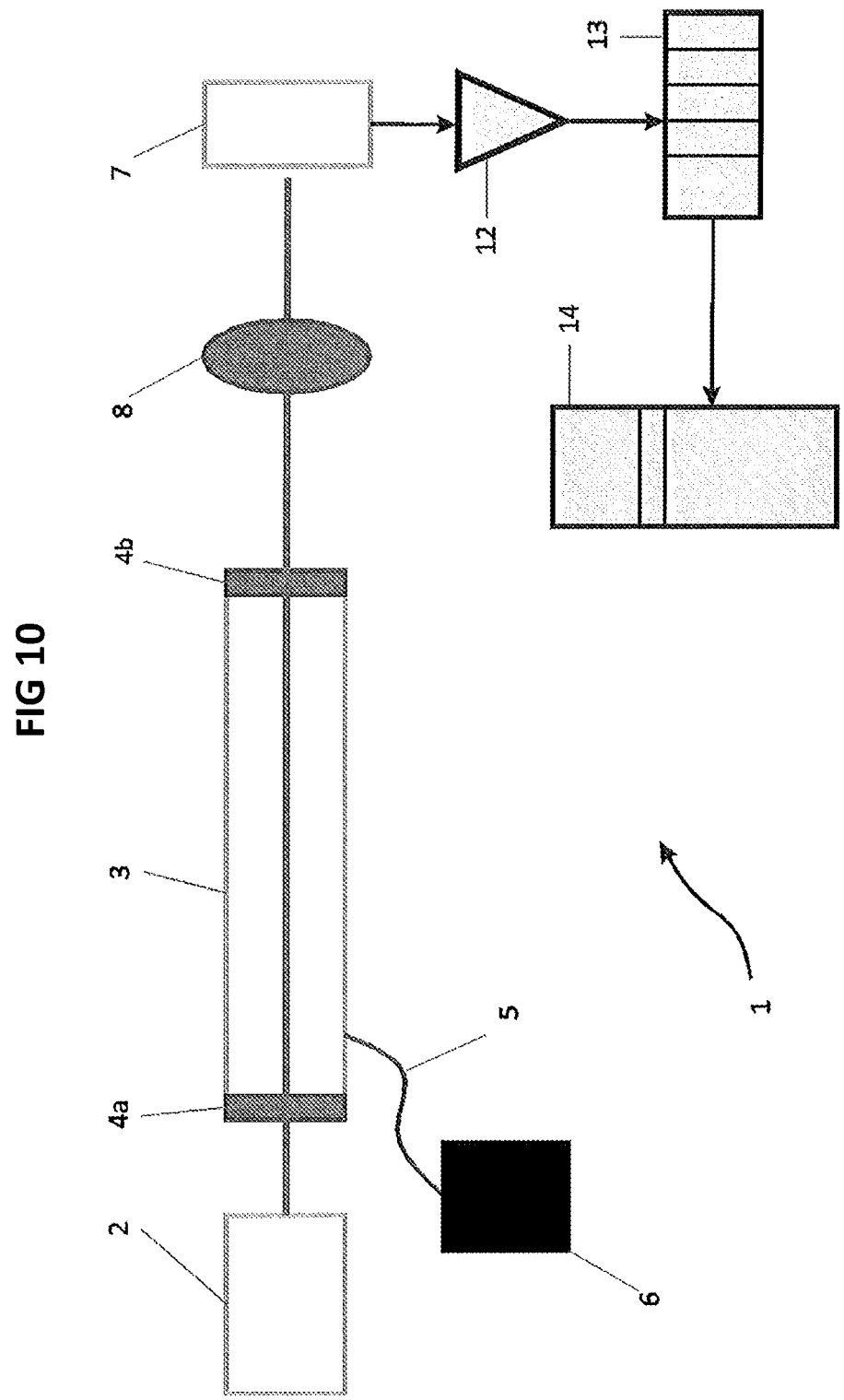
FIG. 10 is a schematic diagram of an apparatus to perform the method of the invention according to the first or to the second aspect.

With initial reference to FIG. 10, reference numeral 1 indicates an apparatus for SCAR spectroscopy including a laser source 2, for example a continuous wave (CW) coherent laser source generated by a frequency difference tunable over a predetermined range.

Preferably, the radiation emitted by laser source 2 has a wavelength in the mid-infrared, however other wavelengths may be used. The mid-infrared has the advantage of having the strongest molecular absorption.

The type of laser source 2 used in the present invention is for example described in the article written by Galli et al., Opt. Lett. 35, 3616 (2010). Other types of laser sources may be used, provided that the intensity of radiation I inside the cavity is much greater than the intensity of saturation Is of the molecular transition to be detected, i.e. I>>$I_s$.

For example, in a range of wavelengths of 4-5 μm, for the transitions of $CO_2$, which have an Einstein coefficient A of about 200 $s^{-1}$, at a pressure of about 12 mbar, Voigt enlargement condition, the power emitted by the laser must be greater than 20 mW, preferably greater than 100 mW.

Device 1 further includes a resonant cavity 3, for example, a cavity having a length of 1 m, provided at opposite ends thereof with two reflecting mirrors 4a and 4b. Preferably, the reflectivity of the mirrors is greater than 99.9%, even more preferably it is greater than 99.99%.

The gas of which the concentration has to be measured is introduced into cavity 3, for example through a duct 5 which connects cavity 3 to a suitable container, such as a cylinder 6.

Apparatus 1 further includes a photodetector 7 suitably arranged for detecting the radiation beam outgoing from cavity 3 as well as a diffuser element 8 interposed between cavity 3 and photodetector 7.

The diffuser element 8 is adapted to diffuse the laser beam exiting cavity 3 before it impinges on photodetector 7.

Experiment 1

The SCAR apparatus is composed of an IR laser emitting around 4.5 μm, where $^{14}CO_2$ absorbs, a high-finesse Fabry-Perot cavity and an IR-detector followed by amplifying and digitalizing electronics.

The IR radiation is provided by an Optical-Frequency-Comb (OFC) assisted Difference-Frequency-Generation (DFG) continuous-wave (CW) coherent source ("Ti:sap-

*phire laser intracavity difference-frequency generation of 30 mW cw radiation around 4.5 μm*", I. Galli et al, Opt. Lett. 35, 3616 (2010)). The DFG process occurs inside the cavity of a Ti:Sapphire laser operating around 850 nm (pump laser), single-mode controlled by an injected extended-cavity diode-laser (ECDL). A Nd:YAG laser at 1064 nm, amplified up to 10 W using an Yb-doped fiber amplifier provides the DFG signal laser. It is mixed with the intracavity Ti:Sapphire radiation through a periodically-poled lithium niobate nonlinear crystal. The frequency of the ECDL is phase-locked to the Nd:YAG frequency by direct digital synthesis, using the OFC to cover the frequency gap (about 70 THz) between the two CW lasers ("*Ultra-stable, widely tunable and absolutely linked mid-IR coherent source*", I. Galli et al., Opt. Express 17, 9582 (2009)). In this way, the linewidth of the IR generated radiation is given by a fraction of the narrow Nd:YAG linewidth (about 5 kHz in 1 ms integration time), thus allowing a highly efficient coupling of the IR radiation to the high-finesse Fabry-Perot cavity. Moreover, the frequency chain used to cover the frequency difference between both signal and pump lasers of the DFG process, includes a microwave synthesizer. In this way, frequency of the generated IR radiation is scanned and tuned in a synthesized way by changing the microwave frequency. In addition, the Nd:YAG frequency is stabilized against the nearest tooth of the OFC. As a consequence, the IR frequency is absolutely traceable against the primary frequency standard with a precision of $6 \times 10^{-13}$ in 1 s and an accuracy of $2 \times 10^{-12}$. Moreover, the intracavity DFG boosts the generated IR power up to 30 mW around 4.5 μm wavelength, which provides the required power to saturate the $^{14}CO_2$ transitions.

The measurement cell is a cylindrical vacuum chamber 1.2 m long and 10 cm in internal diameter. It is enclosed in a polystyrene box, which can be filled with dry-ice pellets for cooling the chamber down to 195 K. The chamber houses a Fabry-Perot optical resonator resting inside of it on 4 cantilevered legs, which dampen vibrations (for frequencies >20 Hz) in all 3 spatial directions. The mechanical frame of the Fabry-Perot resonator is made of 3 Invar bars connected by 2 circular flanges, leaving 8 L internal volume available for the gas. At both ends of the frame, properly machined flanges house the mirrors, with high reflectivity dielectric coatings at 4.5 μm wavelength and a 6-m of radius of curvature. The total losses for each mirror (transmission plus absorption/scattering) amount to ~270 parts per million (ppm) and the achieved optical finesse is higher than 11,000. The mirror mounting flanges have screws for coarse alignment and PZT for fine adjustment of both the alignment and the cavity length. The mirror spacing is 1 m and the corresponding free spectral range is 150 MHz.

A $N_2$-cooled InSb detector is used to detect the radiation transmitted by the cavity. It is followed by a transimpedance amplifier (Z=32000 Ohm) with a final bandwidth of about 1 MHz. A 18-bit digitizing oscilloscope with a sampling rate of 10 Ms/s is used to digital convert the analogical detected signal for further process and analysis.

For the SCAR experiment, the IR radiation is efficiently coupled (about 86% as expected) in the high-finesse Fabry-Perot cavity by using a couple of lenses to achieve the $TEM_{00}$ mode propagation inside of the cavity. In this conditions, taking into account the mirror losses and an available power of about 20 mW before the cavity input, we estimate an inside cavity power in resonance of about 40 W.

Then, the frequency of the IR coherent source is changed to be in resonance with the cavity. OFC-assisted frequency stability of the IR radiation and the high mechanical stability of the cavity length allow to maintain a long term resonance condition without need of any active lock of the cavity length to the IR frequency of the laser.

A double-pass acusto-optic modulator placed at the output of Nd:YAG laser is used to quickly switch off resonance the input IR light when a threshold coupling level (about 3V at the output of the amplified detector) is reached, and thus the transmission cavity decay is detected by a N2-cooled InSb detector during 100 μs. The output tension of the amplified detector is digitalized, and thus recording the single SCAR-decay-event. In order to improve S/N ratio of the detected decay, compatible with digitalization resolution, 128 consecutive SCAR-decay-events are averaged, giving the SCAR-decay-signals to be analyzed by the fit routines, as described in this invention.

For the SCAR spectroscopy of $^{14}C^{16}O_2$, the $(00^01-00^00)$ P(20) rovibrational transition around 4.5 μm was targeted. It is a quasi-isolated absorption line of this molecule with respect to other absorptions from other $CO_2$ isotopologue. Nevertheless, the $(05^51-05^50)$ P(19)e line of $^{13}C^{16}O_2$, blue-shifted by ~230 MHz with respect to the frequency of the target transition, is an interference line that must be taken into account in the analysis to get an accurate concentration measurement of radiocarbon dioxide.

The Fabry-Perot cell is filled with a $CO_2$ sample at total pressure P=12 mbar and temperature T=195 K (corresponding to ~0.15 L volume at standard thermodynamic conditions). At this temperature, the intensity of the nearby $^{13}C^{16}O_2$ interference line is decreased by more than three orders of magnitude, minimizing its interference effect. The $CO_2$ sample is a natural mix of almost all carbon dioxide isotopologues including $^{14}C^{16}O_2$, at the present natural abundance (about $1.2 \times 10^{-12}$). Other gases must be avoided and in particular $^{14}N_2^{16}O$, which has absorption line almost at the same frequency of the target transition. $N_2O$ concentration below 0.3 ppb in the measured $CO_2$ sample is required to produce a negligible interference with the target line.

In these conditions of temperature and pressure, the deformation from a pure exponential produced by radiocarbon dioxide absorption along decay signals is of the order of 1 μV out of 3 V. This set very stringent limits on the residual non-linearity, which can be born. At this respect particular attention was putted to get a linear response of the detection system for the more than 6 decades as require radiocarbon-dioxide detection at ppt level or better. An optical diffuser was placed between the cavity and the detector, in order to uniform the way to illuminate the detector area. In addition, a numerical calibration of residual non-linearities is allowed in the SCAR decays obtained in vacuum conditions. In this case, the decay must be a perfect exponential, and deviations are taken into account by adding a Fourier function to the expected exponential behavior. This correction is then applied to all recorded SCAR decays.

On the other side, the measurement is possible thanks to improve the noise present in the signal to be captured, which, in good approximation, has zero, or at least constant, average. In addition to the 128 consecutive SCAR decays averaged by the digitation electronics as described above, ten of these acquisitions for each laser frequency are again averaged for a total of 1280 consecutive decay events. The decay resulting of the total average, which is stored in memory for further analysis as described in this invention, increases the resolution of digitization by approximately 35 times.

To obtain the SCAR decay signals for $^{14}CO_2$ concentration measurements, the following steps have been performed:

1) The cavity-cell is filled with the $CO_2$ sample at the thermodynamic conditions described above. The IR laser is operated at the required power for saturation of the target transition (see above) and coupled to the cavity as described above.
2) The frequency of the IR coherent source is set to a value 66 227 000 MHz, which is 400 MHz apart of the known frequency of the target P(20) transition of radiocarbon dioxide. This is achieved by setting the proper OFC repetition rate and taking into account the lock frequency chain described above.
3) The Fabry-Perot is bringing in resonance with the IR radiation by changing the cavity length by means of the tension applied to the PZT transducers. The transmitted intensity is detected with the $N_2$-cooled InSb detector.
4) When the transimpedance tension at the output of the amplified detector reach the 3 V threshold condition, the laser frequency is quickly and automatically switched-off the cavity resonance by means of the AOM as described above.
5) The SCAR decay is detected by 100 μs, digitized and averaged with consecutive decay signals. The averaged signal is temporally stored in the digitizing electronics.
6) The laser is quickly and automatically switched-on the cavity resonance by means of the AOM as described above, waiting to threshold condition be again reached.
7) The steps 4 to 6 are repeated by 128 consecutive decay events. This step is repeated by ten times, where the result of each 128-average decay is averaged with the consecutive one. At the end, a SCAR decay signal for the present frequency of the spectrum (i.e. the laser frequency), resulting of the average of 1280 consecutive events is stored for the further analysis described in this invention.
8) The laser frequency is changed-up by a frequency step of 10 MHz, and the steps from 3 to 7 are repeated up to the laser frequency is scanned-up by 740 MHz. (i.e. 73 frequency steps in the upward direction).
9) The laser frequency is changed-down by a frequency step of 10 MHz, and the steps from 3 to 7 are repeated up to the laser frequency is scanned-down by 740 MHz. (i.e. 73 frequency steps in the downward direction).
10) As a final result, 146 SCAR decay signals, two for each scanned IR frequency, are stored to be analyzed by the methods, subject of this invention.

Figure 11:
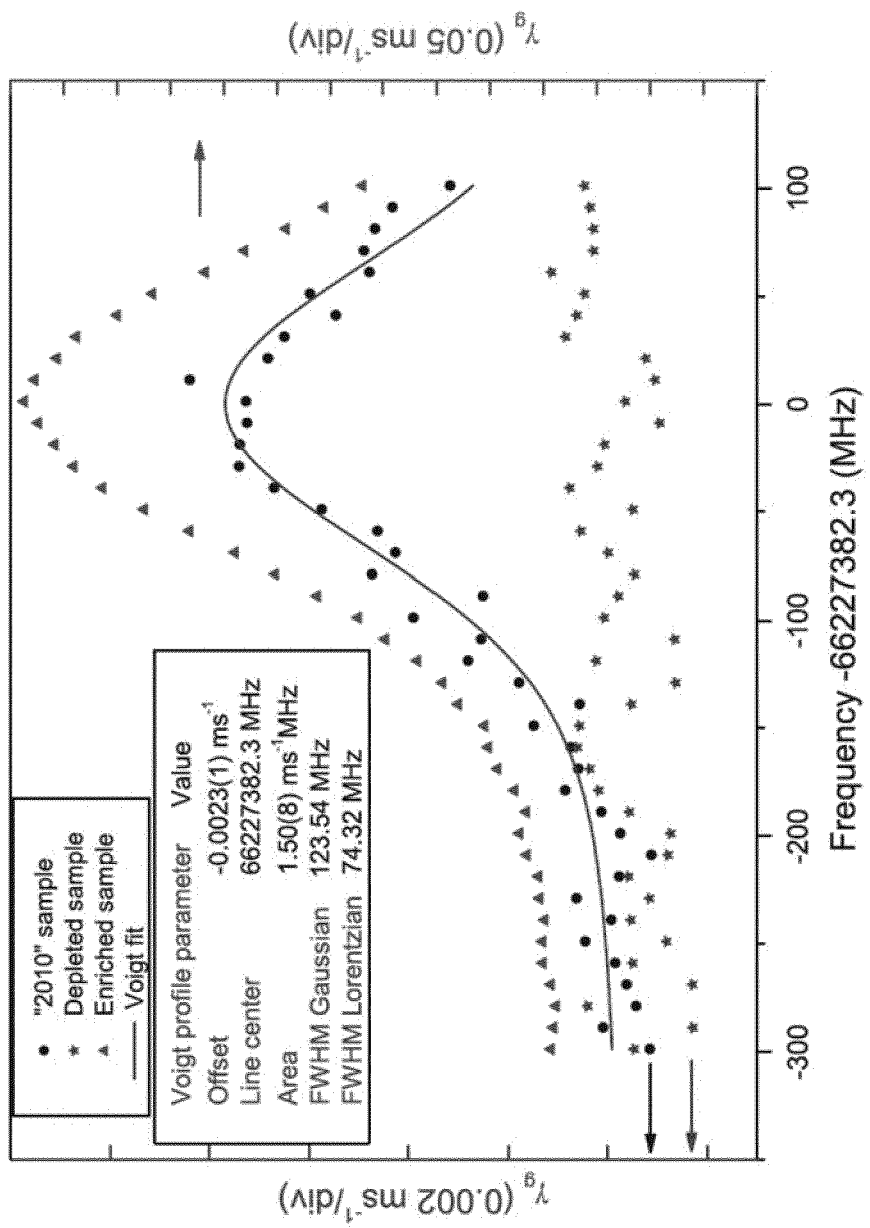
FIG. 11 is a first measurement performed and fitted according to the first aspect of the method of the invention.

The results of this experiment and the fit according to the first aspect of the invention can be seen in FIG. 11. A spectrum of the $^{14}C^{16}O_2$ P(20) transition (black trace) recorded at the present natural abundance (named "2010") is shown. In this figure, two more spectra are shown, corresponding to a $^{14}C$-enriched sample (green trace) and a $^{14}C$-depleted sample (blue trace). $^{14}C$-enriched spectra were used to accurately measure the center frequency of the P(20) transition, as well as the most favorable thermodynamic conditions of the gas sample for $^{14}C$ detection in subnatural abundance.

More quantitatively, the fit of the 2010 $CO_2$ spectrum to the expected Voigt profile yields an area of 1:50(8) $ms^{-1}$ MHz. Assuming for the P(20) the calculated line strength, $S=3.10(15)*10^{-18}$ cm, a $^{14}C^{16}O_2$ natural abundance concentration of 1.24(10) ppt is measured.

For the calibration it has been used the target gas at a second concentration of: 58 times the first concentration. Further, in the calibration the target gas was at a temperature: 195K, and pressure 11.6 mbar. The parameter obtained from the calibration are:
line center: 66227382.3 MHz
FWHM Gaussian width: 123.54 MHz
FWHM Lorentzian width: 74.32 MHz
$Z_{1Ueff}=8.2$ $V^{-1}$
Ratio R of the spectral area: (effective area)=(area measured by SCAR)×0.925.

Figure 12:
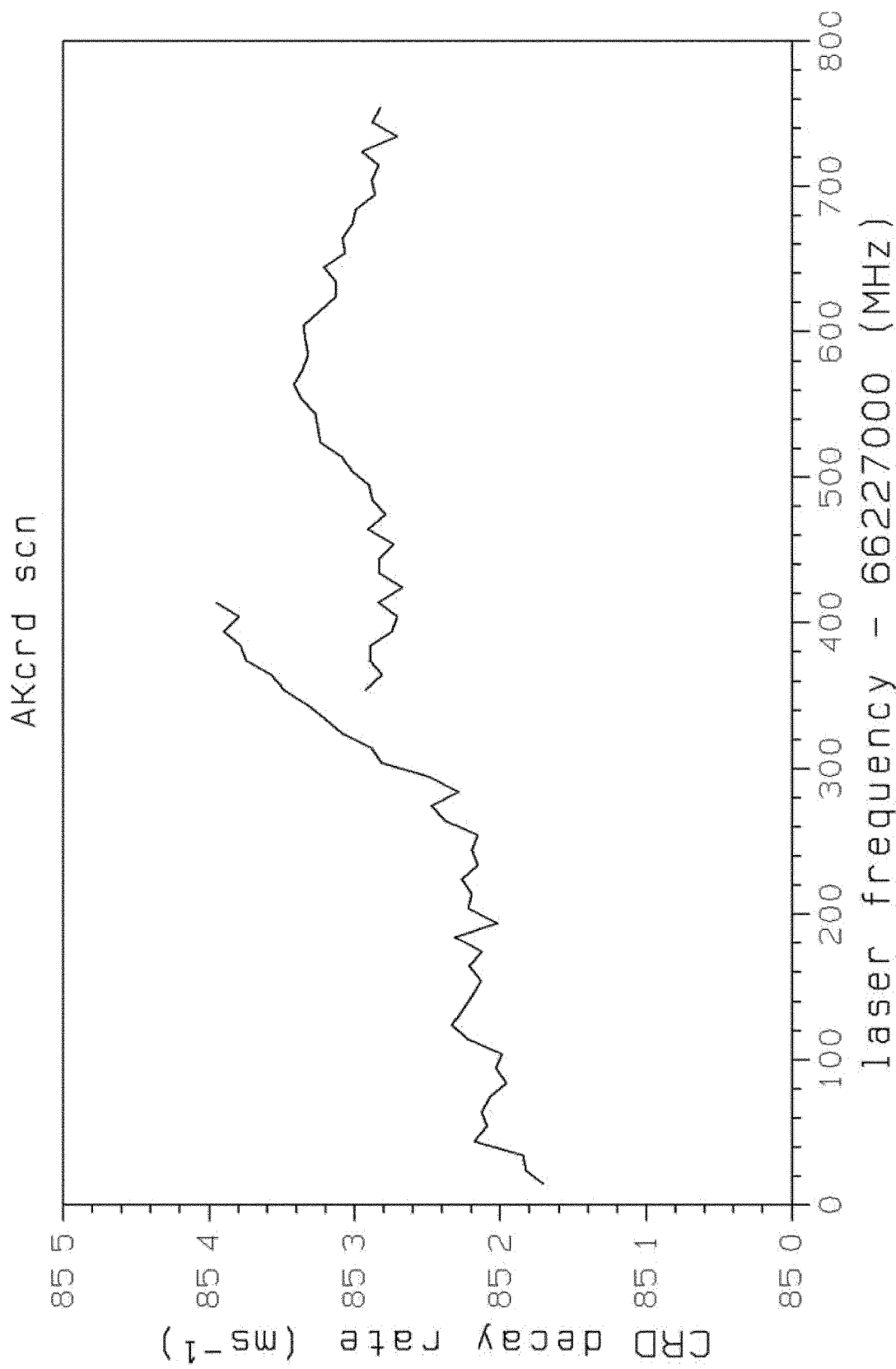
FIG. 12 is a fitting of a measurement similar to the one in FIG. 11, but with a larger frequency scan, in CRD conditions performed according to a prior art method.

FIG. 12 shows a similar measurement, but with a larger frequency scan, performed with a standard CRD routine, that is, not in saturation condition, and a fitting of the result. It is clear that the variations (drift and oscillation) of the curve for a standard CRD measurement is much higher. The FIG. 12 shows two different measurements which are partially overlapped, however they do not match.

Figure 13:
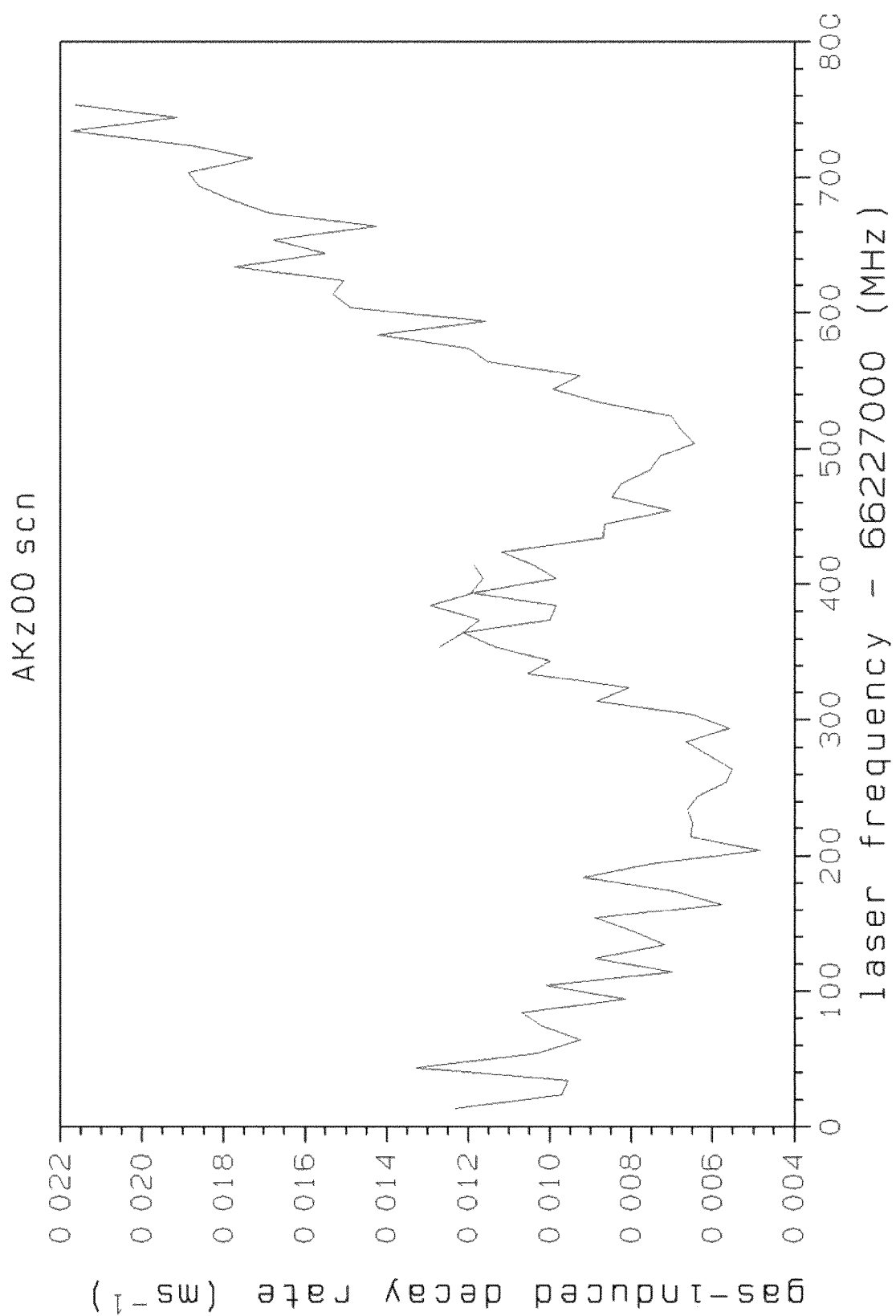
FIG. 13 is a fitting of the same measurement of the one of FIG. 12 in SCAR conditions but according to a method not of the invention.

FIG. 13 shows SCAR measurements of the same sample in which, instead of using the method according to the first aspect, the line profile has been selected a priori. The tails of the curve as shown are not correct and they move upwards.

Figure 14:
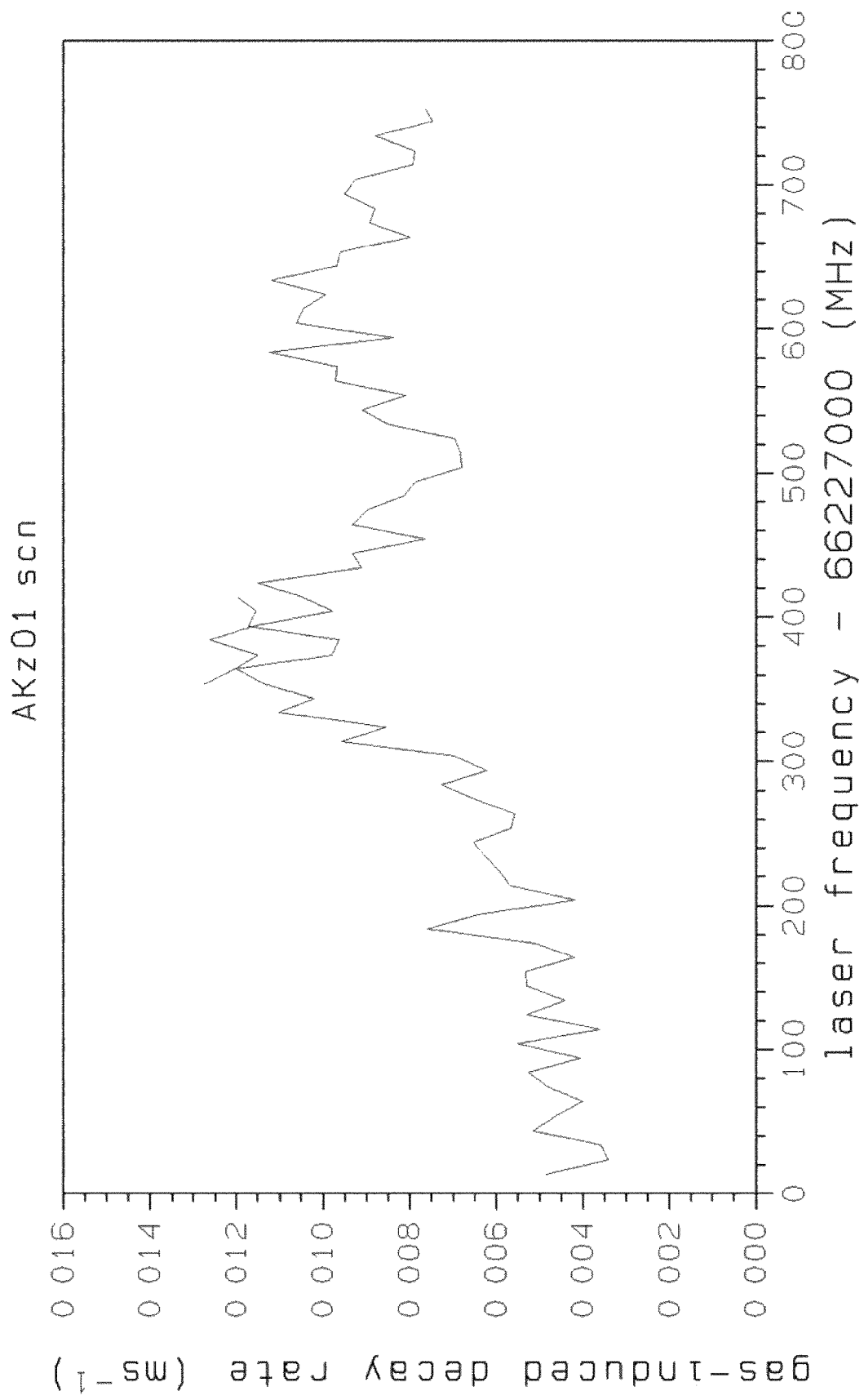
FIG. 14 is the fitting of the same measurement of the one of FIG. 12 with a fitting according to the invention.

FIG. 14 shows the SCAR fitting method according to the first aspect of the invention, which has a much more correct behaviour.

Experiment 2

Figure 15:
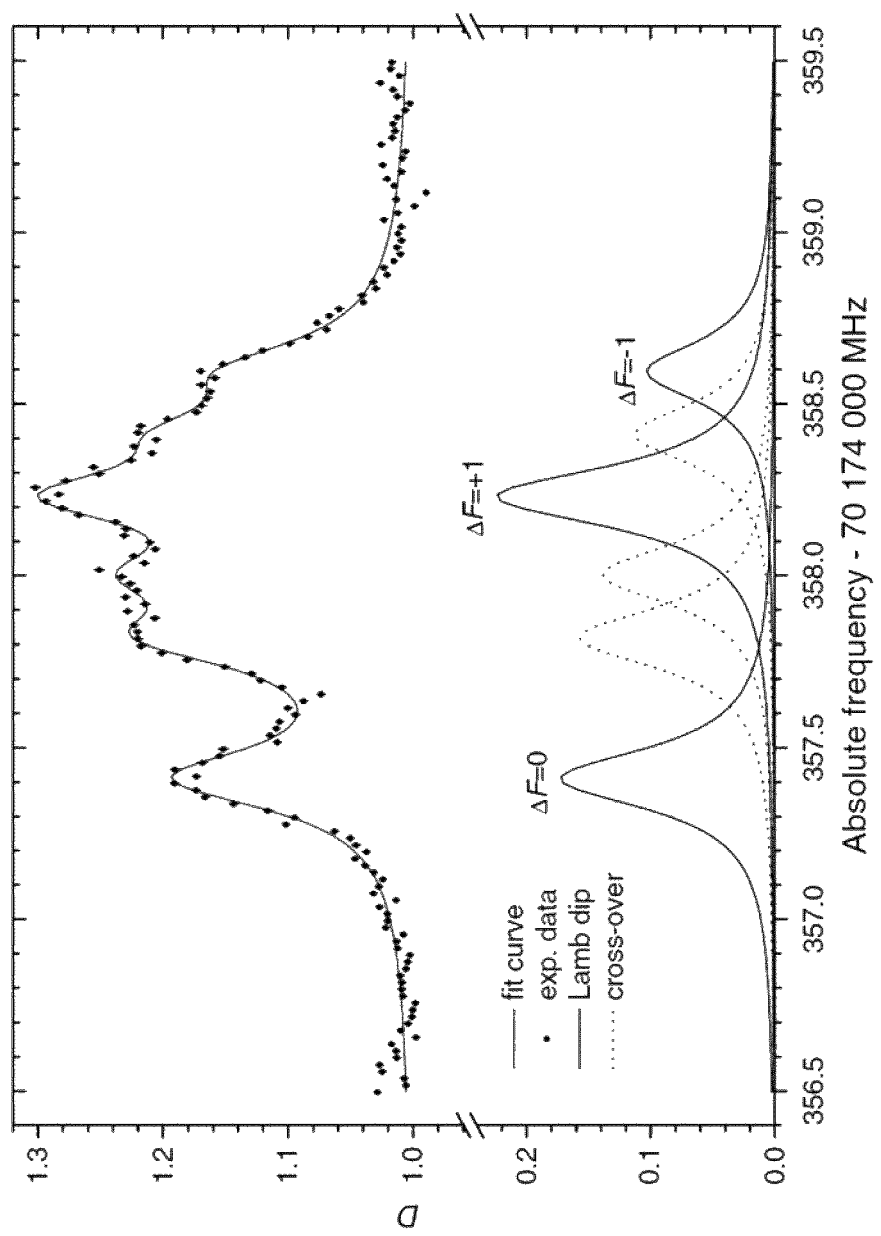
FIG. 15 is a second measurement performed and fitted according to the first aspect of the method of the invention.

The experimental set up is the same as in experiment 1.
Sub-Doppler measurements on low-pressure $^{17}O^{12}C^{16}O$ at natural abundance $(7.5*10^{-4})$ have been performed. FIG. 15 shows the resolved hyperfine structure of the $(00^01-00^00)$ R(0) transition of $^{17}O^{12}C^{16}O$, due to interaction between the $^{17}O$ electric quadrupole (which is non-null for a nuclear spin I=5/2) and the electric field gradient at the nucleus position. This spectrum was recorded in about 3 h with 11 forward-backward frequency scans in 20-kHz steps.

In Table I the fit results for the line centers are reported.

TABLE I

Measured absolute frequencies $v_{\Delta F}$ of the hyperfine triplet with 1-σ uncertainties and relative intensities.

| ΔF | $v_{\Delta F}$ (kHz) | rel. intens. |
|---|---|---|
| −1 | 70 174 358 594.9 (6.2) | 0.207 (11) |
| 0 | 70 174 357 409.8 (3.0) | 0.345 (9) |
| +1 | 70 174 358 229.8 (3.6) | 0.448 (13) |

The fitted FWHM of each Lorentzian dip is Γ=217.1(5:5) kHz.

The measured line-center frequency $v_c$=70 174 358 037.3 (3:9) kHz is consistent with the value 70 174 368 MHz reported by HITRAN, within the declared 3-30 MHz uncertainty. Thus, we improved the frequency accuracy by more than 3 orders of magnitude.

Figure 16:
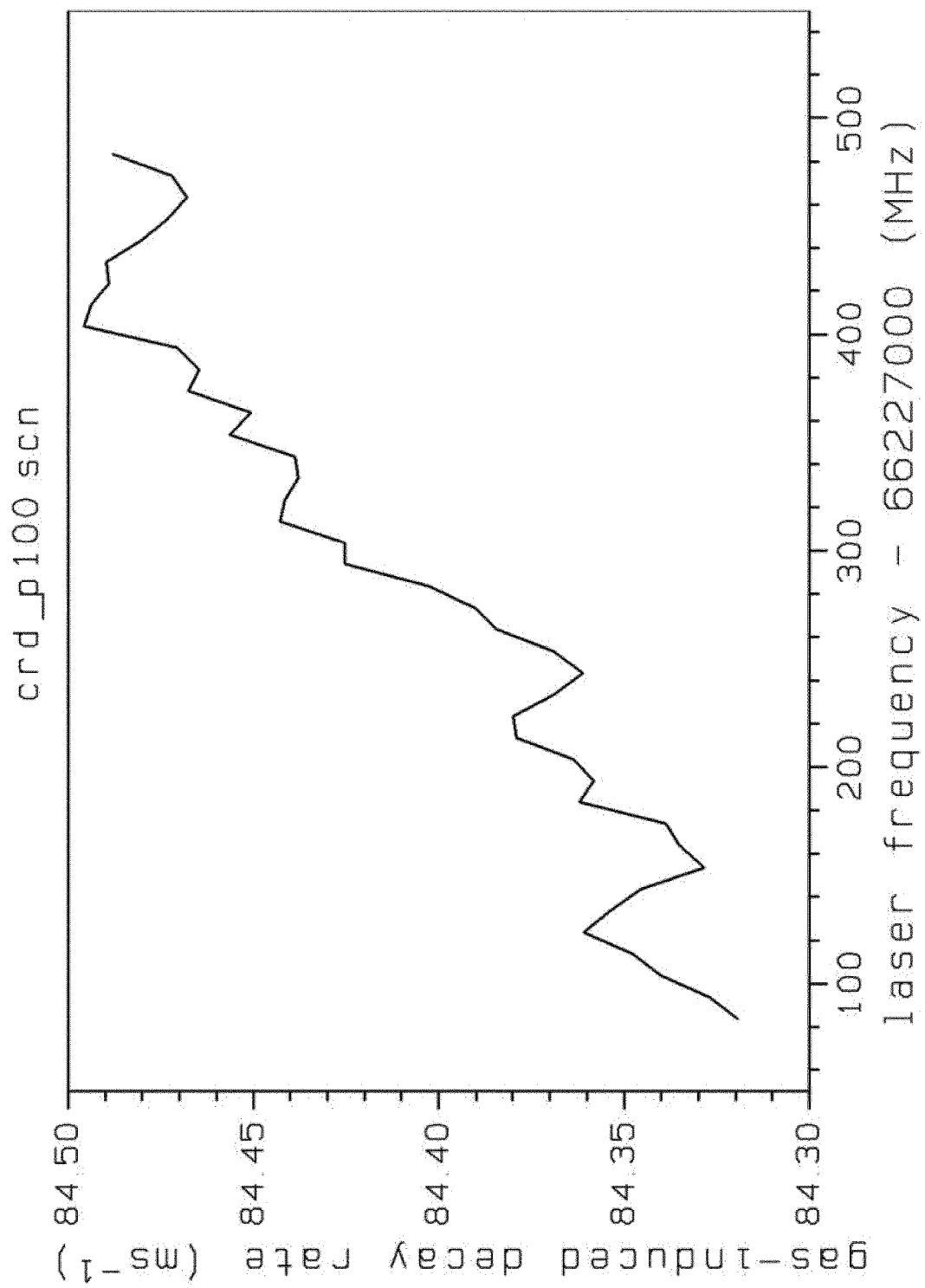
FIG. 16 is a fitting of the same measurement of the one in FIG. 11 in CRD conditions performed according to a prior art method.

FIG. 16 shows for comparison the same measurement of the one in FIG. 11 according to CRD, that is in a linear regime, and with its fitting.

Figure 17:
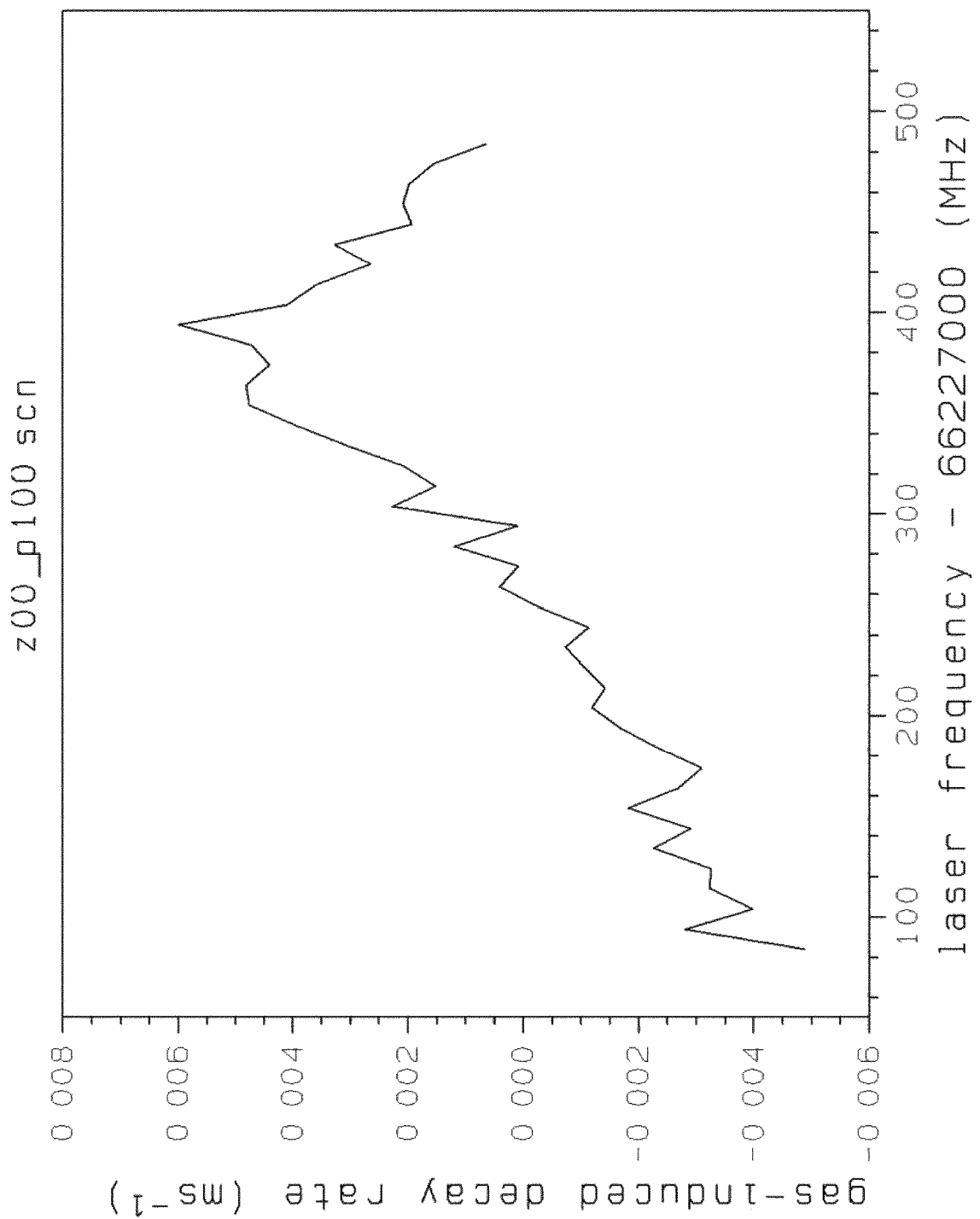
FIG. 17 is a fitting of the same measurement of the one of FIG. 11 in SCAR conditions but according a method not of the invention.

FIG. 17 shows SCAR fitting of the same measurement of the one of FIG. 11, in which, instead of using the method according to the first aspect, the line profile has been imposed a priori. The tails of the curve as shown are not correct and they move upwards.

Figure 18:
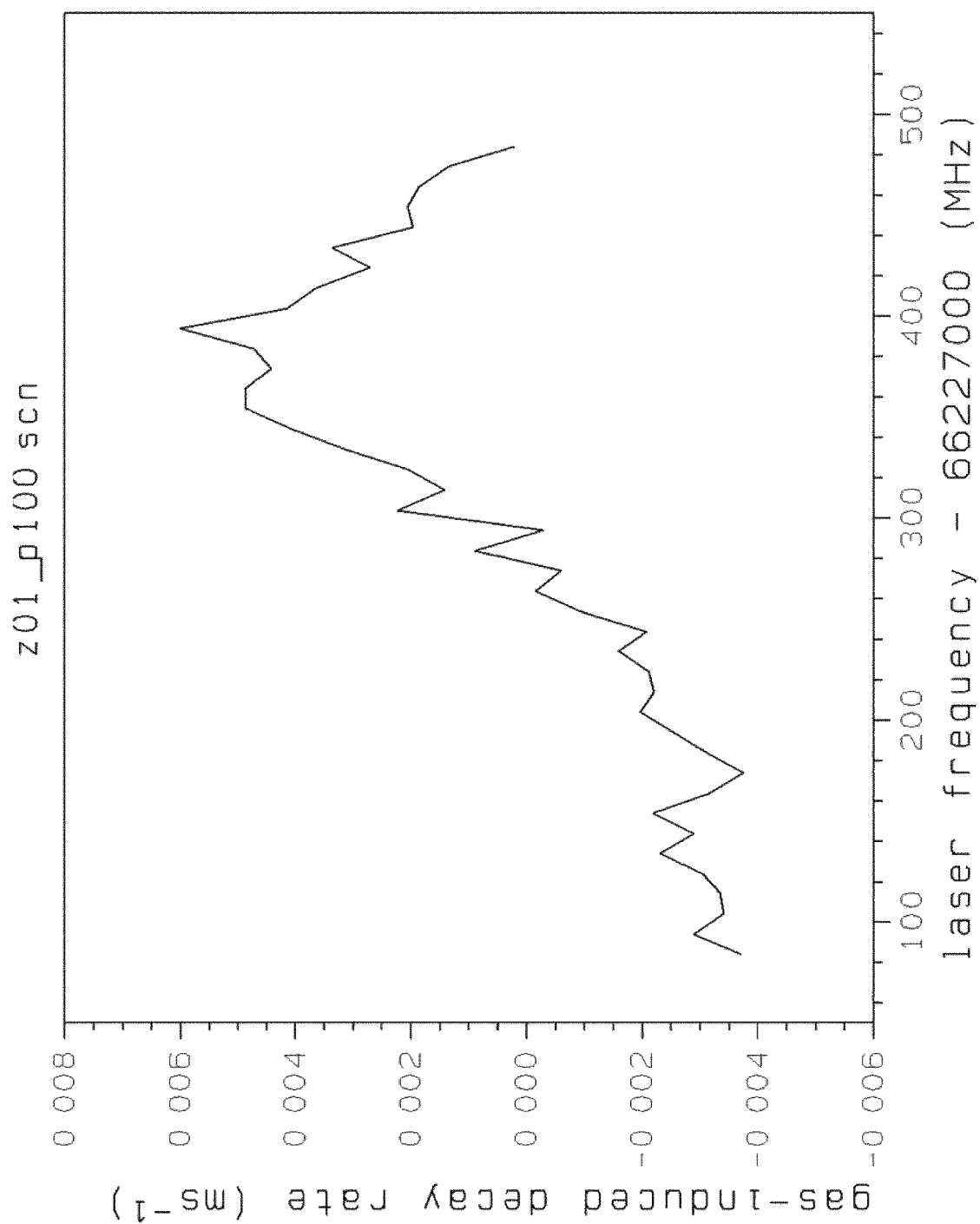
FIG. 18 is the fitting of FIG. 11 with a fitting according to the invention.

FIG. 18 shows the SCAR fitting method according to the first aspect of the invention, which has a much more correct behaviour.

Experiment 3

In this experiment, the fitting is performed according to the second aspect of the invention.

The apparatus used is the one described according to the first experiment.

SCAR spectroscopy in a $^{14}C^{16}O^2$-enriched $CO_2$ sample as in the first experiment. The laser frequency was scanned across the P(20) line, and the SCAR decay signals where fitted by using the above described fit function.

The sample was much more enriched than in the first experiment (about 6400 times with respect to natural abundance) in order to minimize the effects of the S/N ratio in the fitted parameters uncertainty and to calibrate the SCAR procedure. Moreover, to check the linearity of the detection, this very high radiocarbon abundance has been changed by reducing it with successive dilutions. Another set of measurements was done with gas at natural abundance, obtained by fermentation of the same cane sugar. All these new measurements were done at temperature T=195 K and pressure P=12 mbar.

In this procedure, at the highest abundance, the line center, the Lorentzian and Gaussian width, the spectral area $c\alpha_o$ of the line profile and the saturation parameter $Z_{1U}$ were fitted as "global" variables, while the amplitude, the background and the cavity decay constant of each single decay signals were fitted as "local" variables.

The values obtained for $Z_{1U}$, line widths and line center at the highest abundance where then used as fixed parameter for the fit of subsequent measured signals at lower abundances.

The decay signals were detected at various laser frequencies, covering a total span of about 650 MHz around the P(20) line frequency, at 10 MHz steps. Due to technical reasons of our experimental setup, continuous scans larger than 400 MHz are not allowed, and such 650 MHz span is the result of the partially overlapping of two consecutive 400 MHz scans at the blue and red sides of the line center. At this frequency span, the interfering line ($05^51$-$05^50$) P(19) of $^{13}C^{16}O_2$ on the "blue" side of the P(20) line must be considered. Its interfering effects at 195 K may be neglected for highly-enriched samples, nevertheless they have been considered.

The interfering line parameters $v'_o$, $w'_L$, $w'_G$ and $Z'_{1U}$ were fixed to a value determined with the following procedure: first preliminary values for the global parameters have been calculated by using the enriched-sample SCAR spectrum without considering the interfering line. Then, a SCAR spectrum recorded with a $CO_2$ sample with radiocarbon dioxide at natural abundance has been fitted by fixing all "global" parameters except the P(20) line area, d, and all interfering line parameters. Indeed, at this $^{14}C^{16}O_2$ abundance and the values of T=195K and P=12 mbar, the area of the interference line is almost equal to the P(20) one, and hence its effects are better taken into account. Therefore, with these first estimations of the parameters of the interfering line, the global parameters of the enriched spectrum are again calculated. This procedure is repeated several times, till final convergence.

Figure 19:
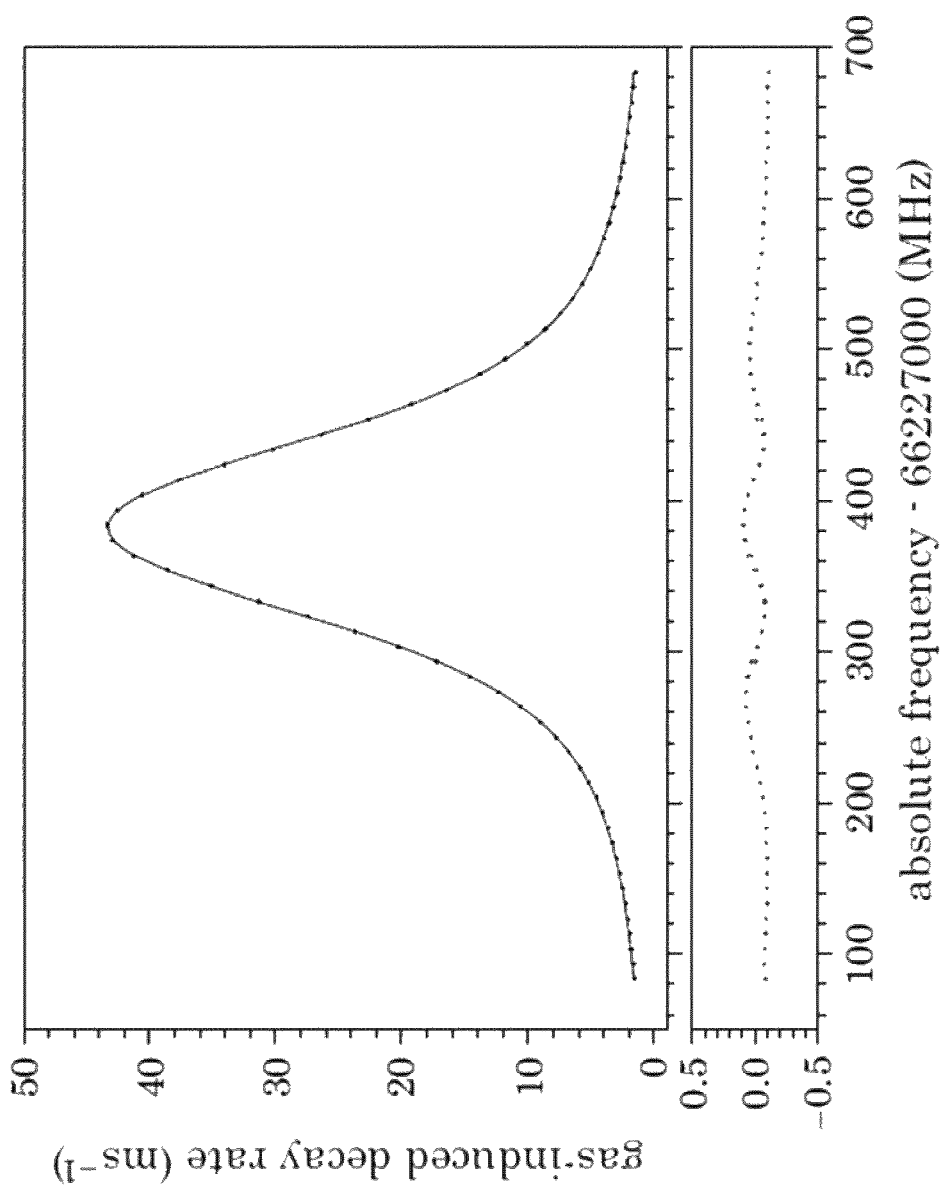
FIG. 19 is a third measurement performed on a highly enriched sample and fitted according to the second aspect of the method of the invention.

In FIG. 19, one of the three SCAR spectra recorded for the about 6400 times enriched sample is shown. The fitted global parameters for the three spectra were all self-consistent within the errors. The averaged values are shown in Table 2.

These results have been checked by comparing them with those measured for the spectra recorded with the same $CO_2$ enriched sample at the same thermodynamic conditions, but near the linear-absorption regime.

The laser power was not as low as to decrease too much the S/N ratio. In order to fit the decay signals, we used the same global procedure. However, because, at low power, the two decay parameters $\gamma_c$ and $\gamma_g$ are quite correlated, the signal is essentially obtained by reducing the SCAR procedure to the standard CRD procedure, where the overall $\gamma=\gamma_c+\gamma_g$ is considered, and by subtracting an averaged value for the cavity decay rate out of resonance. In this way, the non-linearity due to a residual saturation was corrected and an experimental linear absorption line profile was generated. A successive Voigt fit also takes into account, in this case, optical fringes that modulate the $\gamma_c$ contribution.

Figure 20:
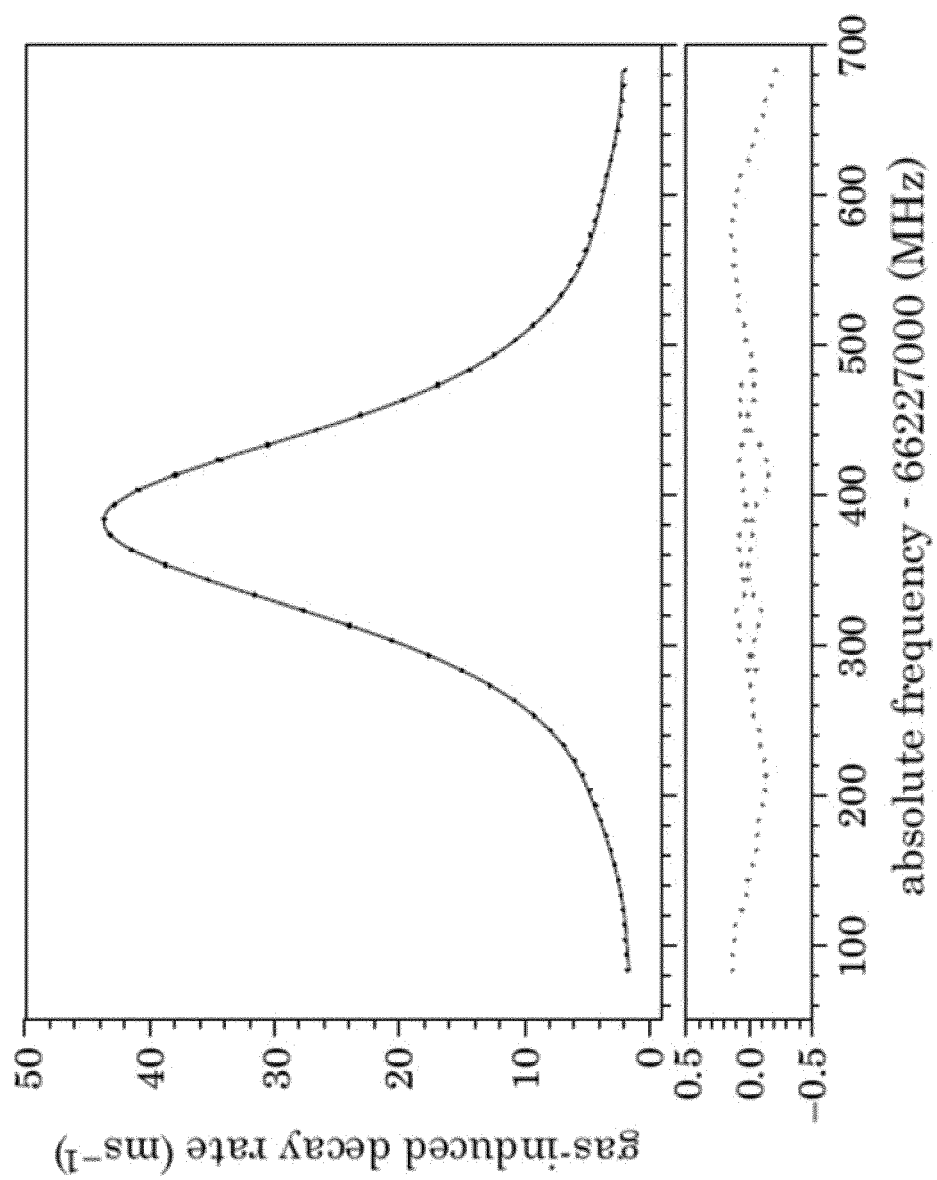
FIG. 20 is a fitting of the same measurement of the one in FIG. 19 in CRD conditions performed according to a prior art method.

FIG. 20 shows the average of three profiles obtained with successive measurements and the corresponding fit. The residuals do not allow to shed light on the real shape of the profile, alternative to the Voigt profile. Indeed, the residuals obtained in the left and right scans have different values in the common frequency range: likely they are dominated by an incomplete neutralization of the fringes. The main discrepancy from a Voigt profile is an asymmetric residual in the wings. Also in this regime the values of the fitted Voigt profile obtained from the three independent measurements are consistent within the errors.

The averaged values are shown in Table 3.

These values do not coincide with those obtained at high power. For the linewidths, the discrepancies can be ascribed to the local approximation of the laser field-molecules interaction done in the theory. Indeed, the residuals for the saturated case (FIG. 19) clearly show a systematic small discrepancy from a Voigt profile. Anyway, such discrepancies are small and, for the calibration purpose, its effect will be included in the ratio between the areas estimated in the two regimes. The ratio between the area obtained in the linear regime and the area obtained at high power with the SCAR procedure is 1.0284(8).

Again, this is the correction factor to get the "true" radiocarbon dioxide concentration from the SCAR measurements in the cell at our experimental conditions with this new analysis procedure. Its discrepancy can be considered as a measure of the goodness of the present approach.

TABLE 2

Fitted parameters of the SCAR spectrum of the P(20) transition of $^{14}C^{16}O_2$ in a 6375 times enriched $CO_2$ sample (p = 12 mbar, T = 195 K)

| | | |
|---|---|---|
| Line center, $v_o$ - 66227000 MHz | 382.1143(47) | MHz |
| Spectral Area | 8968.44(32) | ms$^{-1}$MHz |
| Lorentzian HWHM, $w_L$ | 49.927(25) | MHz |
| Gaussian HWHM, $w_G$ | 41.6905(42) | MHz |
| Saturation parameter $Z_{1V}$ | 9.030(24) | V$^{-1}$ |

TABLE 3

Fitted parameters of the linear-CRD spectrum of the P(20) transition of $^{14}C^{16}O_2$ in a 6375 times enriched $CO_2$ sample (p = 12 mbar, T = 195 K).

| | | |
|---|---|---|
| Line center, $v_o$ - 66227000 MHz | 382.34 (7) | MHz |
| Spectral Area | 9224 (7) | ms$^{-1}$MHz |
| Lorentzian HWHM, $w_L$ | 53.30 (9) | MHz |
| Gaussian HWHM, $w_G$ | 39.22 (13) | MHz |

The invention claimed is:

1. A method of ring-down spectroscopy in saturated-absorption condition, for measuring a first concentration of a gas through a measurement of the spectrum of a molecular transition of said gas, the method comprising the steps of:
   inserting said gas whose first concentration is to be measured in a resonant cavity comprising two or more reflecting mirrors arranged so as to form a closed optical path for an electromagnetic radiation emitted by a laser source;

tuning a frequency of said electromagnetic radiation emitted by said laser source so as to fix it to a value $v_i$ within a range of frequencies [$v_{min}$, $v_{max}$] including the resonance frequency of said molecular transition $v_0$;

fixing an intensity of said electromagnetic radiation in the cavity at a value much greater than a saturation intensity $I_s$ of the molecular transition to be detected;

irradiating said gas by means of said electromagnetic radiation beam emitted by said laser source having said fixed frequency $v_i$ and intensity in said resonant cavity;

coupling said electromagnetic radiation to said cavity so as to obtain a laser-cavity resonance condition;

changing the frequency of the electromagnetic radiation emitted by the laser so as to switch off the laser-cavity resonance;

detecting an electromagnetic radiation beam in output from said cavity after the laser-cavity resonance has been switched off;

recording a plurality of data representative of said output, obtaining a decay signal for the fixed frequency;

considering a fitting curve $S(t, \delta v_i)$ for the recorded decay signal which depends on the following parameters:

$B(\delta v_i)$ is a detection background, with ($\delta v_i = v_i - v_0$);

$A_d(\delta v_i)$ is an amplitude of the decay signal at the beginning of the decay event;

$\gamma_c(\delta v_i)$ is a cavity decay rate due to non-resonant and non-saturable losses (empty cavity decay rate);

$\gamma_g(\delta v_i)$ is contribution of the targeted molecular transition to the decay signal;

$\bar{g}$ is a peak normalized line profile $\bar{g}(v-v_o, w_R)$ centered at the molecular resonance frequency $v_o$ and $w_R$ is the HWHM width of the resonance, and $w_R = w_L$ for a Lorentzian shape, $w_R = w_G$ for a Gaussian shape, $w_R = \{w_L, w_G\}$ for a Voigt shape;

$$Z_o = \frac{CP(0)}{CP_s} = A_d Z_{1U}$$

is the saturation parameter at the beginning of the decay event and at the frequency of the targeted molecular transition $v_0$, $P(0)$ is the intracavity power at the beginning of the decay signal; and $$P_s = \frac{\pi w^2}{2} I_s$$

is a saturation power, where w is the spot size radius of the laser beam, i.e. a radius for which the amplitude of the field is 1/e times that of the axis and $I_s$ the saturation intensity;

replacing $Z_{1U}\bar{g}(v-v_o, w_R)$ in the function $S(t, \delta v_i)$ with a constant value $Z_{1Ueff}$=constant of a predetermined value;

fitting said recorded data with a function $S^{repl}(t, \delta v_i)$ in which $Z_{1Ueff}$=constant replaces $Z_{1U}\bar{g}(v-v_o, w_R)$ in the fitting function $S(t, \delta v_i)$.

2. The method according to claim 1, including the step of: obtaining from said fit the following parameters:

$B(\delta v_i)$ is the detection background, with ($\delta v_i = v_i - v_0$);

$A_d(\delta v_i)$ is the amplitude of the decay signal at the beginning of the decay event;

$\gamma_c(\delta v_i)$ is the cavity decay rate due to non-resonant and non-saturable losses (empty cavity decay rate);

$\gamma_g(\delta v_i)$ is contribution of the targeted molecular transition to the decay signal.

3. The method according to claim 1, including the step of parametrizing said $S^{repl}(t, v_i)$ as:

$$S^{repl}(t; p(\delta v_i)) = B(\delta v_i) + A_d(\delta v_i) e^{-\gamma_c(\delta v_i)t} f(t; \gamma_c(\delta v_i), A_d(\delta v_i), \gamma_g(\delta v_i), Z_{1Ueff})$$

where $p(\delta v_i)$ is the set of parameters free during the fit $$p(\delta v_i) = \{B(\delta v_i), A_d(\delta v_i), \gamma_c(\delta v_i), \gamma_g(\delta v_i)\}$$

$B(\delta v_i)$ is the detection background, $\gamma_g(\delta v_i)$ is contribution of the targeted molecular transition to the decay signal, $A_d(\delta v_i)$ is the amplitude of the decay signal, $\gamma_c(\delta v_i)$ is the cavity decay rate due to non-resonant and non-saturable losses, while the following are determined before the fitting:

$Z_{1Ueff}$ is the effective saturation parameter, fixed during the fit and equal to a constant;

$f$ is the non-linear function that follows one of the below rate equations depending of the gas conditions:

homogeneous regime ($w_L \geq w_G$)

$$\frac{df}{dt} = -\gamma_g(\delta v_i) \frac{\ln[1 + A_d(\delta v_i) Z_{1Ueff} e^{-\gamma_c(\delta v_i)t} f]}{A_d(\delta v_i) Z_{1Ueff}}$$

inhomogeneous regime
still diffusive gas ($w_L < w_G$)

$$\frac{df}{dt} = -\gamma_g(\delta v_i) \frac{2}{\sqrt{1 + A_d(\delta v_i) Z_{1Ueff} e^{-\gamma_c(\delta v_i)t} f} + 1} f$$

non-diffusive gas ($w_L < w_G$)

$$\frac{df}{dt} = -\gamma_g(\delta v_i) \frac{1.4256}{\sqrt{1 + 0.5 A_d(\delta v_i) Z_{1Ueff} e^{-\gamma_c(\delta v_i)t} f} + 0.4256} f.$$

4. The method according to claim 1, wherein the peak normalized line profile $\bar{g}(v-v_o, w_R)$ centered at the resonance frequency $v_0$ of the molecular transition has either a Lorentzian shape, a Gaussian shape, or a Voigt shape depending on the experimental conditions.

5. The method according to claim 1, wherein said fitting is a least squares fitting.

6. The method according to claim 5, wherein said least square fitting uses the Levenberg-Marquardt (L-M) algorithm.

7. The method according to claim 6, including:

obtaining for each of a plurality of m frequencies $v_j$ with $\delta v_j$ from a $\delta v_{min}$ to a $\delta v_{max}$ a value of $\gamma_g(\delta v_j)$, and fitting said m values of $\gamma_g(\delta v_j)$ so as to obtain a value of the first concentration of the target gas.

8. The method according to claim 7, wherein said fitting includes:

selecting as a free parameters in the fitting a parameter which takes into account the presence of other molecular absorptions l=1 . . . n in addition to the target molecular resonance l=0.

9. The method according to claim 7, wherein said fitting includes:
selecting as a free parameters in the fitting a parameter which takes into account the presence of a polynomial background around the resonance frequency of the target transition $v_o$.

10. The method according to claim 7, wherein said fitting is at least squares fitting.

11. The method according to claim 10, wherein said least square fitting uses the Levenberg-Marquardt (L-M) algorithm.

12. The method according to claim 7, wherein a result of said fitting is multiplied by a correcting factor R in order to obtain the concentration of the target gas, said correcting factor taking into account the line profile modifications due to the $Z_{1Ueff}$=constant approximation.

13. The method according to claim 12, wherein the value R is calculated performing a first and a second measurement of a concentration of the same target gas at the same temperature and pressure, the first measurement in saturation absorption and at a second concentration, wherein said second concentration is at least 10 times said first concentration, and said second measurement in linear absorption at said second concentration.

14. The method according to claim 1, including:
changing the frequency of the electromagnetic radiation emitted by the laser to a frequency $v_{i+d}$ where $v_{i+d}$ belongs to $[v_{min}, v_{max}]$ and repeating the steps of:
fixing the intensity of said electromagnetic radiation in the cavity at a value much greater than the saturation intensity $I_s$ of the molecular transition to be detected;
irradiating said gas by means of said electromagnetic radiation beam emitted by said laser source having said fixed frequency $v_{i+d}$ and intensity in said resonant cavity;
coupling said electromagnetic radiation to said cavity so as to obtain a laser-cavity resonance condition;
changing the frequency of the electromagnetic radiation emitted by the laser so as to switch off the laser-cavity resonance;
detecting an electromagnetic radiation beam in output from said cavity after the laser-cavity resonance has been switched off;
recording a plurality of data representative of said output which has the form of a decay signal;
fitting said recorded data with a function $S^{repl}(t, \delta v_{i+d})$ in which $Z_{1Ueff}$=constant replaces $Z_{1U}\bar{g}(v-v_o,w_R)$ in the fitting function $S(t, \delta v_{i+d})$.

15. The method according to claim 14, including repeating the steps of claim 7, for a frequency $v_{i+2d}=v_{i+d}$ of the electromagnetic radiation emitted by the laser, as long as the frequency of the electromagnetic radiation is included in $[v_{min}, v_{max}]$.

16. The method according to claim 1, including the step of:
selecting the value of $Z_{1Ueff}$ constant to be introduced in the fitting by means of the following step:
inserting said gas at a second concentration, wherein said second concentration is at least 10 times said first concentration in the resonant cavity;
tuning the frequency of said electromagnetic radiation emitted by said laser source so as to fix it to a value $v_i$ within a range of frequencies $[v_{min}, v_{max}]$ including said molecular transition $v_0$;
fixing the intensity of said electromagnetic radiation in the cavity at a value much greater than the saturation intensity $I_s$ of the molecular transition to be detected;
irradiating said gas by means of said electromagnetic radiation beam emitted by said laser source having said fixed frequency $v_i$ and intensity in said resonant cavity;
coupling said electromagnetic radiation to said cavity so as to obtain a laser-cavity resonance condition;
changing the frequency of the electromagnetic radiation emitted by the laser so as to switch off the laser-cavity resonance;
detecting an electromagnetic radiation beam in output from said cavity after the laser-cavity resonance has been switched off;
recording a plurality of data representative of said output which has the form of a decay signal;
fitting the data of the recorded decay with a curve $S(t, \delta v_i)$ which depends on the following parameters:
$B^{high\ conc}(\delta v_i)$ is the detection background, with $(\delta v_i = v_i - v_0)$
$A_d^{high\ conc}(\delta v_i)$ is the amplitude of the decay signal at the beginning of the decay event, g
$\gamma_c^{high\ conc}(\delta v_i)$ is the cavity decay rate due to non-resonant and non-saturable losses (empty cavity decay rate);
$\gamma_g^{high\ conc}(\delta v_i)$ is contribution of the targeted molecular transition to the decay signal;
$Z_{1Ueff}^{high\ conc} = Z_{1U}\bar{g}(\delta v_i, w_R)$, where $\bar{g}$ is the peak normalized line profile $\bar{g}(v-v_o, w_R)$ centered at the molecular resonance frequency $v_0$ and $w_R$ is the HWHM width of the resonance, and $w_R=\{w_L, w_G\}$ for a Lorentzian shape, with $w_R=w_G$ for a Gaussian shape, $w_R=\{w_L, w_G\}$ for a Voigt shape;

$$Z_o = \frac{CP(0)}{CP_s} = A_d Z_{1U}$$

is the saturation parameter at the beginning of the decay event and at the frequency of the targeted molecular transition $v_0$, $P(0)$ is the intracavity power at the beginning of the decay signal; and $$P_s = \frac{\pi w^2}{2} I_s$$

is the saturation power, where w is the spot size radius of the laser beam, i.e. the radius for which the amplitude of the field is 1/e times that of the axis and $I_s$ the saturation intensity;
selecting as $Z_{1Ueff}^{high\ conc}=Z_{1Ueff}$=value obtained from the above fitting.

17. The method according to claim 1, wherein said electromagnetic radiation emitted by said laser is in the Infrared range.

18. A method of ring-down spectroscopy in saturated-absorption condition, for measuring a first concentration of a target gas through a measurement of a spectrum of a molecular transition of said target gas, the target gas being in a mixture together with other gasses the method comprising the steps of:
repeating for a number m of fixed frequencies $v_i$ spaced each other by a of a frequency step in a range of frequencies including a frequency of the molecular transition of the target gas, the gases in the mixture having l=0, . . . ,n, absorptions in the measured spectral range, where l=0 is a target absorption, the following steps:

repeating d times at the same frequency the following steps:
  inserting said gas whose first concentration is to be measured in a resonant cavity comprising two or more reflecting mirrors arranged so as to form a closed optical path for an electromagnetic radiation emitted by a laser source;
  tuning a frequency of said electromagnetic radiation emitted by said laser source so as to fix it to a value $v_i$ within a range of frequencies $[v_{min}, v_{max}]$ including said molecular transition $v_0$;
  fixing an intensity of said electromagnetic radiation in the cavity at a value much greater than a saturation intensity $I_s$ of the molecular transition to be detected;
  irradiating said gas by means of said electromagnetic radiation beam emitted by said laser source having said fixed frequency $v_i$ and intensity in said resonant cavity;
  coupling said electromagnetic radiation to said cavity so as to obtain a laser-cavity resonance condition;
  changing the frequency of the electromagnetic radiation emitted by the laser so as to switch off the laser-cavity resonance;
  detecting an electromagnetic radiation beam in output from said cavity after the laser-cavity resonance has been switched off; and
  recording a plurality of data representative of said output, obtaining a decay signal for the fixed frequency;
collecting the d*m SCAR decay signals obtained;
fitting at the same time the d*m decay signals with d*m fitting curves considering a fitting curve $s(t; p(v))=[S(t; p(v_i)_j)]_{j=1}^{d*m}$ for the recorded decay by signals which depends on the following parameters $p(v)=[p(v_i)_j]_{j=1}^{d*m}$:

$$p(v) = [p(v_i)_j]_{j=1}^{d*m} = \left[B_j, A_{d_j}, \gamma_{c_j}, \left[\{\gamma_l(\delta v_{il}), Z_{l1U}\bar{g}_l(\delta v_{il}, w_{Rl})\}_j\right]_{l=0}^{n}\right]_{j=1}^{d*m},$$

$$i = 1 \ldots m$$

$[B_j(\delta v_{il})]_{j=1}^{d*m}$ are the detection backgrounds of the j=1 . . . d*m recorded SCAR decay signals; and $\delta v_{il}=v_i-v_l$ is the detuning of the i (=1 . . . m) scanned frequency of the laser radiation with respect to the resonance frequency of the l resonant transition,
  $[A_{d_j}(\delta v_{il})]_{j=1}^{d*m}$ are amplitudes of the j=1 . . . d*m recorded SCAR decay signals,
  $[\gamma_{c_j}(\delta v_{il})]_{j=1}^{d*m}$ are cavity decay rates of the j=1 . . . d*m recorded SCAR decay signals due to non-resonant and non-saturated gas absorption losses,
  $[[\gamma_l(\delta v_{il})]_{l=0}^{n}]_{j=1}^{d*m}$ are arrays of the absorption decay rates of the l=0 . . . n saturated transitions at the $\delta v_{il}$ detuning for the j=1 . . . d*m recorded SCAR decays, $$\left[\left[\{Z_{l1U}\bar{g}_l(v_i - v_l, w_{Rl})\}_j\right]_{l=0}^{n}\right]_{j=1}^{d*m}$$

are arrays of the l=0 . . . n saturation parameters of the j=1 . . . d*m recorded SCAR decay signals;
  $\bar{g}_l(v_i-v_l, w_{Rl})$ is the peak normalized line profile centered at the molecular resonance frequency $v_l$ and $w_{Rl}$ is the HWHM width of the l-resonance;

$$Z_o = \frac{CP(0)}{CP_s} = A_d Z_{1U}$$

is a saturation parameter at the beginning of the decay event and at the frequency of the targeted molecular transition $v_0$, P(0) is an intracavity power at the beginning of the decay signal; and $$P_s = \frac{\pi w^2}{2} I_s$$

is a saturation power, where w is a spot size radius of the laser beam, i.e. a radius for which a amplitude of the field is 1/e times that of the axis and $I_s$ the saturation intensity;

dividing the above mentioned parameters in a first and a second group; and fitting said recorded data with a function $S(t; p(v))=[S(t; p(v_i)_j)]_{j=1}^{d*m}$ by
  keeping the first parameter group fixed and equal to a set of pre-determined values and performing a first fitting only considering the second group as free parameters in a first fitting step; and
  keeping the second parameter group fixed to a value given in the first fitting step and performing a second fitting considering only the second group as free parameters in a second fitting step.

19. The method according to claim 18, including the step of calculating the first concentration of the target gas $N_0$ by:

$$N_0 = \frac{\gamma_0^{fit}(0) g_0^{fit}(0)}{c^2 L_S(T)}$$

where c is the speed of light in vacuum and $L_S(T)$ is the line-strength of the absorbent molecular transition at the temperature T.

20. The method according to claim 18, including the step of parametrizing said $S(t; p(v))=[S(t; p(v_i)j)]_{j=1}^{d*m}$ as:

$$S(t; p(v)) = [S(t; p(v_i)_j)]_{j=1}^{d*m} =$$

$$\left[B_j + A_{d_j} e^{-\gamma_{c_j} t} f_j(t; A_{d_j}, \gamma_{c_j}, [\{\gamma_l(\delta v_{il}), Z_{l1U}\bar{g}_l(\delta v_{il}, w_{Rl})\}_j]_{l=0}^{n})\right]_{j=1}^{d*m},$$

$$i = 1 \ldots m$$

with $\mathfrak{f}=[f_j]_{j=1}^{d*m}$ are the non-linear functions that follows one of the below rate equations depending of the gas conditions:

homogeneous regime ($w_L \geq w_G$)

$$\left[\frac{df_j}{dt} = -\sum_{l=0}^{n} \gamma_l(\delta v_{il})_j \frac{\ln\left[1 + A_{d_j} Z_{l1U} \overline{g}_l(\delta v_{il}, w_{Rl}) e^{-\gamma_{c_j} t} f_j\right]}{A_{d_j} Z_{l1U} \overline{g}_l(\delta v_{il}, w_{Rl}) e^{-\gamma_{c_j} t}}\right]_{j=1}^{d*m}$$

inhomogeneous regime
still diffusive gas ($w_L < w_G$)

$$\left[\frac{df_j}{dt} = -\sum_{l=0}^{n} \gamma_l(\delta v_{il})_j \frac{2}{\sqrt{1 + A_{d_j} Z_{l1U} e^{-\gamma_{c_j} t} f_j} + 1} f_j\right]_{j=1}^{d*m}$$

non-diffusive gas ($w_L \ll w_G$)

$$\left[\frac{df_j}{dt} = -\sum_{l=0}^{n} \gamma_l(\delta v_{il})_j \frac{1.4256}{\sqrt{1 + 0.5 A_{d_j} Z_{l1U} e^{-\gamma_{c_j} t} f_j} + 0.4256} f_j\right]_{j=1}^{d*m}.$$

21. The method according to claim 18, including:
approximating the parameters $B_j$, $A_{d_j}$ and $\gamma_{c_j}$ as having small variations from decay to decay:

$$B_j = \overline{B} + \delta B_j$$

$\overline{B}$ is the mean value of the background of the j=0 . . . d*m recorded SCAR decays, in U
$\{\delta B_j\}_{j=1}^{d*m}$ are small variations around $\overline{B}$ for each j=0 . . . d*m recorded SCAR decay, in U $$A_{d_j} = \overline{A}_d + \delta A_{d_j}$$

$\overline{A}_d$ is the mean value of the amplitude of the j=0 . . . d*m recorded SCAR decays, in U $$\{\delta A_{d_j}\}_{j=1}^{d*m}$$

are small variations around $\overline{A}_d$ for each j=0 . . . d*m recorded SCAR decay, in U $$\gamma_{c_j} = \overline{\gamma}_c + \delta \gamma_{c_j}$$

$\overline{\gamma}_c$ is the mean value of the cavity decay rate of the j=0 . . . d*m recorded SCAR decays due to non-absorbent gas and non-saturated absorption losses, in $s^{-1}$
$\{\delta \gamma_{c_j}\}_{j=1}^{d*m}$ are small variations around $\overline{\gamma}_c$ for each j=0 . . . d*m recorded SCAR decay, in $s^{-1}$
selecting $$[p_{lc_j}]_{j=1}^{d*m} = [\delta B_j, \delta A_{d_j}, \delta \gamma_{c_j}]_{j=1}^{d*m}$$

as the first group of parameters.
22. The method according to claim 21, including:
introducing two further parameters to the second group of parameters, said parameters being:
d is the contribution to the cavity decay rate due to residual detection non-linearities, in $s^{-1}$
$Z_d$ is the "equivalent"-saturation parameter at 1U due to residual detection non-linearities, in $U^{-1}$ so that the second group of parameters is equal to:

$$p_{gb}(v) = [\overline{B}, \overline{A}_d, \overline{\gamma}_c, Z_d, d, [Z_{1Ul}, \gamma_l(0), \overline{g}_l(0), g_l(\delta v_{il}, w_{Rl})]_{l=0}^{n}]$$

where $\gamma_l(\delta v_{il})_j = \gamma_l(0) g_l(0) \overline{g}_l(\delta v_{il}, w_{Rl})$
with
$\{\gamma_l(0)\}_{l=0}^{n} \{c_{\alpha l}(0)\}_{l=0}^{n}$ are the absorption decay rates for each transition l=0 . . . n at the resonance frequency $v_i = v_l$, in $s^{-1}$,
$\{g_l(0)\}_{l=0}^{n}$ are the area normalization factors for each transition l=0 . . . n at the resonance frequency $v_i = v_l$,
$\{\overline{g}_l(v_i - v_l, w_{Rl})\}_{l=0}^{n}$ are the peak normalized line profiles for each transition l=0 . . . n, centered at the resonance frequency $v_l$ and linewidth $w_{Rl}$.

23. The method according to claim 22, including a further second parameter $[C_l^{\gamma}]_{l=0}^{n}$, which is the amplitude factor of a function $G_j(v_i; [C_l^{\gamma}]_{l=0}^{n})$, proportional, to the spectrum profile $[\overline{g}_l(\delta v_{il}, w_{Rl})]_{l=0}^{n}$   $G_j(v_i; [C_l^{\gamma}]_{l=0}^{n}) = \Sigma_{l=0}^{n} C_l^{\gamma} \overline{g}_l(\delta v_{il}, w_{Rl})$, which is used to update the local parameters $$[\delta \gamma_{c_j}]_{j=1}^{d*m}.$$

24. The method according to claim 22, including the step of parametrizing the non-linear function $f$ as:
homogeneous regime ($w_L \geq w_G$)

$$\left[\frac{df_j}{dt} = -\sum_{l=0}^{n} \gamma_l(0) g_l(0) \frac{\ln\left[\frac{1 + (\overline{A}_d + \delta A_{d_j})}{Z_{l1U} \overline{g}_l(\delta v_{il}, w_{Rl}) e^{-(\gamma_c + \delta \gamma_{c_j})t} f_j}\right]}{(\overline{A}_d + \delta A_{d_j}) Z_{l1U} e^{-(\gamma_c + \delta \gamma_{c_j})t}} - \frac{\ln\left[1 + (\overline{A}_d + \delta A_{d_j}) Z_d e^{-(\gamma_c + \delta \gamma_{c_j})t} f_j\right]}{(\overline{A}_d + \delta A_{d_j}) Z_d e^{-(\gamma_c + \delta \gamma_{c_j})t}}\right]_{j=1}^{d*m}$$

and $\overline{g}_l(\delta v_{il}, w_{Rl})$ is a Voigt function
inhomogeneous regime
still diffusive gas ($w_L < w_G$)

$$\left[\frac{df_j}{dt} = \left[-\sum_{l=0}^{n} \frac{2\gamma_l(0) g_l(0) \overline{g}_l(\delta v_{il}, w_{Rl})}{\sqrt{1 + (\overline{A}_d + \delta A_{d_j}) Z_{l1U} e^{-(\gamma_c + \delta \gamma_{c_j})t} f_j} + 1} - \frac{2d}{\sqrt{1 + (\overline{A}_d + \delta A_{d_j}) Z_d e^{-(\gamma_c + \delta \gamma_{c_j})t} f_j} + 1}\right] f_j\right]_{j=1}^{d*m}$$

and $\overline{g}(\delta_{il}, w_{Rl})$ is a Gaussian function
non-diffusive gas ($w_L \ll w_G$)

$$\left[\frac{df_j}{dt} = \left[-\sum_{l=0}^{n} \frac{1.4256 \gamma_l(0) g_l(0) \overline{g}_l(\delta v_{il}, w_{Rl})}{\sqrt{1 + 0.5(\overline{A}_d + \delta A_{d_j}) Z_{l1U} e^{-(\gamma_c + \delta \gamma_{c_j})t} f_j} + 0.4256} - \frac{1.4256 d}{\sqrt{1 + 0.5(\overline{A}_d + \delta A_{d_j}) Z_d e^{-(\gamma_c + \delta \gamma_{c_j})t} f_j} + 0.4256}\right] f_j\right]_{j=1}^{d*m}$$

and $\overline{g}_l(\delta v_{il}, w_{Rl})$ is a Gaussian function.
25. The method according to claim 18, wherein said first fitting step is a least squares fitting.

26. The method according to claim 25, wherein said least square fitting uses the Levenberg-Marquardt (L-M) algorithm.

27. The method according to claim 18, wherein said second fitting step is a least squares fitting.

28. The method according to claim 27, wherein said least square fitting uses the Levenberg-Marquardt (L-M) algorithm.

29. The method according claim 18, including the step of:
dividing the second group of parameter in a first sub-group of free parameters and a second sub-group of calibration parameters which are set equal to calibration values which remain constant during the first and second fitting steps.

30. The method according to claim 29, wherein the sub-group of calibration parameters includes:

$$p_{gb}^{cal}(\nu) = [Z_d, [Z_{1U}, \overline{g}_l(\delta\nu_l, w_{Rl})]_{l=0}^n]^{cal}$$

where: $\{\overline{g}_l(\nu_i - \nu_l, w_{Rl})\}_{l=0}^n$ are the peak normalized line profiles for each transition $l = 0 \ldots$ at, centered at the resonance frequency $\nu_l$ and linewidth $w_{Rl}$, and $Z_d$ is the "equivalent"-saturation parameter at 1U due to residual detection non-linearities, in $U^{-1}$.

* * * * *